US011386376B2

(12) United States Patent
Billeter et al.

(10) Patent No.: US 11,386,376 B2
(45) Date of Patent: Jul. 12, 2022

(54) RISK SPLITTER AND RISK QUANTIFYING FORECAST SYSTEM USING A STRUCTURED FORWARD-LOOKING SIMULATION TECHNIQUE QUANTIFYING CLASHING, LONG-TAIL RISK EVENTS CAUSING CASUALTY LOSS ACCUMULATION AND HIGH EARNING VOLATILITY, AND METHOD THEREOF

(71) Applicant: SWISS REINSURANCE COMPANY LTD., Zurich (CH)

(72) Inventors: Salomon Billeter, Adliswil (CH); Felix Rosenbaum, Zurich (CH); Elaine Weir, Baden (CH); Lars Hueber, Zurich (CH); Patricia Hinder, Thalwil (CH); Nikita Kuksin, Urdorf (CH)

(73) Assignee: SWISS REINSURANCE COMPANY LTD., Zurich (CH)

( * ) Notice: Subject to any disclaimer, the term of this patent is extended or adjusted under 35 U.S.C. 154(b) by 0 days.

(21) Appl. No.: 16/890,059

(22) Filed: Jun. 2, 2020

(65) Prior Publication Data
US 2020/0293964 A1    Sep. 17, 2020

Related U.S. Application Data

(63) Continuation of application No. PCT/EP2019/064721, filed on Jun. 5, 2019.

(30) Foreign Application Priority Data

Jun. 5, 2018    (CH) .................................... 00720/18

(51) Int. Cl.
*G06Q 10/06*    (2012.01)
*G06F 17/18*    (2006.01)
(Continued)

(52) U.S. Cl.
CPC ......... *G06Q 10/0635* (2013.01); *G06F 17/18* (2013.01); *G06Q 10/067* (2013.01);
(Continued)

(58) Field of Classification Search
CPC combination set(s) only.
See application file for complete search history.

(56) References Cited

U.S. PATENT DOCUMENTS

2001/0053993 A1\*    12/2001    McLean ................. G06Q 40/02
705/7.39
2012/0143633 A1    6/2012    Salghetti et al.
(Continued)

OTHER PUBLICATIONS

International Search Report and Written Opinion dated Aug. 6, 2019 in PCT Application No. PCT/EP2019/064721, filed Jun. 5, 2019.

*Primary Examiner* — Arif Ullah
(74) *Attorney, Agent, or Firm* — Oblon, McClelland, Maier & Neustadt, L.L.P.

(57) ABSTRACT

A risk parsing device provides risk splitting and loss event diversification for a multi-risk forecast systems capturing multiple loss aggregation under complex environmental conditions based on the occurrence of defined loss events. The loss events are triggered by one or more involved causing units and affected units, wherein the loss events evolve from one or multiple risk accumulating sources. Risk events related loss measures can be scattered over multiple causing units or multiple related clash events. The multi-risk forecast system provides loss-generating processes and events, wherein the inventive risk splitter is a technical core element to generate an event-related loss distribution mirroring cause-effect chains induced by the risk events which extend over space and time. The risk splitter module allows automated splitting of the risk based on risk exposed, causing unit characteristics and risk exposed affected units' characteristics. The causing unit characteristics comprises
(Continued)

for each causing unit assigned activity characteristic parameters and participation characteristic parameters of said causing unit defining for a specific causing unit a specific set of executable activity link members and market share driving participation probabilities. The causing unit characteristics comprises quota parameters defining affected populations of affected units with incidence and defining refined effect types.

21 Claims, 16 Drawing Sheets

(51) Int. Cl.
*G06Q 40/06* (2012.01)
*G06Q 40/08* (2012.01)

(52) U.S. Cl.
CPC ....... *G06Q 10/06375* (2013.01); *G06Q 40/06* (2013.01); *G06Q 40/08* (2013.01)

(56) References Cited

U.S. PATENT DOCUMENTS

| | | |
|---|---|---|
| 2017/0083981 A1 | 3/2017 | Niering et al. |
| 2017/0161859 A1 | 6/2017 | Baumgartner et al. |
| 2018/0114272 A1 | 4/2018 | Reimann et al. |

\* cited by examiner

RISK SPLITTER AND RISK QUANTIFYING FORECAST SYSTEM USING A STRUCTURED FORWARD-LOOKING SIMULATION TECHNIQUE QUANTIFYING CLASHING, LONG-TAIL RISK EVENTS CAUSING CASUALTY LOSS ACCUMULATION AND HIGH EARNING VOLATILITY, AND METHOD THEREOF

FIELD OF THE INVENTION

The present invention relates to automated systems for measuring of and/or forecasting future occurrence probabilities and event risks, respectively, and for quantized assessment of probably associated event impacts and probabilities of losses occurring. In particular, the invention relates to automated systems and methods for risk measurement and assessment in the context of liability catastrophes and casualty accumulation. More particularly, it relates to forecasting and exposure-based signaling, steering and/or operating of liability risk-event driven or triggered systems, in general, but even more particular systems for automation of underwriting, risk management, risk portfolio steering and signaling involving an improved identification of liability catastrophes, i.e. measured catastrophe showing loss impacts, and forecast or prediction of their quantified impacts, and/or an improved ability to initiate or trigger appropriate risk mitigation measures to cope with liability risks, and/or an improved scenario-based modeling quantifying catastrophe exposures, and/or improved resource/risk balancing with improved risk charge/costing signaling and optimized loss-ratio handling.

In general, it relates to automated measuring and signaling systems and methods for measuring or assessing risk measure in the context of liability catastrophes and casualty risk occurrence and accumulation. The present invention can be used for signaling and steering of automated underwriting, risk management, portfolio steering, client management devices. The present invention can be used for automated precise identification of liability catastrophes and improve prediction/forecast of associated impacts of such liability catastrophes, based on actual measurement and predictive modeling of parameters as. One of the core functions of such systems is to provide a quantifiable and reproducibly measurable measure for the probability of occurrence, i.e. the risk, of future liability losses arising from scenarios where multiple risk-transfers are involved possibly in multiple locations over longer periods of time. In order for an accident to be classified as a catastrophe, there needs to be more than one causing initiator as a company involved and/or a causing initiator or company in more than one role. The present invention particularly is directed to automated risk-transfer systems or other systems and instruments intended to hedge against such catastrophic risks and other significant risks, i.e. the probability of a future measuring/occurrence of an impacting catastrophe.

BACKGROUND OF THE INVENTION

The machine-based prediction or forecast of occurrence probabilities for events causing liability impacts, i.e. liability risks, is technically difficult to be realized because of their long-tail nature and their susceptibility to measuring and parametrizing quantitative legal, societal, and economic impact factors and their difficult to capture temporal time development and parameter fluctuation. Automation of prediction and modeling of liability catastrophes and risk accumulation is especially challenging as there is limited historic loss data available, and new risk events with new characteristics keep emerging. In addition to finding, triggering and/or mitigating valuable loss and exposure data where existing, it is therefore important to reduce the reliance on historic data by using forward-looking modelling (FLM) techniques. However, FLM goes beyond traditional data analysis and predictive modeling approaches and techniques by acknowledging a structured cause-effect chain. Liability risk driven systems have been developed and used, as a comprehensive FLM for liability risks. Such systems are able to predictively and quantitatively generate expected losses starting from a set of loss scenarios, i.e. parametrization of such scenarios, assess the impact of key risk factors, and evaluate the effect of risk transfer parameters and conditions. The results of such forecast systems can be back tested against actually measured loss data wherever available and relevant.

Liability risks or more generally, casualty risk typically diversifies risk-transfer systems' portfolios from the exposure to risk accumulation from natural catastrophes and financial markets. However, these risks have their own sources of risk accumulation. For example, the asbestos-related losses developed over more than 40 years into an insured loss bound to surpass 100 billion US dollars. It is therefore the largest insured loss ever. However, also large catastrophic events such as the derailment of a train loaded with crude oil in Lac-Mégantic or the collapse of the Stadtarchiv Köln emerged into losses surpassing the thresholds of 100 million dollar and 1 billion, respectively. Finally, economic, legal, judicial, regulatory, technological, and societal disruptions or trends lead to casualty risk accumulation because they affect many seemingly disconnected loss events. Some examples include the change of the Ogden rates in the U.K., hyperinflation, and the emergence of multidistrict litigation in the U.S. related to employment practices or other hot topics. In most of these cases, the time it takes to accumulate and fully develop a loss statistics is much longer than the time scale of the relevant change happening. Traditional systems and automation methods therefore based on loss trending and development do not capture the relevant accumulating risks in the future. Traditional risk assessment systems and methodical automation approaches typically focus on correlations between loss and exposure data. They tend not to consider risk accumulation or liability catastrophe issues in the portfolio. Likewise, they do not sufficiently consider loss generating mechanisms and loss drivers, which are essential when entering new risk-transfers or when market conditions change.

Automated systems for precise, reliable and reproducible risk measurement, prediction, mitigation and assessment are fundamental in today's operative environment for industries in all parts of technology. This is, because there is always risk exposure for any industry, the exposure typically occurring in a great variety of aspects, each having their own specific characteristics and complex behavior. The occurrence of a liability catastrophe event with associated loss impact can be fatal to a whole sector of industry, if the risk was not correctly anticipated and appropriately mitigated. However, risk measurement and assessment is technically complicated, and appropriate modeling structures often not sufficiently understood to allow a technical and/or instrumental approach. In particular, the complexity of the behavior of risk exposure driven technical processes often has its background in the interaction with chaotic processes occurring in nature or artificial environments. Good examples can be found in weather forecast, earthquake and hurricane forecast or controlling of biological processes such as e.g. related to heart diseases, controlling of financial market triggered systems or the like. Monitoring, controlling and steering of technical devices or processes interacting with such risk exposure is one of the main challenges of engineering in industry in the 21st century. Risk-dependent or triggered systems or processes such as e.g. automated underwriting, risk management, risk portfolio steering and pricing tools or forecast systems are all connected to the above technical problems and challenges. Pricing risk-triggered vehicles, such as automated risk transfer or insurance products, is additionally difficult because the pricing must be done before the product is sold but must reflect future impacts, losses and occurrences of events, which can never be assessed of measured with complete accuracy. With tangible products, for example, where the cost of goods sold is known before, since the product is developed from raw materials which were acquired before the product was developed. With risk-triggered products, this is not the case. The coverage of the probably occurring event impact must be set/assessed in advance. If the actual occurring (not the forecasted occurring) of risk events and associated losses is greater than the cover or risk mitigation measures, as e.g. the amount of transferred resources, typically premiums collected, then the risk transfer or insurance system's operability will be corrupted. A precise, reliable, forward-looking and reproducible risk measurement, prediction and assessment is therefore vital to all risk-triggered systems and processes. Hence, the ability to forecast and set assumptions for the expected losses is critical to the operation. The present invention was developed to optimize triggering, identifying, assessing, forward-looking modeling and measuring of liability risk driven exposures and to give the technical basics to provide a fully automated pricing device for liability exposure comprising self-adapting and self-optimizing means based upon varying liability risk drivers.

In the prior art, US 2012/0143633 A1 shows a forecast system for forecasting frequencies of future occurring losses and loss distributions of individual risks associated with a plurality of units. Each unit has its own measurable liability exposure measured and parameterized using independently operated liability risk drivers. In case of an occurring loss at a unit measuring parameters are measured and transmitted to a control unit controller. The control unit controller dynamically assigned the measuring parameters to the liability risk drivers steering the operation of associated loss resolving unit by resolving the occurred loss by means of the loss resolving unit. The set of used risk drivers is dynamically adapted by the system, wherein the liability risk drivers are varied in relation to the measured liability exposure signal by periodic time response. Each risk driver is attached to one unique measurable event physically causing the detected loss propagatable over a short, defined time window. The forecast starts with a high specificity in one area capturing general causation in latent mass. Further, US 2018/0114272 A1 shows another risk assessment and forecasting system for automated prediction and exposure-signalling of associated, catastrophic risk-event driven or triggered automated systems. The occurring of the events are measured and assigned to a historic hazard set comprising event parameters for each assigned risk-event. For the forecast, an event loss set is based on the measured frequencies with associated losses of the measured events of the hazard set, each of said risk-events creating a set specific loss. Timestamps, based on a dynamically estimated distribution of corresponding inter-arrival times parameters, capture a waiting time between consecutive events of the period loss set. The waiting times measure the time intervals between two successive risk-events and capture peril specific temporal clustering and seasonal occurrence patterns. US 2017/0161859 A1 shows another automated risk assessment and forecasting system. Country-specific parameters of a risk-exposed country are captured based on predefined criteria values. Different disaster event types are automatically assigned by the system to a disaster history table, capturing and storing mapping parameters for a geographic risk map, assigning each of a plurality of selectable disaster financing types to a definable cost factor capturing the capital cost of the disaster financing type in relation to its application for disaster mitigation. The system determines expected catastrophe losses associated with occurring measured physical catastrophic events by a loss frequency function and the geographic risk map for various scenarios of occurring natural disaster event types, and generates a forecast of an effect of the disaster financing type to cover the catastrophe losses based on the coverage structure, the assigned cost factors, and the determined expected catastrophe losses. Finally, US2017/083981A1 shows an automated risk forecast system using a flexible risk transfer function constructed up by several layers of different shares. The risk projection is flexibly construed by segmenting the risk transfer in layers of different shares and reassembling the segmented layers to an overall risk transfer function (instead of using a pure proportional or non-proportional risk transfer approach). The segmentation allows seamless adaption and optimization of the risk transfer function to specific risk exposure and event occurrences.

SUMMARY OF THE INVENTION

It is an object of the invention to provide a liability risk driven system and appropriate risk splitter for automated optimization and adaption in signaling generation by triggering risk exposure of insurance objects. In particular, it is an object of the present invention to provide a system which is better able to capture the external and/or internal factors that affect casualty exposure, while keeping the used trigger techniques transparent. Moreover, the system should be better able to capture how and where risk is transferred, which will create a more efficient and correct use of risk and loss drivers in liability insurance technology systems. Furthermore, it is an object of the invention to provide an adaptive pricing tool for insurance products based upon liability exposure. However, the system should not be limited by the size of risks, but should be easily applied also to small-, medium or large-size risks. It is an object of the invention to develop automatable, alternative approaches for the recognition and evaluation of liability exposure for small- to mid-size facultative risks and in its extension also to large-size risks. These approaches differ from traditional ones in that they rely on underwriting experts to hypothesize the most important characteristics and key factors from the operating environment that impact liability exposure. The system should be self-adapting and refining over time by utilizing data or parameter measuring inputs as granular temporal data available in specific markets or from risk-transfer technology databases. The measured/generated events and triggered data should be mainly quantified using technological measurements such as frequency of crashes, machinery breakdown, or number of operators nearby the machinery.

According to the present invention, these objects are achieved particularly through the features of the independent claims. In addition, further advantageous embodiments follow from the dependent claims and the description.

According to the present invention, the abovementioned objects are particularly achieved by the inventive, automated risk splitting for multi-risk forecast systems capturing multiple loss aggregation under complex environmental conditions based on the occurrence of defined loss events which are triggered by involved causing units and affected units, wherein one or more causing units are involved in the loss event evolving from one or multiple risk accumulating sources, wherein risk event related loss measures are scattered over multiple causing units and/or multiple related clash events, and wherein the multi-risk forecast system provides loss-generating processes and events by being enabled to generate an event-related loss distributions mirroring cause-effect chains induced by the risk events extending over space and time, in that a multi-dimensional data structure holds predefined accumulation scenarios for capturing measures of at least three risk accumulation sources triggered by the causing units, wherein the multi-dimensional data structure comprises a first accumulation scenario data structure for capturing first frame parameters of first scenario loss events, the first frame parameters defining risk events with a limited geographic impact range, with a short duration time window, with a plurality of affected units affected by the impact of the occurring risk events, and with a plurality of causing risk exposed units affected by a loss burden associated with the impact of the occurring risk events, wherein the multi-dimensional data structure comprises a second accumulation scenario data structure for capturing second frame parameters of second scenario loss events, the second frame parameters defining risk events with a global geographic impact range, with a, extended duration time of unfolding of the event impact, and with an extended number of causing risk exposed units, and wherein the multi-dimensional data structure comprises a third accumulation scenario data structure for capturing third frame parameters defining third scenario risk events impacting the first and second scenario risk events with external influences, the third frame parameters capturing external influence measures impacting at least frequency or severity of the impact of the occurring risk events, and in that the risk is split by means of a risk splitter based on risk exposed, causing unit characteristics and risk exposed affected units characteristics, the causing unit characteristics comprising for each causing unit assigned activity characteristic parameters and participation characteristic parameters of said causing unit defining for a specific causing unit a specific set of executable activity link members and market share driving participation probabilities, and the causing unit characteristics comprising quota parameters defining affected populations of affected units with incidence and defining refined effect types. The risk splitter can e.g. comprise a dual track structure applying differently to LLC loss scenarios and ULC loss scenarios (for a detailed definition of the terms LLC/ULC/ELC see below), wherein the dual track structure comprises for both scenarios means for generation and triggering of involved entities characteristics incorporating activities characteristics capturing and parameterizing causing units in different roles and incorporating market characteristics and models capturing and parameterizing market share driving participation probabilities, wherein, for the ULC scenarios, the dual track structure comprises additional means for exposed population trigger and generation, wherein in a first track of the dual track structure of the risk splitter applying to the LLC loss scenarios, the involved entities characteristics module comprises generation means and triggers for activity in industry probabilities, market share measures, and measures of the ability to pay, and wherein in a second track of the dual track structure of the risk splitter applying to the ULC loss scenarios, the involved entities characteristics module comprises generation means and triggers for participation probabilities, market share measures, and degrees of liability, and the additional generation means and triggers of exposed population measures comprises generation means and triggers for population size, adverse effect probabilities, manifestation latencies, and exposure history. In the dual track structure, the means for generation and triggering of involved entities characteristics applying to LLC loss scenarios can e.g. be mainly driven by properties of the causing units that have a positive probability to participate in a LLC event, and the means for generation and triggering of involved entities characteristics applying to ULC loss scenarios are mainly driven by properties of the causing units that have a positive probability to participate in a ULC event. The involved entities characteristics applying to LLC loss scenarios can e.g. comprise a measure for the participation probability implemented as conditional probability under the condition that an LLC event occurs related to a causing unit to participate in the role of a causing activity and as part of an industry in an LLC event. The means for generation and triggers of market share measures can e.g. provide a measure of the revenue of the causing unit divided by the total revenue of the corresponding industry in a given country. The means for generation and triggers of market share measures can e.g. comprises means for generating of an event frequency of the LLC event multiplied by the participation probability of a causing unit corresponds to the event frequency from the perspective of the causing unit in an activity and industry role. The probability to participate in a ULC event can e.g. be at least triggered by the causing units' industrial activities, the geographic extension of activities, the size of the causing unit, and the causing unit/company's loss prevention and/or human factor. The involved entities characteristics applying to ULC loss scenarios can e.g. comprise a measure for the participation probability implemented as conditional probability under the condition that an ULC event occurs related to a causing unit to participate in the role of a causing activity and as part of an industry class in a global ULC event with the ULC characteristics. The involved entities characteristics applying to ULC loss scenarios can e.g. comprise measuring or generating a global event frequency which is multiplied by the participation probability of a causing unit therefore corresponds to the event frequency from the perspective of the causing unit in an activity and industry class. The involved entities characteristics applying to ULC loss scenarios can e.g. comprise an automated severity scaling and adjustment by providing a measure for the causing unit's market share, wherein besides the risk-exposed unit's influence on the measured probability of participating in a global ULC event, the risk splitter and its technical structure also captures the size of the causing unit to adjust the severity measure. The ULC event capturing structure can e.g. be implemented to relate on the market share of the unit/company in a role of a causing activity in a location and automatically scaling down/up an assigned severity as the overall severity generated for the exposed population in the location. In case, the risk splitter cannot assess measuring data providing the size of the causing unit, the risk splitter can e.g. be initialized or calibrated by using an average causing unit size by industry and location. The weighted market share of a causing unit in a role of a causing risk activity in a location can e.g. be generated by the parameter relation:

$$wms_{ra,loc} = \frac{\Sigma_{ro} aip_{ra,ro} * ms_{ro,ra,loc}}{\Sigma_{ro} aip_{ra,ro}}$$

where the parameter $aip_{ra,ro}$ is the activity in the industry class probability and $ms_{ro,ra,loc}$ is the market share of risk activity in the class of an industry in a location, wherein the market share of a risk activity in a role of an industry in a location can e.g. be generated as follows:

$$ms_{ro,ra,loc} = \frac{assVol_{ro,loc,ap}}{nComps_{ro,loc} * avgRev_{ro,loc} * idaf_{ra,ro}}$$

where the parameter $assVol_{ro,loc,ap}$ is the assigned volume or assigned revenue of the causing unit, $nComps_{ro,loc}$ is the number of causing units (4) in the industry and location. The risk splitter can e.g. further comprise means to apply the measure of the weighted market share in the natural severity by $$natSevMeanAfter_{lc} = natSevMeanBefore_{lc} * wms_{ra,loc}$$

where the parameter SevMeanAfter is the mean of natural severity distribution after loss distribution pattern, natSevMeanBefor is the mean of natural severity distribution before loss distribution pattern, lc is the loss component, ra is the risk activity, and loc is the location. Said natural severity distribution after loss distribution pattern is shaped as a log-normal pattern, and/or said natural severity distribution before loss distribution pattern is shaped as a log-normal pattern. The involved entities characteristics module of the risk splitter can e.g. comprise a structure for a risk driver capturing loss distribution pattern, wherein the severity of the affected risk activities is distributed by the loss distribution pattern to the causing risk activities by means of the involved entities characteristics module by setting a measurable degree of liability providing the relation for each causing-affected pair in the activity chain of a ULC scenario. The exposed population generation and triggering can e.g. comprise means for generating the exposed causing unit within a global ULC event by grouping the ULC events by type of affected risk activity and location of affected units. The exposure history module can e.g. comprise an exposure history grouping to technically capture the temporal dynamics of an exposed population during the unfolding of a ULC event, wherein at least the grouping criteria of the exposure period is applied. For the adverse effect probability generation, the ULC event structure can e.g. be implemented to technically relate on a dependency between an affected unit's duration of exposure and a probability measure to develop adverse effects, wherein implementation assumes that this dependency decreases with prolonged exposure duration. The exposed population generation can e.g. comprise means for a manifestation latency generation, wherein ULC events unfold over an extended period of time and each affected unit as part of the exposed population capable of having its own assigned history of exposure measure to a causing unit or history of manifestation of adverse effects, and wherein the manifestation latency generation provides measures for how long it takes for an affected unit to develop adverse effects.

In an embodiment variant, the inventive risk splitter is part of a parsed, clash-quantifying, multi-risk assessment system based on a structured forward-looking cause-effect chain with parsed parameter data space for automated measurement and assessment of multi-risk exposures featuring quantifiable clash effects induced by occurring risk events and/or liability catastrophes and/or casualty accumulations, wherein a plurality of affected units are subject to the risk exposure of the occurring risk events caused by one or a plurality of causing liability risk exposed units, wherein by at least one first insurance unit or risk assembling unit at least a portion of the risk-exposure of the plurality of causing liability risk exposed units is absorbed based on defined first risk-transfer parameters within a defined time window, and wherein the risk measurement is based on systematic quantifying and scenario-based capturing of risk driven measuring factors, in that the system comprises an event generator having a multi-dimensional data structure holding predefined accumulation scenarios, wherein the multi-dimensional data structure comprises a first accumulation scenario data structure for capturing first frame parameters of first scenario loss events, the first frame parameters defining risk events with a limited geographic impact range, with a short duration time window, with a plurality of affected units affected by the impact of the occurring risk events, and with a plurality of causing risk exposed units affected by a loss burden associated with the impact of the occurring risk events, wherein the multi-dimensional data structure comprises a second accumulation scenario data structure for capturing second frame parameters of second scenario loss events, the second frame parameters defining risk events with a global geographic impact range, with a, extended duration time of unfolding of the event impact, and with an extended number of causing risk exposed units, and wherein the multi-dimensional data structure comprises a third accumulation scenario data structure for capturing third frame parameters defining third scenario risk events impacting the first and second scenario risk events with external influences, the third frame parameters capturing external influence measures impacting at least frequency or severity of the impact of the occurring risk events, in that the structured cause-effect chain is provided by means of the event generator by generating for each of the scenarios a plurality of data sets holding risk events evolving from a specific accumulation scenario, wherein, for the generation of the occurring risk events, each scenario comprises one or more executable activity link members, wherein an occurrence probability of a scenario is caused by the execution of the one or more activity link members associated with a scenario, wherein each activity link member is assigned to predefined classifications of risk exposed units, the assignment comprises a weighted probability parameter giving the probability that a causing activity link member is being executed from a specific class of risk exposed units, in that the system comprises a risk splitter module splitting the risk based on risk exposed unit characteristics and risk exposed population characteristics, the risk exposed unit characteristics comprising for each risk exposed unit assigned activity characteristic parameters and participation characteristic parameters of said risk exposed unit defining for a specific risk exposed unit a specific set of executable activity link members and market share driving participation probability, and the risk exposed population characteristics comprising quota parameters defining affected populations with incidence and defining refined effect types, in that the system comprises a batch clause modulator and filter for triggering and aggregating, by means of selected risk-transfer parameters, temporal distributed losses caused by one risk event and associable to the same risk-transfer parameters and risk-transfer time period, in that the system comprises a clash and accumulation aggregator comprising a clash aggregator aggregating first scenario loss events and an accumulation aggregator aggregating second scenario loss events for aggregating losses associated with one identified occurring event, wherein occurring losses, which are triggered under different risk-transfer parameters but with one identified occurring event, are aggregated in linear convolution, while occurring losses which are triggered under different identified occurring events are aggregated independently, and in that at least one parameter value of future characteristics and measure of the risks transferred to and associated with an insurance unit based on the defined risk-transfer parameters is predicted and/or generated by means of the system using a forward-looking model structure, the forward-looking model structure being based on historical measured risk events and risk events generated by the system by means of the event generator, the risk splitter module, the modulation engine, the batch clause modulator and filter, and the clash and accumulation aggregator providing a defined structured cause-effect chain, wherein parameters used by the system for generating the at least one parameter value of the characteristics and measure of the transferred risks are measured or otherwise captured by selected risk drivers. The system can e.g. comprise a modulation engine, wherein by the modulation engine, a given degree of liability is relatable to a certain portion of an occurring loss and risk exposed unit based on a triggered loss distribution. The structured cause-effect chain can e.g. be realized as an activity chain interconnecting different executable activity link members of one or more scenarios into a flow providing the interconnecting structure for handing over a causing risk exposed unit from affected activity link member to affected activity link member. Different affected activity link members can e.g. influence at least partially different affected units and/or affected unit groups. A measurable environmental influence can e.g. be captured as a separate executable activity link member, wherein the one or more executable activity link members additionally comprise the environmental influence as a possibly affected activity link member. Each causing activity link member can e.g. comprises one or more causing liability risk exposed units or group of units assigned, wherein the assignment is given together with a probability value that a causing activity link member is executed by a specific risk exposed unit or group of units. The measured or otherwise captured risk drivers are accessible stored in a dynamically accessible data repository comprising a structured hash table assigning measured risk drivers for providing input measures to the means of system. The first accumulation scenario data structure of the multi-dimensional data structure can e.g. be assigned to an event-frequency risk driver of first accumulation scenarios holding a measure for the frequency of a first accumulation scenario risk event to occur in a specific country or region. The first accumulation scenario data structure of the multi-dimensional data structure can e.g. be assigned to an affected-to-causing risk driver of first accumulation scenarios allocating affected activities to causing activities providing an estimated severity measure for the causing of those risk events. The second accumulation scenario data structure of the multi-dimensional data structure can e.g. be assigned to an event-frequency risk driver of second accumulation scenarios, wherein the frequency of a second accumulation scenario event is defined as the yearly frequency of a second accumulation scenario starting to unfold in the corresponding year, while the frequency is determined by the chosen temporal granularity of the scenarios, and wherein the frequency is weighted by a frequency attenuation making risk events with a more promptly occurrence more probable than risk events with an occurrence lay further back in time. The second accumulation scenario data structure of the multi-dimensional data structure can e.g. be assigned to a participation-probability risk driver of second accumulation scenarios, wherein the participation-probability risk driver is providing a conditional probability measure depending on the occurrence of a second accumulation scenario of a risk exposed unit to participate in or execute a causing activity link member as a part of the associated industry class. The multi-dimensional data structure can e.g. further comprise selectable data-structure for grouping and categorizing the defined scenarios into groups, wherein each scenario group contains one or more scenarios ^Providing a hierarchical composition structure for the generation of risk events of scenario group-scenario-activity link member-class/industry. The first scenario groups can e.g. comprise a train accident scenario group and/or a premises disaster scenario group and/or a construction disaster scenario group and/or a utility catastrophe scenario group and/or a food industry catastrophe scenario group and/or an event disaster scenario group. The second scenario groups can e.g. comprise a nanomaterials scenario group and/or an endocrine disruptors scenario group and/or a building materials scenario group and/or a food overconsumption scenario group and/or a pharmaceuticals scenario group and/or a professional lines scenario group, wherein the food overconsumption scenario group comprise a food additives scenario group and/or unhealthy food scenario group and/or functional food scenario group. The third scenario groups can e.g. comprise an economic scenario group and/or a biometric scenario group and/or a legal scenario group. The invention has inter alia the advantage, that it technically allows to automate and provide a device-based, optimized protection against occurring and accumulating casualty losses and earnings volatility using a new structured forward-looking technical approach for reproducible measurement and quantification of risk-transfer clashes. In the prior art, such an automation was not possible by known technical approaches to automation. This is, because liability risks are difficult to predict because of their long-tail nature and their susceptibility to difficult to measure soft factors as legal, societal, and economic changes. In particular, system-based automated prediction and modeling of liability catastrophes and risk accumulation is especially challenging as there is limited historic loss information available, and new risks keep emerging, where ordinary technical structure are not prepared to capture. In addition to triggering, measuring and managing valuable loss and exposure data where existing, it is therefore important to reduce the reliance on historic data which is achieved in the present invention by using forward-looking modelling (FLM) techniques. It is important to understand, that applying and integrating FLM techniques goes beyond the traditional technical approach, data processing and forward-looking modeling approaches, which could in the present invention only be realized by the inventive use of a structured cause-effect chain. Other prior art systems are able to generate expected loss cost parameters starting from a set of loss scenarios, assessing the impact of key risk factors, and predicting the effect of risk transfer parameters and associated boundary conditions. The splitting structure is based on a new event structure, allow a more efficient handling of the forward-looking assessment, wherein LLC events are generated and counted for a specific geographic and temporal context, the latter being a short duration (compared to ULCs). The LLCs are mainly quantified using technological measurements such as frequency of crashes, machinery breakdown, or number of operators nearby the machinery. The long-tail event modules, most importantly the population model does not need to be applied due to the short duration of the incident. Instead, a wide variety of loss-generating constellations is incorporated. The clash aggregator makes use of the specific event structure of the LLC. The ULC events are generated and counted for a worldwide context across a long time. The ULCs are mainly quantified using census and scientific measurements such as e.g. count of building owners or level of evidence for a causal link. Unlike in the case of LLC, the long-tail event modules such as the population model as well as the temporal allocation, loss trigger, and aggregation wording modules use parameters specific to each ULC. The accumulation aggregator makes use of the specific event structures of ULCs and also ELCs. The ELC events are generated for a specific economic, judicial, or biometric context with according boundary condition parameters. The ELCs are mainly quantified using econometric, legal, judicial, and biometric measurements such as systematic processing of court cases or life expectancy data. They apply to all loss-generating events (LLC and ULC, but also isolated losses as described in the LRD invention). The participation probability module as well as all modules related to loss-generating events are not applicable to them. Instead, a key-lock mechanisms ensures the appropriate loss-generating events are subject to influence of the corresponding ELC events. The accumulation aggregator makes use of the specific event structures of ULC and ELC. The events are generated and handled differently by the system and the risk splitting in dedicated structure depending on their type (LLC, ULC, ELC), which technically allows an optimized, more efficient and much faster processing of the events, leading to controllable and reproducible results. The present invention further allows in a new way to extend this functionality to occurring casualty catastrophes and applied the findings to quantify accumulating risks both inherent in catastrophic events such as the Lac-Mégantic rail disaster and loss complexes such as asbestos. Thus, the present invention allows a new way of automated measuring, prediction and modeling of occurring catastrophic loss events, outlining how they are predicted and generated, how the likelihood of them hitting the same portfolio via multiple policies is calculated, and how the loss burden is aggregated onto meaningful quantities.

Liability risk transfers or more generally, casualty risk transfers typically diversifies bolstered risk-transfer portfolios from the exposure to risk accumulation from natural catastrophes and financial market risk events. However, it has its own sources of risk accumulation. Not least, the asbestos-related losses developed over more than 40 years into an insured loss bound to surpass 100 billion US dollars. It is therefore the largest risk transfer loss ever. However, also the occurrence of large catastrophic events such as the derailment of a train loaded with crude oil in Lac-Mégantic or the collapse of the Stadtsarchiv Köln emerged into losses surpassing the thresholds of 100 million dollar and 1 billion, respectively. Finally, soft factors as economic, legal, judicial, regulatory, technological, and societal disruptions or trends lead to casualty risk accumulation because they affect many seemingly disconnectedly occurring loss events. Some examples include the change of the Ogden rates in the U.K., hyperinflation, and the emergence of multidistrict litigation in the U.S. related to employment practices or other topics. In most of these cases, the time it takes to accumulate and fully develop a loss statistics is much longer than the time scale of the relevant change happening. Traditional methods therefore based on loss trending and development do not capture the relevant accumulating risks in the future.

Traditional automation of risk assessment approaches technically typically focus on correlations between loss and exposure data. These systems are not able to capture risk accumulation or liability catastrophe issues in a portfolio of accomplished risk-transfers. Likewise, these system are not sufficiently able to incorporate loss generating mechanisms and loss drivers, which are essential when entering new environmental or other boundary conditions, as e.g. markets, or when environmental or boundary conditions change. The technical structure of the present invention is capable of expanding its approach beyond traditional rating methods for automated systems by being able to apply capturings and measurements from behavioral economics and catastrophe modelling approaches. This has inter alia the further advantage to allow for a more accurate pricing of risks, i.e. to better weighting and calibrate the balancing of accumulated risks (i.e. risk portfolio) with the accumulated resources to provide risk bearing entities with coverage or protection and ensuring a stable operation of the risk accumulating unit by balanced and well-adjusted loss ratio parameters. The loss ratio parameters typically provide the ratio of total losses incurred (paid and reserved) in claimed losses plus adjustment expenses divided by the total resources (e.g. premiums) accumulated. Balance point or balance measure for loss ratio parameters for property and casualty risk-transfer (e.g. motor car risk transfer (insurance)) range from 40% to 60% for traditional systems. Such risk-transfer entities are collecting resources more than the amount to be transferred in covering loss claims. Conversely, risk transfer systems or entities that consistently show a high loss ratio measure will automatically corrupt their long-term operation. Accurate prediction of the loss ratio measures for a future time interval is essential in optimizing the automation of the operation of such a system. The most optimized operative parameters for such an automated systems are typically called the target measures. Technically, the loss ratio parameter is normally provided 1 minus the operative expense ratio, where the expenses consist of all expenditure, necessary to allow operation of the risk-transfer system. Expenses associated with risk-transfer coverage ("losses") are considered as part of the loss ratio. For generating a control rate change, the risk-transfer system may measure the incurred or actual experienced loss ratio (AER) by the permissible loss ratio, necessary in order to uphold, i.e. not corrupt, the automated operation of the system, which is to ensure the long-term stability of the automation.

The inventive forward-looking model (FLM) structure of the present invention has further the advantage to allow for a most accurate prediction of future outcomes, for example, the characteristics of measured future losses, by reflecting the mechanics and processes that drive them by the technical structure of the invention. Thus, the operation of the present invention goes beyond a mere rollforward of past experience and have the built-in flexibility to evolve and to take into account current and future changes. The structure allows to be validated and trained through an understanding of historical experience, which forms a subset of what the system's modelling can predict. This has also the advantage, that it technically allows the system's prediction to be applied in situations with and without relevant historical experience, which is not possible by the known prior art systems. The inventive forward-looking prediction structure also go beyond traditional prediction and forecast systems' approach by implementing a structured cause-effect chain. The obtained results from the predictions can thus be transferred from data-rich contexts into the future and to other contexts where experience and data is sparse, for instance in complex parameter fields as high growth markets. The FLM-structure of the present invention allows to precisely predict future outcomes of risk-transfer risks in changing economic, societal, technological, and legal conditions, and thus provide a preferable technical approach to accurately predicting liability risk parameters and measures. The input parameters of the FLM-structure are known as risk drivers, and typically are measured directly during operation of the present invention. They are parameterized from other sources than ultimate monetary past loss amounts. Such sources include validated insights of risk-exposed affected units and loss claims adjusters as well as macro-economic data and other external data sources. This construction allows to focus the prediction of the automated system on relevant loss data rather than being obliged to arbitrarily utilize any available loss data. Since the implemented FLM-structure of the present invention explicitly reflects the structured cause-effect chain, it can be developed in a modular way which in turn allows extensions by adapting only the corresponding module instead of having to start from scratch.

Concerning the term liability catastrophes and risk accumulation, it is to hold, that for the present invention liability catastrophes involve multiple risk-exposed affected units (in terms of the risk-transfer parameters: policyholders) potentially over a long time and over many places. They therefore lead to risk accumulation, and the exposure to them is complex and needs to be treated carefully. The present inventive liability catastrophe prediction system can be used for several purposes by measurably quantifying the liability losses arising from scenarios where more than one causing company is involved, and/or a causing company is involved in more than one role. It allows entities to transfer risks from a deep understanding of catastrophes and their impact on the economics and risks in them, but also to automatedly steer portfolios, monitor market conditions, automatically set reserves, supports regulatory and investor-related automated reporting and monitoring mechanism. At a market level, the inventive approach to automated liability catastrophe prediction supports rational and sustainable pricing and risk taking. At entity/company level, it provides competitive advantage by a more stable and accurate operation allowing a more efficient and optimized resource allocation.

The new technical approach of the present invention to liability catastrophe forecasting allows to extend all known liability risk driven approaches and systems designed for automated liability catastrophes predictions and measurements. The inventive system is able to automatically predict the impact of a diverse range of future liability catastrophes on diverse metrics of risk and profitability including, but not limited to shortfall and expected loss. It enables a system's user to obtain an appropriate risk measure and charge and to use all available information for any automation of risk-transfer decisions and risk-transfer-decision-dependent electronic signaling in the sense of an operating expert system. The inventive system allows to automate the taking of appropriate risk mitigation measures (risk appetite, tailored products, coverage, exclusions, capital, hedging, and claims strategies), both for individual transfers/transactions and entire portfolios. Finally, it allows generating additional, new kinds of risk-transfers, coverages, and transactions.

For the forward-looking prediction structure of liability catastrophes and risk accumulation, the inventive system generates the expected loss using a basic liability risk drivers (LRD) based structure. The expected loss and other expected loss characteristics are generated by means of the liability risk driver structure from risk and exposure information of the entity/company or the portfolio to be covered by appropriate risk-transfer. The basic liability risk drivers based structure does not take into consideration any account-specific or market loss history and does not contain any historical loss data. Instead, it builds up the expected loss from potential losses (loss scenarios) and risk factors which are measured and observed independently. The basic liability risk drivers based structure requires a number of parameters in order to work effectively. Most parameters, such as the cost of living in various countries, represent risk factors and can be directly measured or obtained and forecasted from other sources. Only a few parameters, such as the number of events potentially triggering third-party losses (the base frequency), are obtained by comparing the generated predictions with past loss experience. However, most required parameters are measured and/or observed directly and can be forecast and verified directly and independently of any overall loss experience. This allows the inventive system to predict the effect of changes among risk drivers before they manifest in observed losses and become statistically significant.

As illustrated in FIG. 1, the basic LRD structure comprises following main parts (cf. FIG. 1): the basic LRD forecasting/modeling structure, the LRD indicator retrieval and the LRD loss experience processor. The LRD structure allows to generate the expected loss from exposure information using loss scenarios and risk drivers. The LRD indicator retrieval observes and forecasts the development of risk-driving properties of the world used as parameters by the system. The LRD loss experience analysis collects and analyses the relevant loss histories and corresponding exposures to back-test the system's predictions. If there are any significant mismatches between a loss history and the corresponding system's prediction for the past, the LRD structure and/or the relevant model parameters are corrected accordingly. The LRD model and prediction structure itself consists of two main elements: loss scenarios and risk drivers. Rather than starting out from past losses, the LRD model structure builds up the expected loss from potential losses which can be in the past or in the future according to a set of loss scenarios. These potential losses are then subjected to the influence of key risk drivers both within (e.g. the type of product or the geographic extension of activities) and outside (e.g. the willingness to sue or the legal environment) the companies to be risk-tangible unit, i.e. the insured. These risk drivers are parameterized from sources other than ultimate monetary past loss amounts. Due to its modular approach, the model can be extended by adapting only the corresponding module. Past loss experience is used as a testing environment to verify and, if mismatches are found, to understand and correct/adjust the model structure's outcome. The technical LRD modelling structure has been calibrated and validated against reliable exposure and loss measuring data of the system and external exposure and loss measuring data. FIG. 2 illustrates the basic liability risk driven LRD prediction structure, wherein the exposure A1 comprises the size of risk, the type of risk transfer, the geographic extension, the risk quality measures, other boundary conditions as limits and deductibles, and claims triggers; the risk discriminator A2 comprises loss prevention parameters, human factors, new kinds of risk-transfer settings; the risk splitter A3 comprises geographic extension and size of risk; The event generator A4 comprises the type if risk transfer settings and activity; the price tag engine A5 comprises the cost of living; the potential losses A6 comprises the likelihood/frequency, the severity properties, and temporal properties; the legal system provided input boundary conditions A7 comprise type of liability, liability laws and conditions, and mass tort; the wording filter A8 comprises limits and deductibles, and claims trigger; the aggregator A9; and the expected loss A10 comprises frequency distribution, severity distribution, shortfall, narrative impacts, and underlying risk measures.

The present invention has inter alia the advantage to provide the used basic LRD structure being extended to accumulating risks. the liability catastrophe prediction system extends the basic LRD structure by the implementation of the inventive characteristics of catastrophic loss-generating processes, where various risk tangible units, have unit-specific risk-transfer parameter settings (policyholders), are involved in an event. For the prediction process, three types of risk accumulation sources can e.g. be considered: (i) events (referenced as LLCs) that involve several policyholders where the loss burden may be split between them (e.g., Deepwater Horizon, Viareggio train derailment, or the fire in Mont Blanc tunnel), (ii) complexes of related loss events (referenced as ULCs) that have a common root cause (e.g., asbestos, endocrine disruption by BPA), and (iii) external events (referenced as ELCs) characterized by factors affecting all or many losses changing over time (e.g. runaway inflation, legal changes, changes of longevity). For these loss-generating processes and events, the inventive, risk-driven system generates the event-related loss distributions by mirroring the cause-effect chains, accounting for the multiple-defendant nature of liability catastrophes, and, in case of related losses such as asbestos, extending the events over space and time. Moreover, the connection is made to different risk measures accounting for various concerns related to losses spreading over years or even decades.

The liability catastrophe modelling structure is realized capable of parameterizing from various data sources related to economic, census, and risk-transfer-related observables. The inventive system shows a more stable and more accurate operation than other systems known in the prior art if tested against various public, commercial, and proprietary data sets containing past liability catastrophes and estimates of future catastrophic losses. Though, in real world application, there may never be enough measuring data to fully quantify rare events, the present invention also shows a more accurate, adaptive, and stable operation under occurring rare events.

The present invention further has the advantage that it allows to provide a more accurate and fully automated capacity monitoring and measurement, which was not possible by the technical structure of comparable prior art systems. Liability catastrophes represent significant operative and/or financial hazards to risk-transfer systems in the insurance and reinsurance technology, in particular for automated systems which do not have the possibility of manual or automated adjustment and correction to changing operative conditions. This includes the risk of corrupting the operation of the automation of the system, which on the non-technical side may lead to insolvency, an immediate or long-term reduction in earnings and statutory surplus, the possibility of forced asset liquidation to meet cash needs, and the risk of a ratings downgrade. Therefore, such automated systems may not be used under such operative conditions, as the real world interaction of those systems require. Though, the operative boundary conditions may have their background also in a non-technical, business-related target, these conditions provide some of the framework requirements for the realization of an autarkic running, self-sufficiently automated operation of such systems. Even intangible threats as reputational damages, e.g. where headline losses disproportionately impact an operator running the system among its peers and put risk management capabilities in question. Hence, operator of automated risk transfer systems, as e.g. (re-)insurance entities have to consider catastrophe risk as a key element in the technical requirements of automation in risk management framework.

The technical implementation of human expert expertise and intelligence into automated risk-transfer system is fundamental for the automation and, if successful, has often been priced if providing an appropriate risk management. Therefore, this implementation is one of the major technical challenges in realizing automation in the field of automated risk-transfers. The appropriate use and implementation of scenarios, e.g. allowing technically to quantify impacts from extreme events and support the risk-transfer (underwriting) activities, has been another technical challenge in industry practice. In addition, the industry has recognized a growing interconnectivity and interdependency of the world, though, increasing the potential and making the technical hurdles for the realization of automated detection and management of risk accumulation systems more challenging. The importance of precise and accurate operating systems in that field is also shown by various recent study on the subject concluding that casualty catastrophe risks could well surpass property catastrophe risks for many risk-exposed entities. However, probabilistic modelling based systems are not widely used at present for casualty catastrophes due to the complexity and interdependency of the occurring risks and their predicted or measured impact. In order to develop automated risk-transfer portfolio management systems and decision making expert systems around risk diversification, mutual defined risk-transfer parameters as e.g. underwriting requirements, as well as possible risk transfer, engineers first have to understand and quantify the measurability of exposures and total loss potential within their risk-transfer portfolio. The present invention has the advantage over known prior art systems, that it provides a technical risk control framework which includes automated risk identification, risk measurement and risk exposure control as core components. Under this framework, the necessary minimum of accumulated resources (solvency and liquidity) requirements can be optimized, as well as risk category limits corresponding to e.g. a 99% shortfall event (other shortfall quantities are possible, too). For the risk-transfer operations, including mutual defined risk-transfer parameters and final underwriting these constraints translate into capacity limits per peril, which can automatically be monitored and hence controlled by the automated system. It is important to also note that, technically, catastrophe risks cannot be viewed in isolation, but must be considered within the context of the total economic balance condition and environmental impact parameter. E.g. risk-transfer losses linked to a triggered insolvency of a company or a global financial crisis, more generally, will heavily correlate with the financial market risk parameter on the asset side of the risk-exposed entity.

Transferring peak risks to back-up or second tier risk-absorbing units, as e.g. reinsurance units, is one option of managing catastrophe risk, while second-tier risk-transfer options have existed, even before catastrophe modelling forecasts were used. In fact, natural catastrophes were initially, in the prior art, deemed only partly accessible to risk-transfer mechanism (e.g. with loss limits, exclusions, named perils only). The first natural catastrophe prediction systems were developed about 30 years ago.

The automation of natural catastrophe prediction have since undergone a constant technical evolution. While at first systems started by capturing only single country earthquake and wind physical damage losses and used aggregated exposure data for modelling a few events, today's technical realizations provide increase in scope dramatically, covering all major risk-transfer applications and fields, all relevant natural perils and lines of business exposures. Exposures are described in significantly more detail, mainly being based on standardized data formats, and allow for a large number of combinations of occupancies and construction types. Capturing previously un-modeled perils (e.g. tsunami, liquefaction and storm surge), loss consequences (e.g. contingent business interruption) and creating a period view (e.g. aggregated per year, sequence of events during a period) in the modelling structure not only greatly improved the technical understanding of the way to capture and measure loss potential. It also allowed for a refinement of tailored second-tier risk-transfer solutions. E.g. solutions to cover 2nd events or an accumulation of high-frequency/low severity non-peak peril events during a period have become more of a norm. Also, through the availability of transparent and widely accepted prediction mechanism and structures, the transfer of risks have become more accessible to capital markets, e.g. through so called Insurance Linked Securities (ILS).

While automated systems with predicting capabilities for casualty catastrophes are only in their infancy in comparison to natural perils and while casualty exposures are usually only transferable on an "all risks" basis, the present invention allows for a deeper understanding and more accurate measurement of the exposures and provides a corresponding transparency which opens opportunities to better leverage capital allocated to casualty business exposures. Since casualty catastrophes are more complex to define than natural catastrophes, contractual language has often been used in the industry to address coverage and aggregation for a range of loss events and establish a mutual understanding between the risk exposed units and the risk-transfer units. While standardized sets of risk-transfer parameters exists, deviations to extend coverage beyond a limited scope have at times resulted in coverage disputes. In prior art systems, carving out peak risks for protection allows for second-tier risk-transfer coverage to be specific and be provided at larger capacities, addressing tail risks of the reinsured efficiently. The present invention has the advantage not to be limited to operational boundary conditions. It also enables for second-tier risk-transfer to more strategically assume exposures where it fits with their own risk tolerance. Once peak exposures are transferred, protecting the risk-exposed entities' surplus, further risk-transfer can be accomplished out more easily on the net portfolio, e.g. to address other exposures or boundary conditions as earnings volatility of the ceding company through traditional second-tier risk-transfer structures, as e.g. reinsurance structures.

In summary, casualty catastrophes lead to risk accumulation which are technically difficult to handle for automated systems. In some cases, losses develop over several decades, which has to be considered when realizing the technical basis of such systems. Moreover, casualty risks are affected by various drivers of change, and historic loss statistics do not provide enough information for the application of traditional prediction system technology, e.g. direct implementation of appropriate modelling structures on standard generic data processing system, e.g. computers, by person skilled in the art. The occurrence of such risk events are either unprecedented in their context, which makes measurement and parameterized capturing technically challenging, or the underlying parameters are changing faster than the time it takes to collect good loss statistics, needed by traditional prediction mechanism. With new structural technical approach of the present invention, which reflects the loss-generating process, it has become possible to accurately quantify, measure, monitor and predict rare and accumulating casualty events. The present inventive system further allow risk-transfer entities to better understand and quantify their exposure to casualty catastrophes, which is a prerequisite for an effective automation of risk management. With the inventive system, peak risks can be addressed through automated management of capacities and/or reinsurance. Furthermore, transparency of underlying exposures and sources for risk accumulation allows for a more efficient and optimized automated transfer of peak risks to other risk-taking entities. As seen with natural catastrophe modeling, key for the advance of automated systems with operation based on probabilistic modelling structures may provide the standardization of exposure and loss data generation for new technical approaches to build on. Thus, the transparency of the operation add interaction of the different structural elements of the present invention, allow a completely new, and technically optimized approach to automated prediction and risk handling. In particular, the inventive structure comprising (i) the event generator allowing to implement new event characteristics providing the technical approach for capturing risk events involving more than one potential defendant and risk events lasting over a long time, in particular unlimited liability catastrophe events (ULC), (ii) the risk splitter allowing to implement involved risk-exposed entities' (e.g. companies) characteristics as well as exposed population characteristics, wherein the involved risk-exposed entities' characteristics allows capturing companies in different roles by activities modelling structures and market share driving participation probability by market modelling structures, and wherein the exposed population characteristics allows capturing affected populations with incidence by population modelling structures, and also allow refined effect types, (iii) the modulation engine (legal system) allowing to implement loss distribution i.a. providing inclusion of a measure of the ability to pay and degree of liability by legal liability modelling structures, as well as providing inclusion of legal dynamics by appropriate evidence modelling structures, (iv) the wording filter allowing to capture specific risk-transfer policy characteristics based on the aggregation of triggered specific wordings and extended batch clause, and based on the risk-transfer policy time period and an extended loss claim trigger, and (v) the aggregator providing a clash and accumulation aggregation based on a clash aggregator for Limited liability catastrophe events (LLC) and an accumulation aggregator for Unlimited liability catastrophe events (ULC). This structure is a completely new technical approach, where the real world scenarios are technically different approached by providing three accumulation scenarios' structures comprising limited liability catastrophe scenarios (LLC), unlimited liability catastrophe scenarios (ULC), and external scenarios (External). For limited liability catastrophe scenarios compare FIG. 3 while for unlimited liability catastrophe scenarios compare FIG. 4. Thus, the present invention with its forward-looking technical structure uses known liability risk modelling structures only as basis, however is further able to consistently predict and generate a possible bulk of losses, catastrophic events (LLC), loss complexes (ULC), and risk accumulation due to changes in external factors (ELC). The present invention further allows to start broadly and only add specificity where needed, whereas prior art modelling mechanisms necessarily start with a high specificity in one area (general causation risk in latent mass claims) with gradually making their operation more comprehensive, where possible.

BRIEF DESCRIPTION OF THE DRAWINGS

The present invention will be explained in more detail below relying on examples and with reference to these drawings in which:

FIG. 8 shows the activity 1003 'having explosive substances transported' to the involved industries 1004. To the right the probability that the activity 1003 is executed from a specific industry 1004 is shown as a pie chart.

FIG. 13 shows a diagram illustrating schematically applying a downstream degree of liability within an activity chain 100 to the ULC structure. Causing activity 1003 producing baby bottles can only be associated with a measure of liability for the affected activities worker, environment and baby downstream of its supply chain. A baby bottle producer unit should therefore not e.g. be assigned to liability for the workers of a thermal paper producer or the cashiers exposed to the thermal paper. Such an embodiment variant results in a functional relation of the relevant technical parameters of:

sevMeanAfter$_{lc}$=sevMeanBefor$_{lc}$*dol$_{ls,cra,ara,dolOutcome}$, with sevMeanAfter is the mean of severity distribution after loss distribution pattern (e.g. log-normal), sevMeanBefore is the mean of severity distribution before loss distribution pattern (e.g. log-normal), lc is the loss component 4, ls is the loss scenario 1001, cra is the causing risk activity 43, ara is the affected risk activity 32, and dolOutcome is the degree or measure of liability outcome, i.e. the scenario 1001 outcome.

Figure 14:
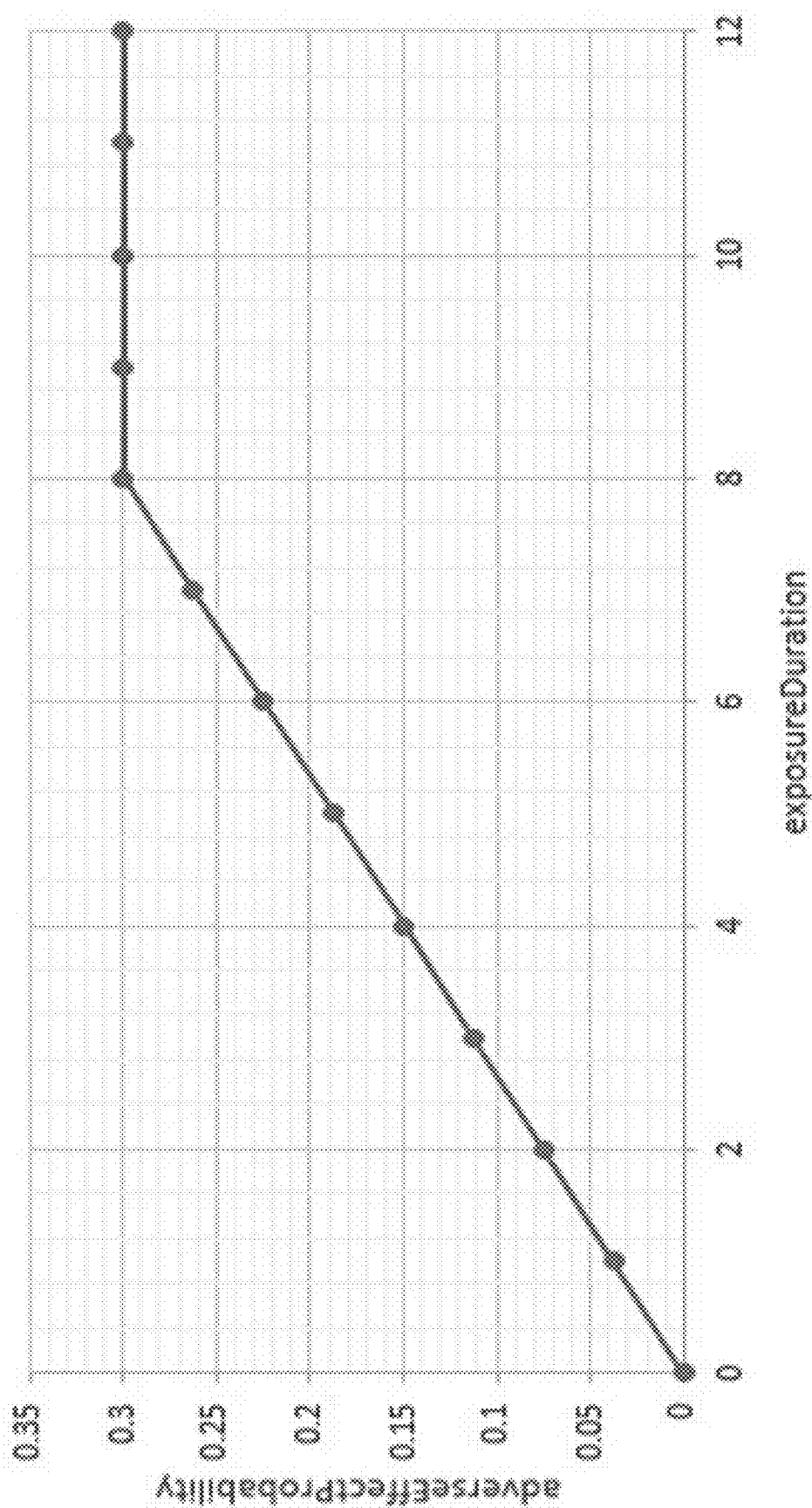

FIG. 14 shows a diagram illustrating schematically the adverse effect 1143/934 probability generation 1143 of the exposed population generation 114/93. The ULC 10002 structure of the system 1 technically assumes that there is a dependency between an individual/unit's 3 duration of exposure and its probability to develop adverse effects 1143/934. Furthermore, the structure assumes that this dependency decreases with prolonged exposure duration (e.g. the incremental probability increase of a smoker to develop adverse effects 1143/934 for one year more of smoking is smaller after 20 years than after 10 years of already having been smoking). As an embodiment variant, the system can e.g. be implemented to assume a linear dependency up to a specified saturating duration, where the dependency is becoming constant. In the example of FIG. 14, the saturating duration is equal 8 and the saturating fraction is equal 0.3.

Figure 15:
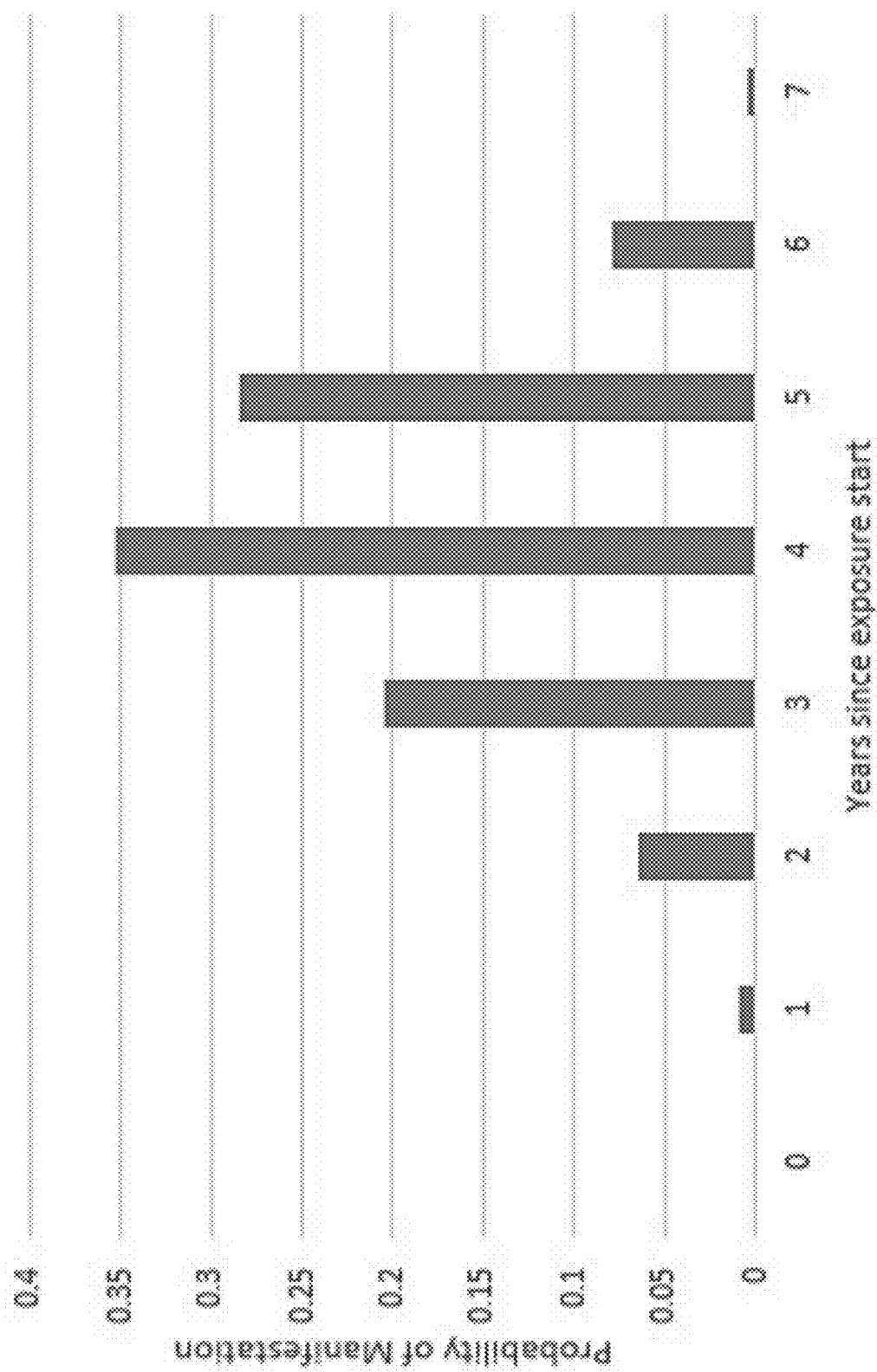

FIG. 15 shows a diagram illustrating schematically an embodiment variant, where the ULC 10002 structure is structured using a Weibull distribution for the parameters, which is described by the following cumulative distribution relation $$F(x; k, \lambda) = 1 - e^{-(\frac{x}{\lambda})^k},$$

where k>0 is the shape parameter and λ>0 is the scale parameter of the distribution. The fraction of a unit/individual 3 to develop adverse effects 1143/934 within times $t_1$ and $t_2$ is therefore implemented by generating $\text{Fraction}_{t_1, t_2} = F(t_2; k, \lambda) - F(t_1; k, \lambda)$ where $t_1$ is the event exposure start date and $t_2$ is the year in which the adverse effects 1143/934 manifest.

Figure 16:
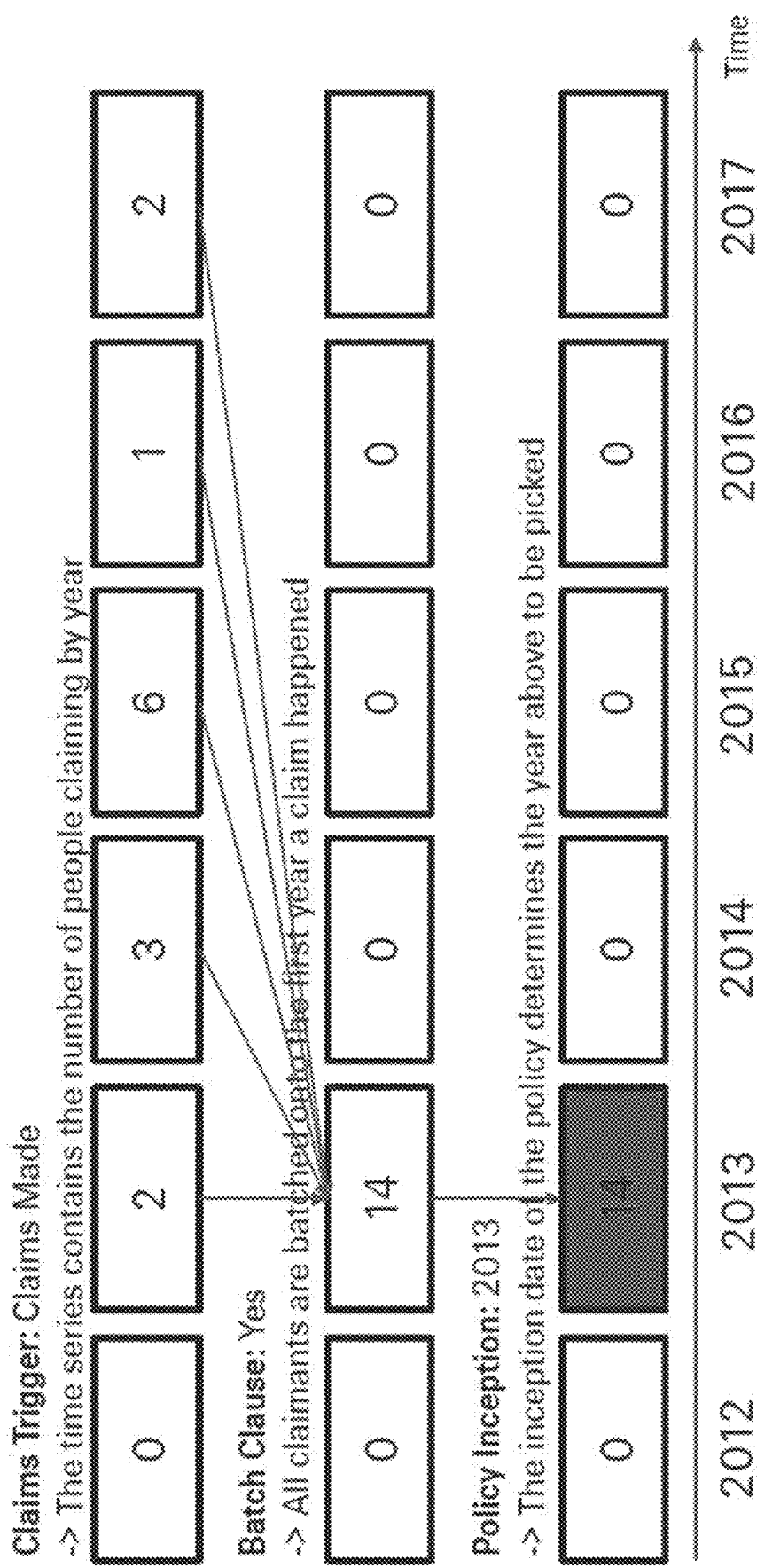

FIG. 16 shows a diagram illustrating schematically an embodiment variant, where the wording filter 13 provides the temporal allocation of a series of ULC 10002 losses onto one risk-transfer framework, e.g. provided by the parameters of an insurance policy. Risk-transfer parameter framing, as e.g. provided by insurance policy wordings, aims to ensure that a series of losses can be allocated (more are less unambiguously) to a specific risk-transfer, i.e. insurance policy. In the example of FIG. 16, three properties of the risk-transfer parameters (policy parameters) are implemented in the system's 1 structure to consider the question of "how much of series of losses would be allocated to a causing unit's 4 product liability risk-transfer (policy) within a defined risk-transfer time period?", with the three risk drivers: (1) the claims trigger module 1311/851/952, providing means for considering, how one individual loss is allocated temporarily (e.g. the point in time when a claim is made against the causing unit 4, i.e. the insured; (2) the batch clause module 1315/953 providing means to consider whether a series of losses is batched and allocated temporarily (e.g. all claims (within a series of losses) are temporarily allocated to the first claim made); (3) the policy period splitter or module 1313/853/955 providing the allocation of the loss period the risk-transfer parameters, i.e. insurance policy, covers (e.g. the policy covers all losses that are temporarily allocated to year 2017). For a good illustration how these three risk drivers work together in system 1 for the temporal allocation, FIG. 16 illustrates the above mechanism in a simple example. In the example of FIG. 16, 14 affected units 3 (in the example people) are exposed to a causing nit/originator 4 and develop adverse effects 934/1143. All this happens over the course of some years. The risk-transfer parameters, i.e. the policy, is based on claims made, has a batch clause and the risk-transfer (policy) period 34 is 2013.

DETAILED DESCRIPTION OF THE PREFERRED EMBODIMENTS

Figure 1:
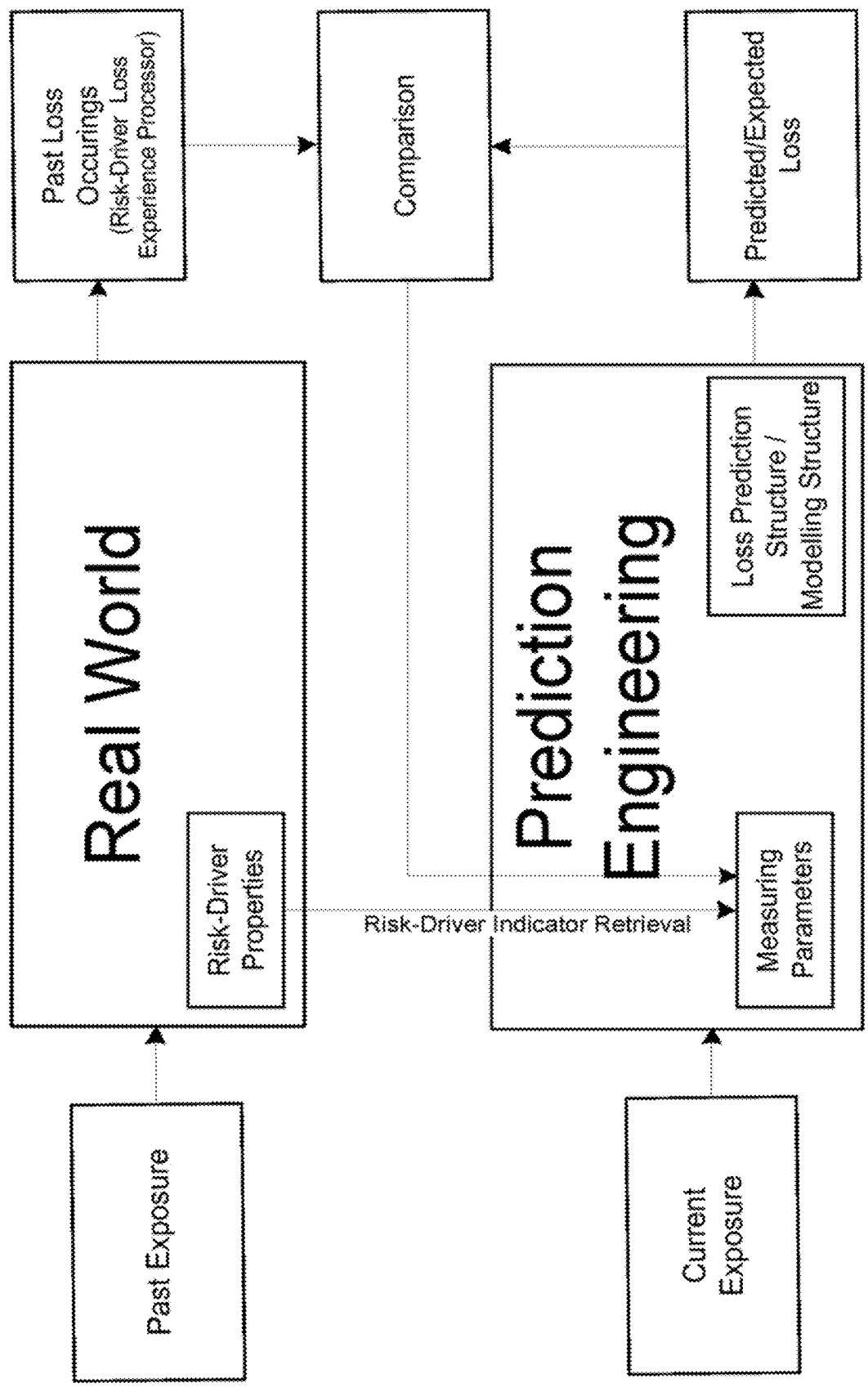
FIG. 1 shows a block diagram, schematically illustrating the basic LRD structure comprising three main parts: the basic LRD predicting/modeling structure, the LRD indicator retrieval and the LRD loss experience processor. The basic LRD structure allows to generate the expected loss from exposure information using two technical main elements, namely loss scenarios and risk drivers. Rather than starting out from past losses, the basic LRD structure builds up the expected loss from potential losses which can be in the past or in the future according to a set of loss scenarios. These potential losses are then triggered by the influence of key risk drivers both within (e.g. the type of product or the geographic extension of activities) and outside (e.g. a measure/weight for the willingness to sue or the legal environment) the monitored entities/companies exposed to the risks. These risk drivers are parameterized from sources other than ultimate monetary past loss amounts. Due to its modular approach, the technical structure can be extended by adapting only the corresponding module(s).
Figure 2:
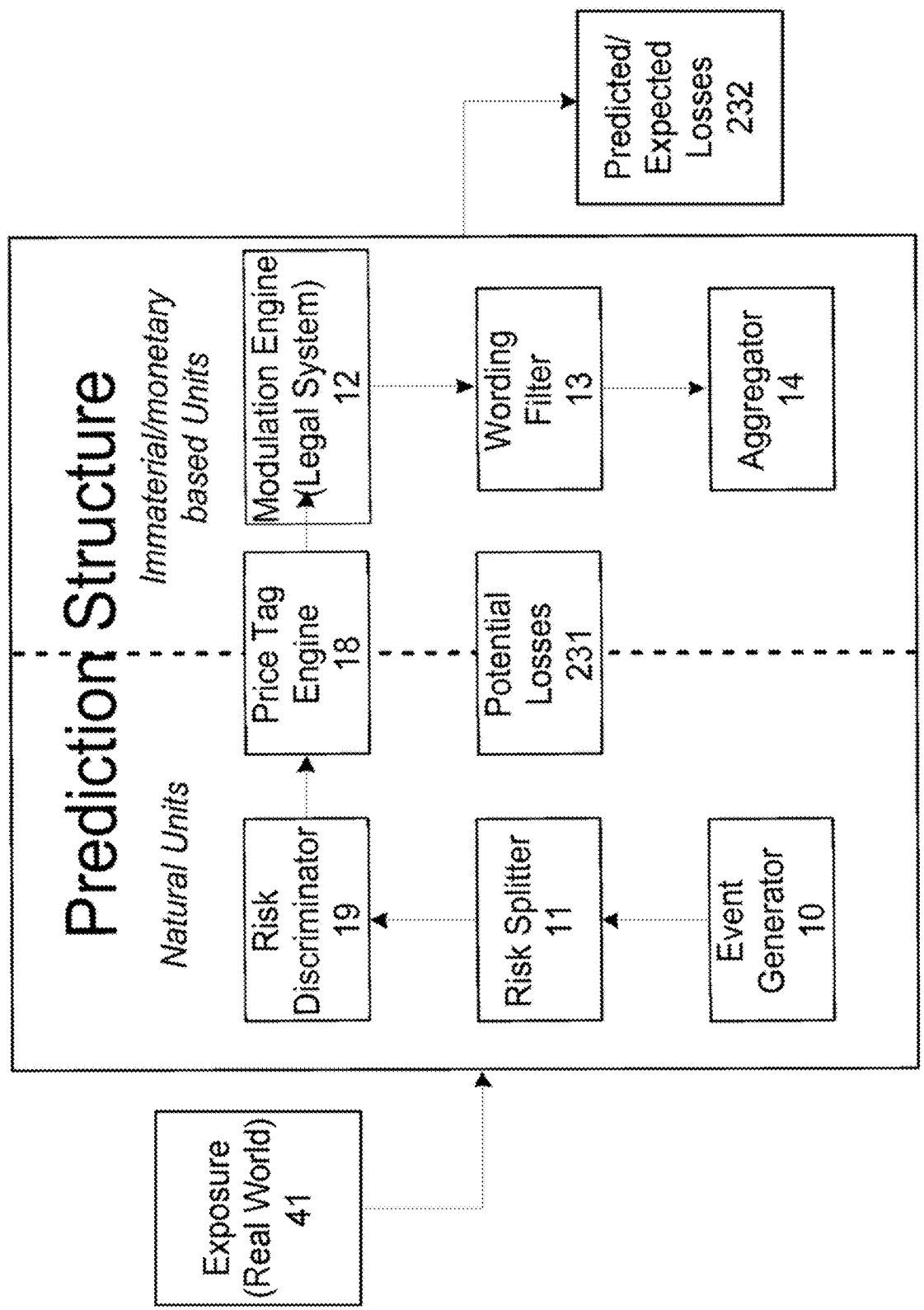
FIG. 2 shows a block diagram illustrating schematically an exemplary liability catastrophe prediction structure according to the present invention. The prediction structure of the system 1 allows to technically connect exposure measuring parameters with predicted measures for prospective loss quantifying parameters. The structure comprises the core components of (i) capturing and measuring of the exposure parameters 41 in the real world of a causing unit 4, The exposure parameters can, inter alia, comprise a measure for the size of the risk, the type of involved product or activity, the geographic extension, measures for the risk quality, limits and/or deductibles assigned to the risk-transfer as boundary conditions, and claims triggers; (ii) The event generator 10 with the type of product and/or activity as input; (iii) the risk splitter 11 related to geographic extension and/or size of risk; (iv) the risk discriminator 19 providing the impact of different loss preventions, human factors and possible new products or activities; (v) the price tag engine 18 incorporating dependencies based on different costs of living; (vi) means for the accumulation of a potential loss 231 measure based on measures for the likelihood/frequency, severity properties and temporal properties; (vii) the modulation engine 12 incorporating generation dependencies based on the type of liability, liability laws, and mass tort measures; (viii) the wording filter 13 incorporating limits and deductibles as well as claims trigger into the structure; (ix) aggregator 14 comprising for LLC events 10001 the clash aggregator 141 and for ULC events 10002 the accumulation aggregator 142. Based on the parts of the basic LRD modelling structure, it extends the structure by the innovation-specific characteristics of catastrophic loss-generating processes where a plurality of risk-tangible and exposed entities, which are part of a risk-transfer process, e.g. policyholders, are involved in an event. For the inventive technical structure 100, three types of risk accumulation sources are introduced: events structured by first scenarios 10001 (Limited Liability Catastrophes Scenarios, LLC) that involve several risk-exposed units where the loss burden may be split between them, complexes of related loss events structured by second scenarios 10002 (Unlimited Liability Catastrophes Scenarios, ULC) that have a common root cause, and external events structured by third scenarios 10003 (External Scenarios, ELC) characterized by factors affecting all or many losses changing over time. For the loss-generating processes and events, the inventive system provides generation of event-related loss distributions by mirroring the cause-effect chains, accounting for the multiple-defendant nature of liability catastrophes, and—in case of related losses such as asbestos—extending the events over space and time. Moreover, the connection is made to different risk measures accounting for various concerns related to losses spreading over larger time intervals, as e.g. years or even decades. Thus, the inventive system uses the basic liability risk driver modelling structure as basis and therefore consistently generates the bulk of losses by means of the basic liability risk driver modelling structure, catastrophic events (LLC), loss complexes (ULC), and risk accumulation due to changes in external factors (ELC). Prior art systems do not allow assessing the bulk of losses or the accumulation due to changes in external factors, as it is provided by the present system.

FIG. 2 schematically illustrates an architecture for a possible implementation of an embodiment of the inventive risk splitter 11 of an automated, liability risk driven system 1 for automated prediction and exposure signaling of associated, catastrophic risk-event-driven or -triggered systems; in particular, automated first- and second-tier risk-transfer systems 5/6 transferring risks of catastrophic or operational risk events with a complex, low frequency structure. System 1 is also applicable to other occurrence structures, for example high statistic events that have, however, an occurrence rate with a complex clustering structure. The inventive clash-quantifying, multi-risk assessment and measuring system 1 in combination with the signaling of the automated risk-transfer systems 5/6 allow providing a new way of automated protection against accumulating casualty loss and earnings volatility based on measurably occurring risk events technically using a structured forward-looking approach triggering and quantifying risk-transfer parameter provided policy clash. Occurring risk-events are measured by means of measuring stations or sensors 53 in loco and/or by satellite image processing and/or by other technical measuring processes. The measuring stations or sensors 53 can e.g. be realized as part of the system 1 and/or one or both of the automated risk-transfer systems 5/6. The measured sensory data of the measuring devices 53 are transmitted via an appropriate data transmission network 7 to the central, multi-risk assessment system 1, comprising e.g. an electronic, control unit controller 16 for processing of the captured electronic data 531, and assigned to a historic set comprising event parameters for each assigned risk-event. To capture and measure the appropriate measured sensory data 531, the central control unit controller 16 can e.g. comprise a risk-event driven core aggregator 163 with measuring data-driven triggers for triggering, capturing, and monitoring in the data flow pathway of the sensors and/or measuring devices 53 of the risk-exposed and affected units or individuals 3. The sensors and/or measuring devices 53 can, e.g., comprise technical measuring devices as e.g. seismometers or seismographs for measuring any ground motion, including seismic waves generated by earthquakes, volcanic eruptions, and other seismic sources, stream gauges in key locations across a specified region, measuring during times of flooding how high the water has risen above the gauges to determine flood levels, measuring devices for establishing wind strength, e.g. according to the Saffir-Simpson Scale, sensors for barometric pressure measurements and/or ocean temperature measurements, in particular the temperatures of ocean surface waters and thereby determining the direction a hurricane will travel and a potential hurricane's intensity (e.g., by means of floating buoys to determine the water temperature and radio transmissions back to a central system), and/or satellite image measurements estimating hurricane strength by comparing the images with physical characteristics of the hurricane.

For the automated measurement and assessment of multi-risk exposures featuring quantifiable clash effects induced by occurring risk events 2, liability catastrophes 21 and casualty accumulations 22, the parsed, clash-quantifying, multi-risk assessment system 1 is technically based on a structured forward-looking cause-effect chain with parsed parameter data space. A plurality of affected units 3 are subject to the risk exposure of the occurring risk events 2 caused by one or a plurality of causing liability risk exposed units 4. At least a portion of the risk-exposure of the plurality of causing liability risk exposed units 3 is absorbed by at least one automated first-tier risk-transfer or insurance unit 5, i.e. a risk assembler unit, based on defined first risk-transfer parameters 51, defined for a defined time window 52. The risk measurement is based on systematic quantifying and scenario-based capturing of risk driven measuring factors 42.

The system 1 comprises an event generator 10 having a multi-dimensional data structure 101 holding predefined accumulation scenarios 102. The multi-dimensional data structure 101 comprises a first accumulation scenario data structure 1011 for capturing first frame parameters 10112 of first scenario loss events 10111, the first frame parameters 10112 defining risk events 10111 with a limited geographic impact range 101121, with a short duration time window 101122, with a plurality of affected units 3 affected by the impact 23 of the occurring risk events 2, and with a plurality of causing risk exposed units 4 affected by a loss burden 24 associated with the impact 23 of the occurring risk events 2. Thus, the events 10111 of the first scenarios, herein also referred as limited liability catastrophe scenarios events, take place in a limited time period and only have a limited geographic extension. The typical characteristics of a first scenario comprise one loss event with a short duration time, several affected units 3 affected by potentially multiple industries, i.e. causing liability risk exposed units 4, wherein the loss burden may split over several causing liability risk exposed units 4 as policyholders. Real world examples of such events are the deepwater horizon, the Viareggio train derailment or the fire in the Mont Blanc tunnel.

Further, the multi-dimensional data structure 101 comprises a second accumulation scenario data structure 1012 for capturing second frame parameters 10122 of second scenario loss events 10121, the second frame parameters 10122 defining risk events 10121 with a global geographic impact range, with a, extended duration time 101222 of unfolding of the event impact, and with an extended number 101222 of causing risk exposed units 4. Thus, the events 10121 of the second scenarios, herein also referred as unlimited liability catastrophe scenarios events 10121 typically last over a long period of time, typically many years and over large regions up to the whole world. The typical characteristics of a second scenario comprise a complex of loss events having a common root cause, several causing liability risk exposed units 4 as policyholders affected, the loss events spread over space and time, and potentially multiple industries, i.e. causing liability risk exposed units 4 involved. Real world examples of such events are asbestos, Bisphenol A (BPA), or electromagnetic fields (EMF).

Finally, the multi-dimensional data structure 101 comprises a third accumulation scenario data structure 1013 for capturing third frame parameters 10132 defining third scenario risk events 10131 impacting the first and second scenario risk events 10111/10121 with external influences, the third frame parameters 10132 capturing external influence measures impacting at least frequency 101321 or severity 101322 of the impact of the occurring risk events. The external scenarios influence the loss once the event 10131 has occurred. An external scenario 10131 does not only influence catastrophic losses but can have an impact on any size of severity. Moreover, it is not specific to liability losses, impacting instead systematically all losses and all sides of the parameter of the balance sheet of a risk-transfer or a portfolio of risk-transfers. The typical characteristics of a second scenario comprise an external development, and an impact on frequency and/or severity of various claims caused by the risk event. Real world examples of such events are e.g. law changes, unforeseen changes in life expectancy, or inflation. The present invention generate losses for all participating (affected) activities and distributes these losses to all causing activities. Additionally, the present invention allows forecasting or modelling how the event evolves over time.

Figure 5:
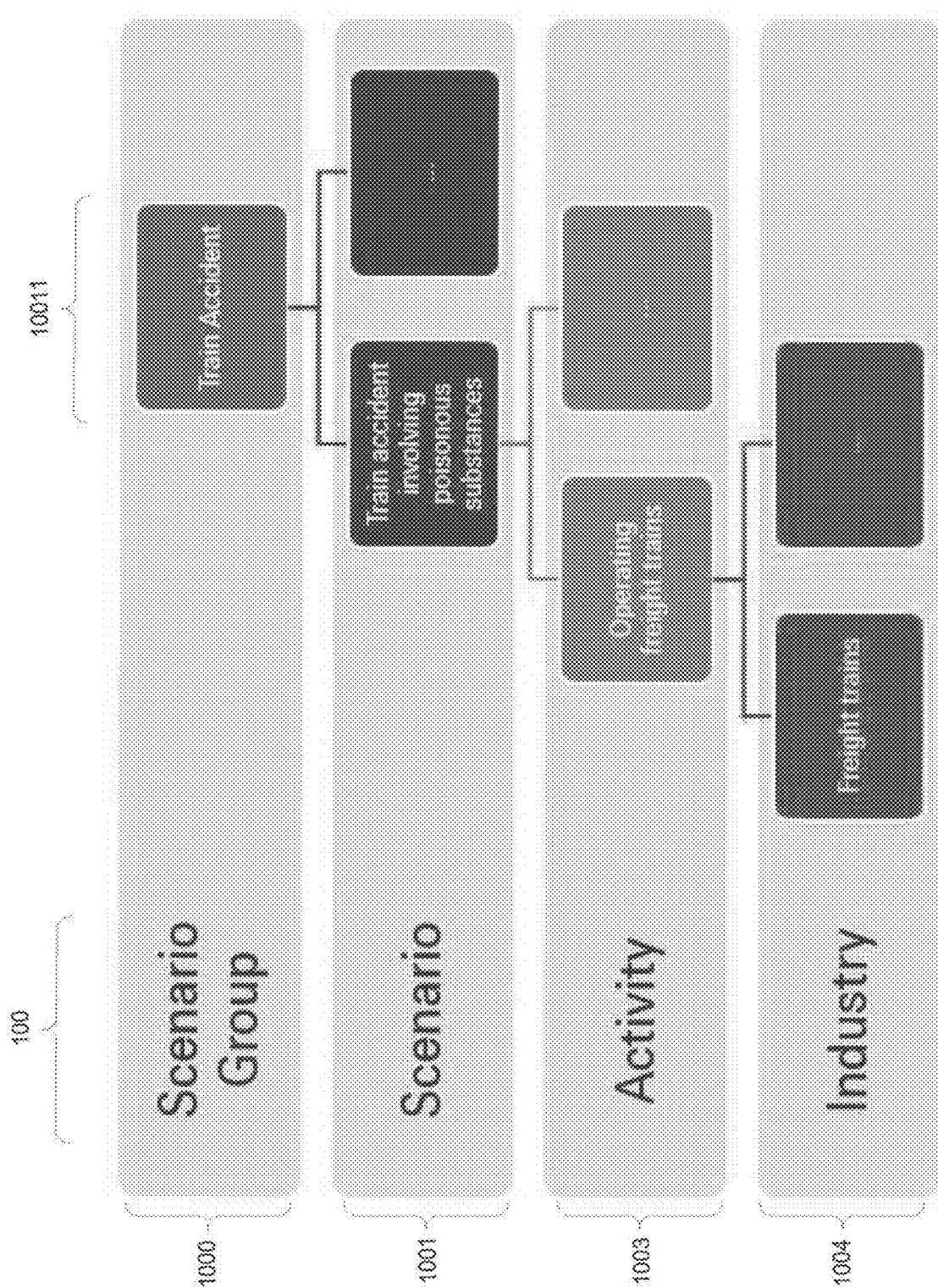
FIG. 5 shows a diagram illustrating schematically an exemplary the dependencies within the structure, wherein scenario industry type 1004 depend on activity 1003 depend on scenario 1001 depend on scenario group 1000.
Figure 6:
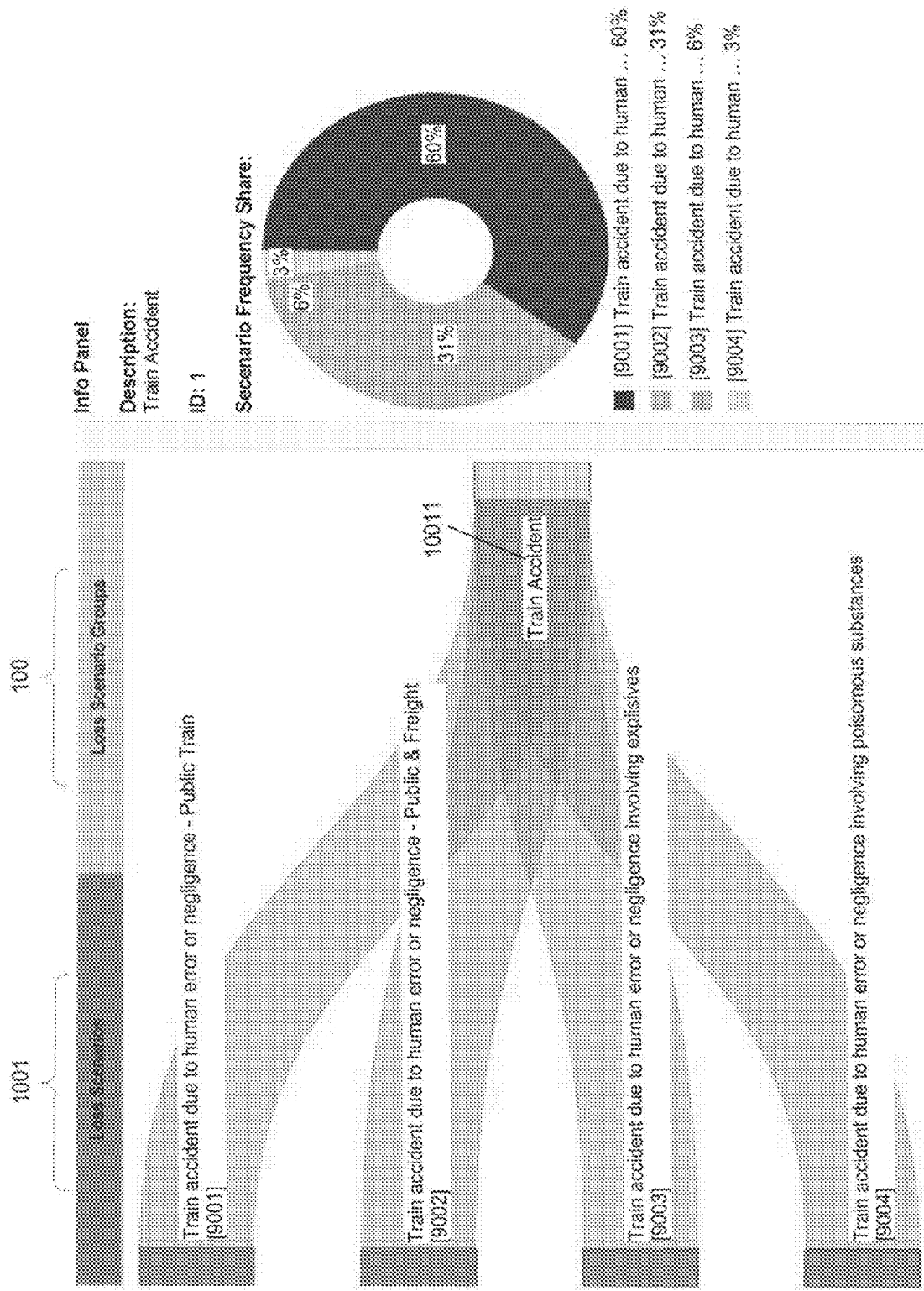
FIG. 6 shows a diagram illustrating schematically an example of a scenario group 1000 to scenario 1001 process, in particular the actual scenario group 'train accidents' 100011 and its four scenarios. In general, each scenario group 1000 contains one or more scenarios 1001. An example for a scenario group is the 'train accident' scenario group 100011 of FIG. 6. The corresponding scenarios 1001 are for example a passenger train accident, a freight train accident that transports explosive substances.

The multi-dimensional data structure 101 can e.g. further comprise a selectable data-structure for grouping and categorizing the defined scenarios 10110/10120/10130 into groups 10001/10002/10003, wherein each scenario group 10001/10002/10003 contains one or more scenarios 10110/10120/10130 providing a hierarchical composition structure for the generation of risk events 1002 of scenario group 1000—scenario 1001—activity link member 1003—class/industry 1004. The first scenario groups 10001 can e.g. comprise a train accident scenario group 100011 and/or a premises disaster scenario group 100012 and/or a construction disaster scenario group 100013 and/or a utility catastrophe scenario group 100014 and/or a food industry catastrophe scenario group 100015 and/or an event disaster scenario group 100016. The train accident scenario group 100011 can comprise major accidents that involve trains. This includes passenger trains as well as freight trains. Causes include faulty track maintenance, human error or objects on train tracks. The effects range from injured passengers, destroyed trains and infrastructure to major explosions. Additionally, environmental damage may occur if poisonous substances are transported. The premises disaster scenario group 100012 can comprise a major accident, typically an explosion on the premises of a factory or storage facility. Additionally, there is a scenario for mining disasters and a fire scenario for a building with many visitors. Consequences can include environmental damage. The construction disaster scenario group 100013 can comprise any disaster that is caused due to the construction of a building including houses, tunnels etc. The scenario includes collapse of the building itself as well as surrounding property. The utility catastrophe scenario group 100014 can e.g. comprise any disaster that involves a utility site. Consider, for example, brush fires caused by powerlines, contaminated drinking water, gas explosion. The food industry catastrophe scenario group 100015 can e.g. comprise any major event caused by unhealthy food due to a production error. This includes bacteria or poisonous substances, but also wrongly added substances like peanuts that cause allergies or missing substances like vitamins. The event disaster scenario group 100016 can e.g. comprise a disaster that happens during a large public event. The accidents might be caused by the outbreak of panic and missing or insufficient escape routes. The structure of LLC scenarios can be looked at as a tree graph. It contains scenario group-scenario-activity-industry/causing unit 4. Each scenario group contains one or more scenarios (see FIG. 5). Examples for a scenario group is 'Train accident'. The corresponding scenarios are for example a passenger train accident, a freight train accident that transports explosive substances.

The second scenario groups 10002 can e.g. comprise a nanomaterials scenario group 100021 and/or an endocrine disruptors scenario group 100022 and/or a building materials scenario group 100023 and/or a food overconsumption scenario group 100024 and/or a pharmaceuticals scenario group 100025 and/or a professional lines scenario group 100026, wherein the food overconsumption scenario group 100024 comprise a food additives scenario group 1000241 and/or unhealthy food scenario group 1000242 and/or functional food scenario group 1000243. The third scenario groups 10003 can e.g. comprise an economic scenario group 100031 and/or a biometric scenario group 100032 and/or a legal scenario group 100033. The second scenario groups 10002, short ULC scenarios have a similar structure of Scenario Group to Scenario like the LLC scenarios have. For ULC scenarios 10002, this allows to combine several specific originators into a scenario group. For example, Bisphenol A (BPA) is part of Endocrine Disruptors. This way, the modelling structure can generate the specific BPA event, but also the whole group of Endocrine Disruptors. The nanomaterials scenario group 100021 can e.g. comprise particles in the atomic and molecular scale that are used in consumer goods and technical installations. They might be potentially toxic to humans and the environment. Most commonly used nanomaterials are based on silver, carbon, titanium and silica. The endocrine disruptors scenario group 100022 can e.g. comprise chemicals that may interfere with human hormone system. High number of possible substances and consequences (e.g. birth defects, cancer, impaired brain development). Use of these chemicals is very widespread. The building materials scenario group 100023 can e.g. comprise substances that are harmful to workers during construction or afterwards to the inhabitants. Apart from health effects, there might also be costs for removal of material and diminution of value of buildings. Typically building materials are used globally and thus effects could be very widespread. The food overconsumption scenario group 100024 can e.g. comprise overconsumption of food in general, and substances such as sugar, fat and dietary salt in particular, is linked to obesity and higher risks for diseases such as cancer, diabetes and cardiovascular diseases. At present the number of successful claims is low but this could change in case of legal alterations or new scientific evidence. The pharmaceuticals scenario group 100025 can e.g. comprise substances that are used in the diagnosis, cure, mitigation, treatment or prevention of disease. The pharma industry is one of the largest industries in terms of sales and consumers. While there is the risk of adverse impacts from an active pharmaceutical substance, there are in addition also systemic risks (e.g. adverse effects 1143/934 from a tablet coating substance that is used industry wide for all kinds of drugs). The professional lines scenario group 100026 can e.g. comprise insurance for directors and officers or companies and individuals providing professional advice and services; particular accumulation potential in economic downturns.

The second scenario groups 10002, i.e. the ULC scenario groups, can be seen as an extension of the LLC scenarios in time and space. The most important aspects of the ULC scenarios are (i) the activity chain: The activity chain connects the various activities 1003 belonging to a ULC scenario 1001. This is needed to derive which persons are involved and is the foundation for the temporal development of a claim; (ii) the population engineering or modelling structure: The population engineering structure generates the number of people being exposed. If, for example, workers are exposed, it derives how many workers are actually exposed over time; (iii) the evidence modelling structure: The evidence modelling structure simulates the evidence required in a legislation with the evidence collected to prove a cause-effect relationship; and (iv) the latency modelling structure: The latency modelling structure deals with the question around how long it takes for an exposed to develop adverse effects 1143/934.

Figure 9:
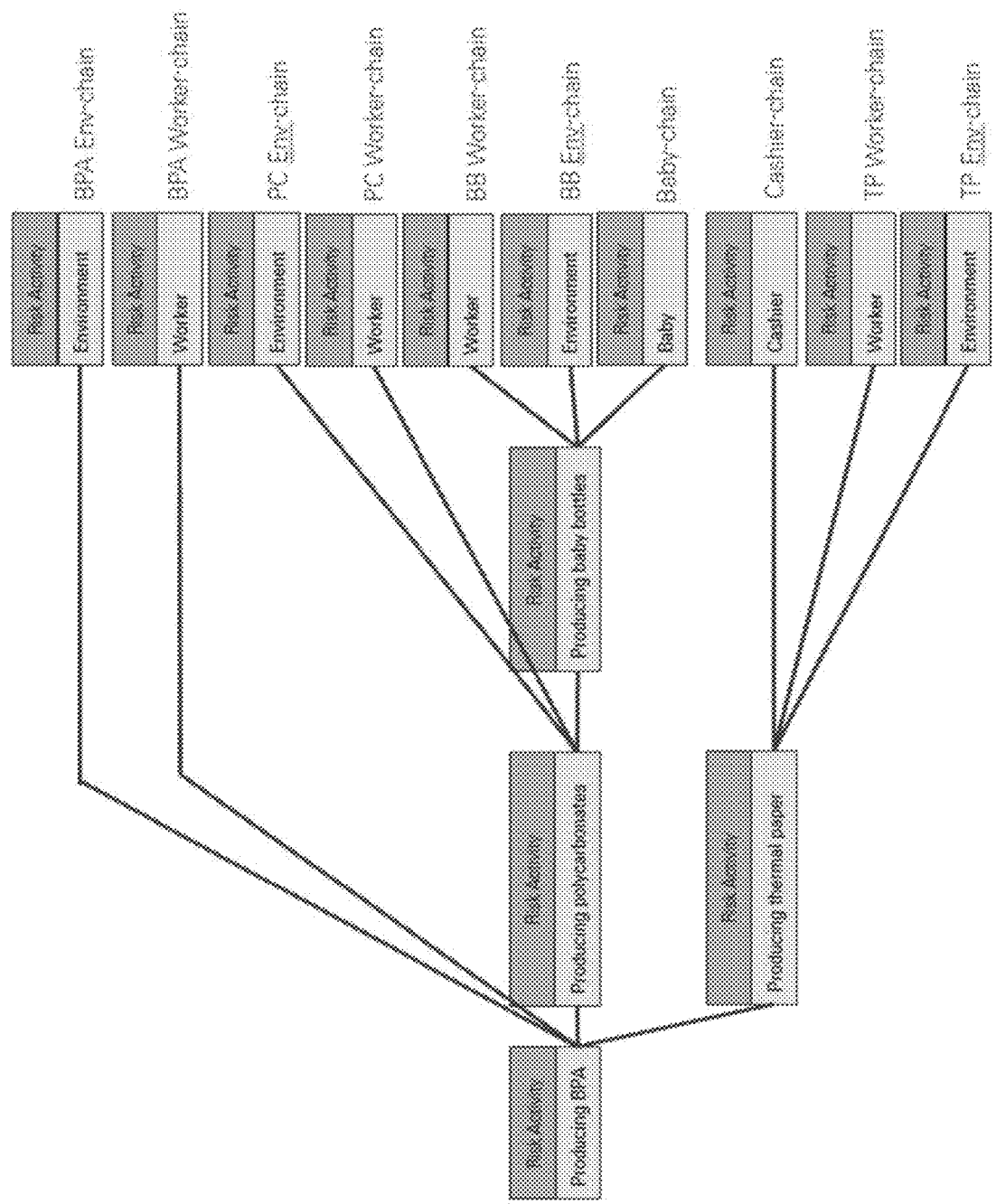
FIG. 9 shows a diagram illustrating schematically a real world example of the activity chain 100 for BPA. Bisphenol A is an organic synthetic compound with the chemical formula $(CH_3)_2C(C_6H_4OH)_2$ belonging to the group of diphenylmethane derivatives and bisphenols, with two hydroxyphenyl groups. It is a colorless solid that is soluble in organic solvents, but poorly soluble in water. It has been in commercial use since 1957. It starts from producing the actual originator (raw chemical 'bisphenol-A') to its various uses (in bottles, thermal paper, etc.). Studies indicate that BPA can seep into food or beverages from containers that are made with BPA. Exposure to BPA is a concern because of possible health effects of BPA on the brain, behavior and prostate gland of fetuses, infants and children. Additional research suggests a possible link between BPA and increased blood pressure. In the context of ULC specifics: BPA is suspected to cause endocrine disruption, and via the depicted channels, the risk accumulates over all groups (both causing and affected).

As mentioned, the activity chain structure 100 (herein also structured cause-effect chain) connects the various activity link members 1003 (short activity 1003) of a ULC scenario into flow of how an originator technically is handed over from activity 1003 to activity 1003. In each of these activities 1003, a different kind of exposure group 1000 can be affected. For a real world example when producing an originator, usually workers are influenced. When the originator ends up in a product, consumers are affected. Please note that the environment technically is also considered as an affected activity 1003: FIG. 9 shows the activity chain 100 for BPA (Bisphenol A has been applied in industry since 1957). It starts from producing the actual originator (raw chemical 'bisphenol-A') to its various uses (in bottles, thermal paper, etc.). BPA is a starting material for the synthesis of plastics, primarily certain polycarbonates and epoxy resins, as well as some polysulfones and certain niche materials. BPA-based plastic is clear and strong and is made into a variety of common consumer goods, such as plastic bottles including water bottles, sports equipment, CDs, and DVDs. Epoxy resins containing BPA are used to reline water pipes (In a cost-effective rehabilitation technology, the insides of pipes are relined with organic polymer. A commonly used polymer is epoxy resin consisting of monomer bisphenol A (BPA)), as coatings on the inside of many food and beverage cans and in making thermal paper such as that used in sales receipts. In 2015, an estimated 4 million tons of BPA chemical were produced for manufacturing polycarbonate plastic, making it one of the highest volume of chemicals produced worldwide. BPA is a xenoestrogen, exhibiting estrogen-mimicking, hormone-like properties that raise concern about its suitability in some consumer products and food containers.

Figure 10:
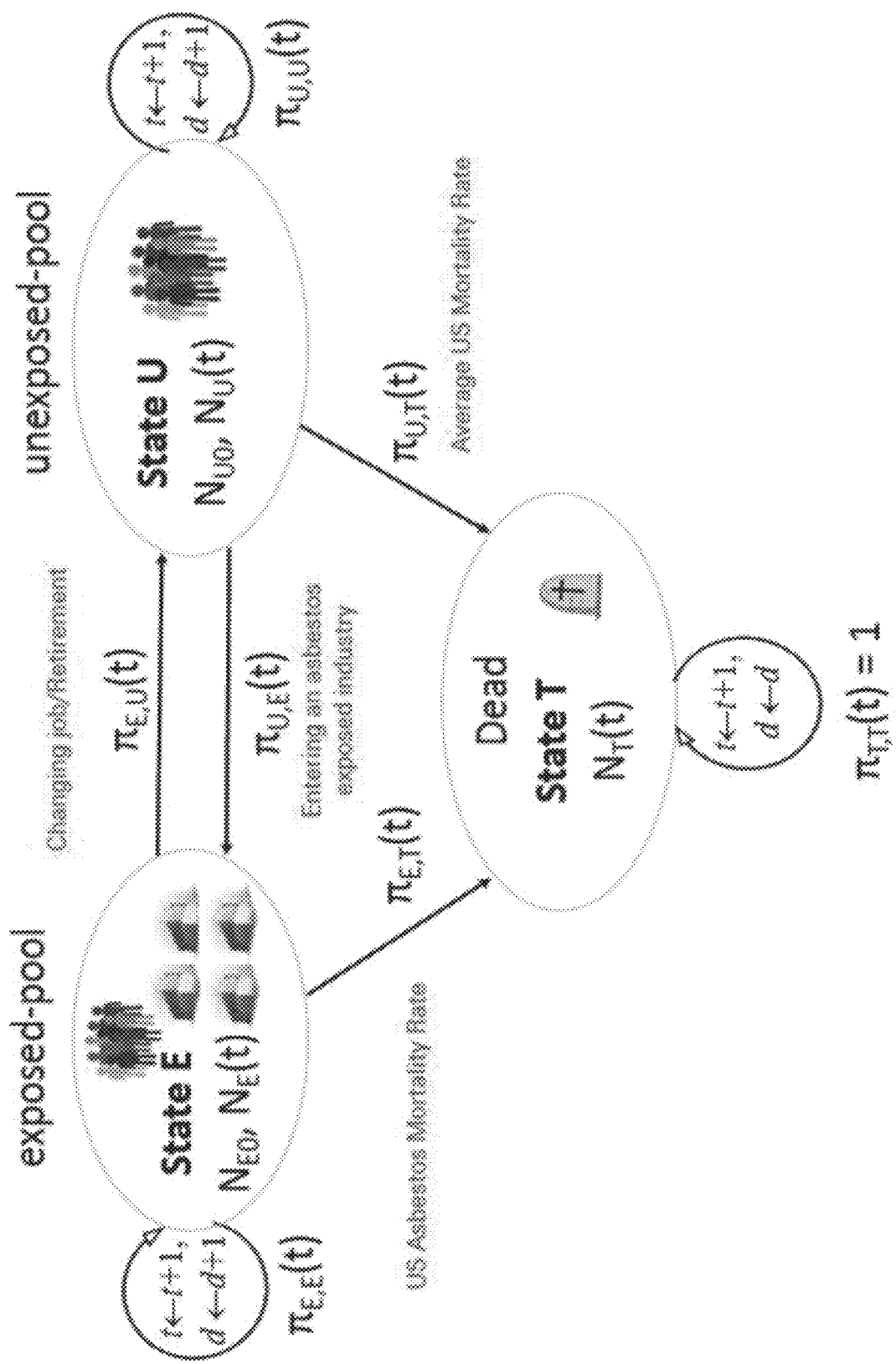
FIG. 10 shows a diagram illustrating schematically a real world example of a technical population modelling sketch structure for workers. It shows (i) the exposed pool: Persons that are exposed to a given originator. Persons can enter this pool from the unexposed pool. The can also leave the pool because they change their jobs or go into retirement or because they die; (ii) Unexposed pool: Persons not being exposed. However, it is possible that they enter the Exposed Pool; and (iii) Dead: So far, no scientific proof of people leaving the Dead Pool has been found.

As for the population engineering structure 93, the exposed population engine 93 with its population engineering structure is to track the pool of potential claimants for a given Unlimited Liability Catastrophe. In other words, the population modelling engine generates a forward-looking value how many people are exposed because they are part of a certain activity. For a given activity 1003, the population engine captures the following aspects: (i) Due to what are the persons exposed? For example, because they work in a factory where the originator is used? Are they consumers?; (ii) For each of these possibilities, the model calculates the number of exposed persons over time; (iii) In case the persons are workers in a factory, the model looks how many people are actually exposed considering the industries the originator is used and how many persons do work in this area; (iv) The model also calculates how long such persons are typically involved. Some people might leave their job, some die and others freshly take up such a job. This is also key for the temporal development of the exposure group. A sketch of the forward-looking population structure for workers can be seen in FIG. 10. It shows (i) the exposed pool: Persons that are exposed to a given originator. Persons can enter this pool from the unexposed pool. The can also leave the pool because they change their jobs or go into retirement or because they die; (ii) Unexposed pool: Persons not being exposed. However, it is possible that they enter the Exposed Pool; and (iii) Dead: So far, no scientific proof of people leaving the Dead Pool has been found. In summary, the population engine generates a predictive value for the pool, or number, of potential claimants over time. This pool is the basis to generate all losses which are correlated.

Evidence modelling structure 941 (FIG. 4) generates a value for how long it takes from the first usage of an originator until there is sufficient scientific evidence of its danger. The model also assumed that once evidence is given, all exposure of the originator stops because it is no longer legal to use the substance. The current model is actually very crude and simply takes a fixed time period depending on the scenario, but the time period is the same worldwide.

Figure 11:
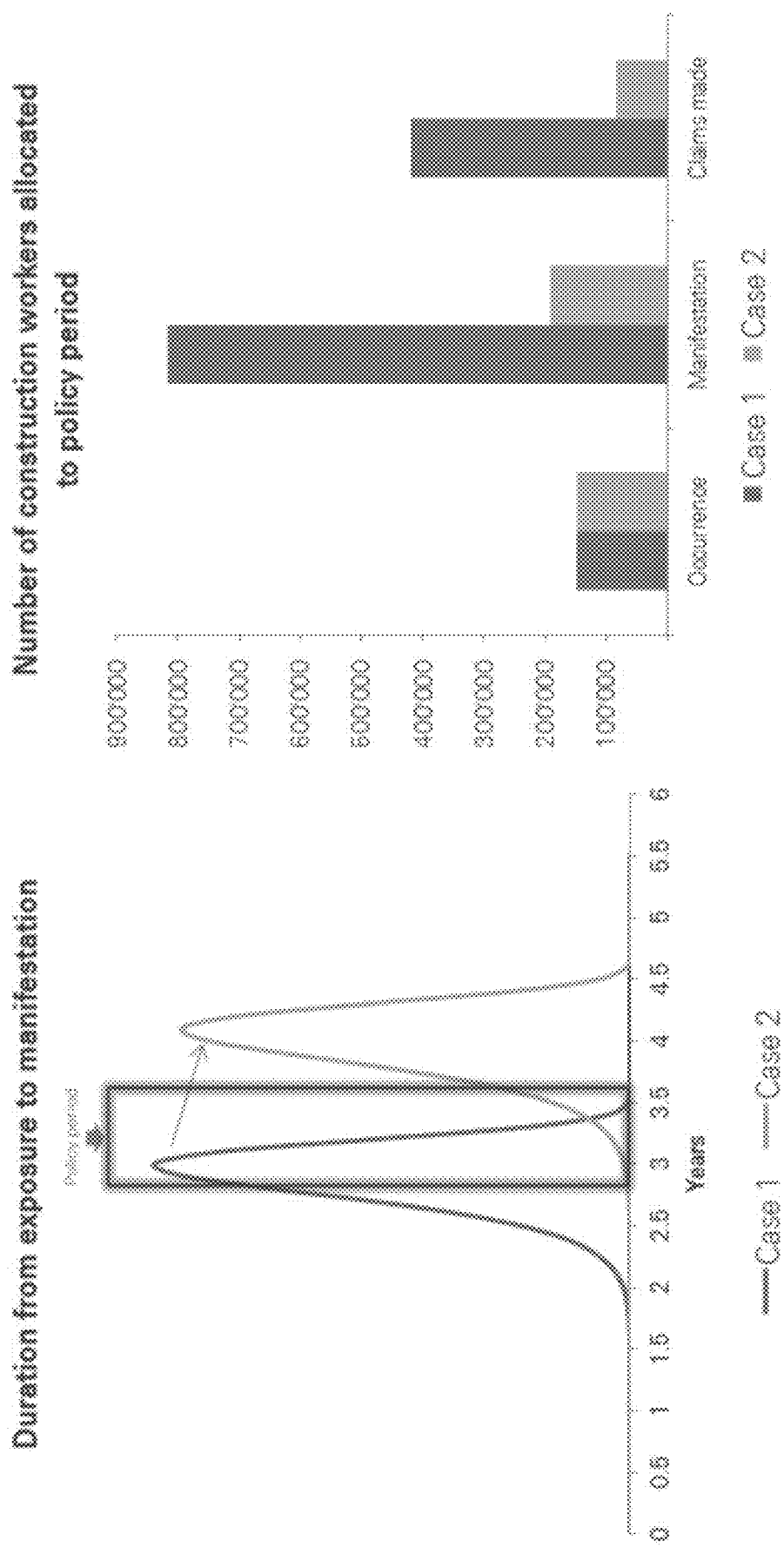
FIG. 11 shows a diagram illustrating schematically a real world example of the influence of the latency parameter. The example shows two different latencies (Case 1 and Case 2). The left figure shows the distribution of how many workers are affected over time. The figure on the right shows how the resulting claims will be allocated to different claims triggers (occurrence, manifestation and claims made) for the two cases.

For the manifestation latency structure 931, the latency is the time between exposure and manifestation. Each individual as part of the exposed population can have its own history of exposure to an originator or history of manifestation of adverse effects 1143/934. The manifestation latency modelling structure 931 deals with the question around how long it takes for an exposed individual to develop adverse effects 1143/934 (e.g. how long does it take for a smoker to develop cancer?). The influence of the latency parameter is shown in FIG. 11. The example shows two different latencies (case 1 and case 2). The left figure shows the distribution of how many workers are affected over time. The figure on the right shows how the resulting claims will be allocated to different claims triggers (occurrence, manifestation and claims made) for the two cases.

The loss and claim trigger structure 25 of the system 1 is technically critical. Three different kind of claims trigger are realized: (1) Occurrence detected/notified 251: Temporarily allocates an individual loss by the date the loss is detected or the causing liability risk exposed units 4 (i.e. the insured) notifies automated first-tier risk transfer system 5, i.e. the insurer, of a (potential) loss; (2) Manifestation trigger 252: Risk transfer parameters, e.g. assigned to a policy, covering claims that arise out of a damage or injury that took place during the policy period; and (3) Claims made trigger 253: Temporarily allocates an individual loss by the date the claim against the insured has been made. Since there are different kinds of claims triggers in risk transfer settings and these possibly over many years, it is important to select the correct risk-transfer parameters for a given time period.

ULC scenario groups 10002 are implemented with a similar structure of scenario group 1000 to scenario 1001 like the LLC scenario groups 10001, as discussed above. For ULCs, 10002 this allows to combine several specific originators into a scenario group 1000. For example, Bisphenol A (BPA) is part of Endocrine Disruptors. This way, the modelling structure can generate the specific BPA event, but also the whole group of Endocrine Disruptors. As first ULC scenario groups 10002, the following groups 1000 can e.g. be defined: (i) Nanomaterials 100021: Particles in the atomic and molecular scale that are used in consumer goods and technical installations. They might be potentially toxic to humans and the environment. Most commonly used nanomaterials are based on silver, carbon, titanium and silica; (ii) Endocrine disruptors 100022: Chemicals that may interfere with human hormone system. High number of possible substances and consequences (e.g. birth defects, cancer, impaired brain development). Use of these chemicals is very widespread; (iii) Building Materials 100023: Substances that are harmful to workers during construction or afterwards to the inhabitants. Apart from health effects, there might also be costs for removal of material and diminution of value of buildings. Typically building materials are used globally and thus effects could be very widespread; (iv) Food overconsumption 100024: Overconsumption of food in general, and substances such as sugar, fat and dietary salt in particular, is linked to obesity and higher risks for diseases such as cancer, diabetes and cardiovascular diseases. At present the detected number of successful claims is low but this could change in case of legal alterations or new scientific evidence; (v) Pharmaceuticals 100025: Substances that are used in the diagnosis, cure, mitigation, treatment or prevention of disease. The pharma industry is one of the largest industries in terms of sales and consumers. While there is the risk of adverse impacts from an active pharmaceutical substance, there are in addition also systemic risks (e.g. adverse effects 1143/934 from a tablet coating substance that is used industry wide for all kinds of drugs); and (vi) Professional lines 100026: Insurance for directors and officers or companies and individuals providing professional advice and services; particular accumulation potential in economic downturns.

To illustrate how scenarios 1001 are linked to a scenario group 1000, the scenarios for the 'food overconsumption' scenario group 100024 are listed exemplarily below: (i) Food additives 1000241: Food additives are substances added to food to preserve flavor or enhance its taste and appearance and are regulated as such by respecting regulatory authorities. If certain food additives would turn out to be harmful to human health or the environment, a lot of different food manufacturing steps and products and thus workers as well as end consumers could be affected; (ii) Unhealthy food 1000242: Foods containing high amounts of sugar, fat or dietary salt are commonly regarded as unhealthy and linked to health issues such as obesity, diabetes or high blood pressure. Producers of such unhealthy foods have been sued (so far mostly unsuccessfully) by consumers that see a connection between their bad health and the consumption of these food products; and (iii) Functional food 1000243: Functional Food is food that has components or ingredients added to give it a specific medical or physiological benefit other than a purely nutritional effect. Medical adverse effects 1143/934 from functional food could affect many end consumers. Misleading advertisement: Food advertisement can be misleading and deceive consumers by for example making a product appear healthier than it is. There have been some successful claims against food manufacturer in this regard, but the compensations are generally very low (i.e. refund for the price paid but no additional compensation for pain and suffering).

Figure 12:
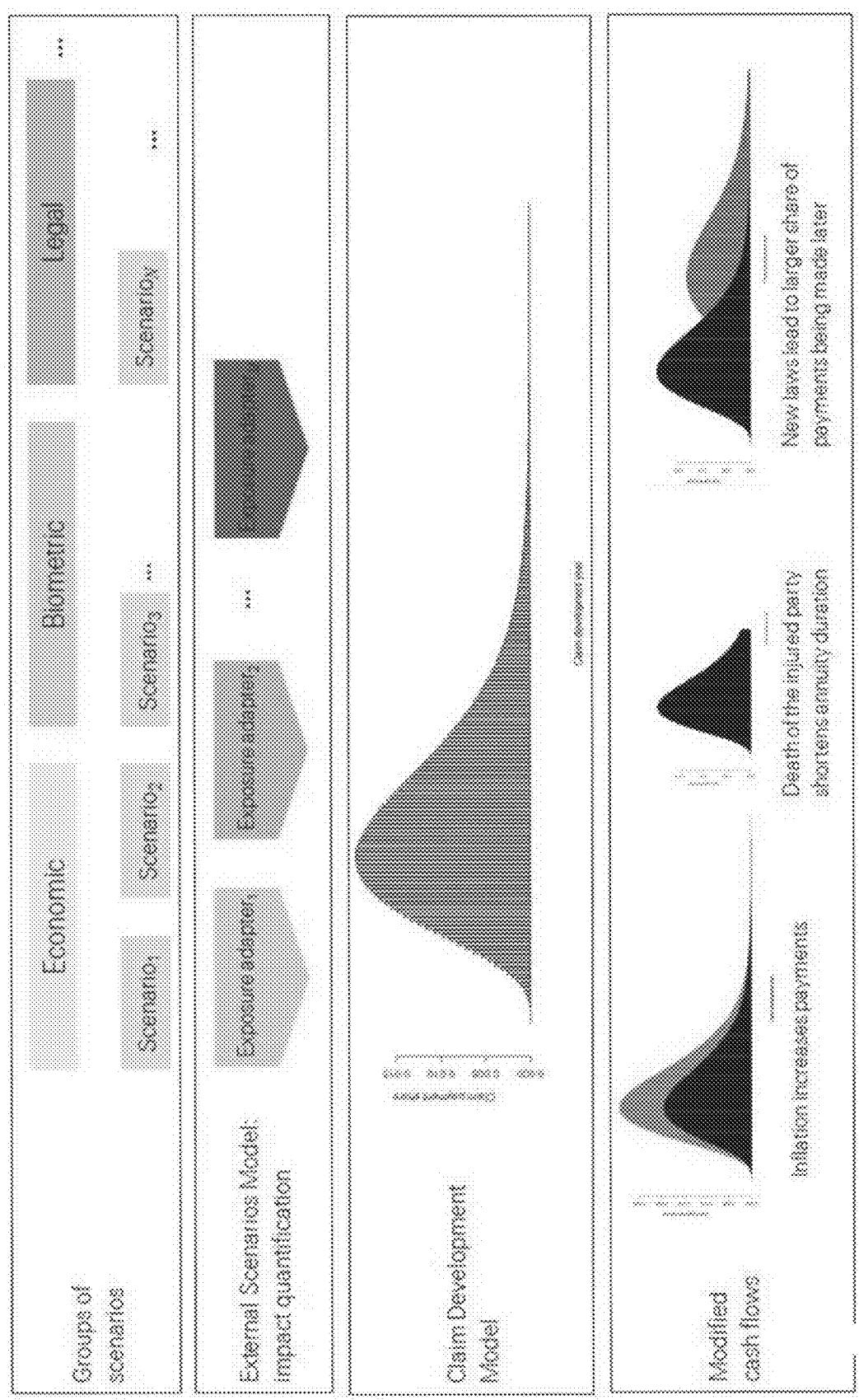
FIG. 12 shows a diagram illustrating schematically an external scenario 10003 schema, wherein external scenarios are structured to provide scenarios that one or several risk driver(s) will evolve in a way differing from the best estimate. External scenarios 10003 do not have an influence on the original loss scenarios themselves, but on the consequences of loss events 2 related to them.

In the system 1, external scenario groups ELCs 10003 are defined as scenarios 1001 that one or several Risk Driver(s) will evolve in a way differing from the best estimate (see FIG. 12 giving an exemplary external scenario 10003 structural scheme). External scenarios 1001 do not have an influence on the original loss scenarios themselves, but on the consequences of loss events related to them. For example, a major explosion of a factory may cause 20 deaths. This is not going to be changed by an external scenario. But the monetary liability loss of the event might vary substantially due to a change in inflation, willingness to sue, legal changes etc. Scenario types as provided by the ELC scenario group 10003 can e.g. comprise: (i) Economic scenarios 100031: Economic scenarios change the economic and financial environments in which the claim develops. Classical examples include inflation and interest rate changes. Although in general economic scenarios do not change the nature of a liability loss, through various forms of indexation (e.g., linking annuity payments to inflation rates) economic scenarios can change the form of the claim payment cash flow. More typical of such scenarios is an impact on the present value of a liability portfolio; (ii) Biometric scenarios 100032: Biometric scenarios are defined as developments that affect health and survival of people. Two primary effects are foreseen at the moment: (1) When introduced via mortality rates, such scenarios affect the survival of affected, and hence the duration of annuity payments. (2) When introduced via morbidity rates such scenarios affect the level of injury/disability, and hence the size of a claim; (iii) Legal scenarios 100033: Legal scenarios change the legal environment in which the claim develops. This is the most general of the three groups considered at the moment, and one where the largest variety of cases and most complex modelling is expected.

Therefore, an explicit reliance on the time dimension of a claim is shared by all three scenario groups 10001/10002/10003. The basic liability risk driver structure does not explicitly account for the development of claims over time. Rather, having identified the time when a claim is made, the overall claim amount is treated as an aggregate over all of its development years. By their very nature, however, (1) economic and biometric scenarios develop over time, and (2) legal scenarios tend to have a well-defined calendar year component (laws are passed at a given point in time). Overall, technically, such scenarios 1001 cannot be introduced without a claim development modelling structure unless by relying on experts to quantify their impacts.

Correlations, dependencies or associations (e.g. clash events) whether causal or not, between two parameters or bivariate data, are a huge problem in automated predictive modelling structures. As correlation, any statistical association is understood, i.e. how close two variables are to having a linear relationship with each other. In the prior art, the occurrence of loss events is usually modelled or simulated or otherwise predictive generated on an individual risk basis using a frequency-severity structure. However, this approach doesn't allow clash effects of risk-transfers to be modelled and generates tails that are too thin for any capital-related prediction. On the first-tier of risk transfer system 5 the clash effects may not be controllable for automated systems 5. Thus, on the second-tier of risk transfer system 6, risk-transfer parameters may be dedicated to capture casualty "clash" second-tier (reinsurance) risk-transfer coverage protecting first-tier of risk transfer system 5 (insurers) from accumulations which can arise when multiple causing liability risk exposed units 3, e.g. insured firms or multiple lines of coverage (for one or more insured firms), are involved in the same loss or impact by the same occurring risk event. For casualty clash, there are several factors which conspire to make it considerably more complex than clashes in other technical fields of modelling structures.

Regarding the definition of aggregation, accumulation and clash, used to define the technical structure of system 1, it is important to have a look at the various viewpoints. The causing liability risk exposed unit 4 has a an 'original policy' defining appropriate risk-transfer parameter sets. Depending on the set, this can already allow limited loss aggregation within the original policy. Herein, it is referred to this as original policy loss aggregation. For example, a product failure can lead to a series of claims, all covered as one loss occurrence within a single policy. On the second tier risk-transfer, clashes can involve an accumulation of risks from multiple policies in portfolios due to one of the following casualty accumulation scenario types: (i) Classic clash: Where a variety of claims arise following a sudden event or occurrence such as general liability, employer's liability and professional indemnity claims following a building collapse. This can involve: (1) a single insured across multiple classes; (2) multiple insureds across single or multiple classes. Cases involving a single insured and single class are more likely to be serial aggregations rather than clash losses; (ii) Serial aggregation: Where a defect in the design or manufacture of a product causes multiple losses, which are all clearly linked back to the one problem; (iii) Business disaster: Where multiple PI and D&O losses arise as the result of a single corporate failure (e.g. Lehman Brothers or Enron). Since the failure of a firm is normally sudden, there has been a lot of disagreement historically over whether or not this constitutes an event under standard clash coverage; and (iv) Systemic loss: Where a repeatable process/procedure (rather than a single product) or industry/business practice results in a series of losses (e.g. subprime lending, options backdating or IPO laddering).

There are several types of risk-transfer parameter-based loss aggregation when applying a second-tier structure. These can be referred to as types of clash parameter settings. The four main types are: (i) event, (ii) common cause, (iii) originating cause, and (iv) related loss.

The term "event" itself, as used herein, is intended to relate to something that is very narrowly time and space specific (of a sudden and unexpected nature). The term "event" (see (i)) is often substituted by the term "occurrence", and the two are often viewed as interchangeable. Herein, the specific term "event" is used, although precedence around both is that they are something sudden and cannot be gradual or on-going conditions. Clash second-tier risk-transfer settings/contracts often define terms such as "loss or series of losses" and "arising out of one event". This is important that the cause of the losses must be a time/place specific event and not their consequences. In products liability risk transfers, this is explicitly recognized by incorporating aggregation provisions such as "batch clauses", which allow the grouping of losses that are not time/place specific but arise from a defect which impacts a single batch of a product. Terms such as "directly occasioned by" and "caused by" are potentially narrower than "arising out of", implying more directness in the link between the causal event and the various original insurance losses that the second-tier reinsured is presenting to the Clash Ultimate Net Loss (UNL) as a consequence. Another dimension to an event is that it should be uninterrupted, with a defined start and end points. In order to further define and limit the time dimension, some contracts, especially those exposed to liabilities following natural disasters (such as WCA or Auto Lines), may use property catastrophe style "hours clause" language to tie events down to a fixed maximum duration. This is particularly important when it comes to reinstatements as the risk-transfer must be clear enough to prevent from reinstating coverage multiple times in respect of the same event. Sometimes the reinsured may look for weaknesses in the series language to allow the chopping of a series of losses into separate events to maximize recovery, rather than taking them as a single one and risk exhausting vertical coverage.

Regarding the "common cause" (see (ii) above) types of clash, common cause based wordings require clear commonality of a single and unique unified cause between the various losses contributing towards the Clash UNL (Clash Ultimate Net). This would normally be linked to one single triggering action (act, error or omission), a common party or participation of the insured's in a single project, transaction or corporate failure. In a Professional Lines context, this may have its roots in a corporate or project failure (similar to Business Disaster). Ideally it should be specifically limited to the direct consequences, preventing the aggregation spreading down the causal chain. The language/used terms can comprise using limiting terms such as "direct consequence of", "arising from" or "directly attributable to" which limit indirect or chains of cause and effect moving away from proximate cause. However, also broadening language/terms can be comprised such as "series of", "proceeding from or traceable to" and "causative agency", all of which can broaden the definitions.

Regarding the "originating cause" (see (iii) above) types of clash, originating cause-language/terms allows the broadest type of causal aggregation. The word "originating" allows a broad tracing back through time and space to the source of origin of all subsequent losses under a unifying link. The term "cause" similarly lacks the space and time constraints which are traditionally associated with event language. It effectively includes anything arising out of, or following on from, the original cause and can be applied on an "each way" view (look forward to losses "proceeding from" or looking backwards at "traceable to"). A "cause" need not be sudden and may involve exposure to substantially the same general conditions. Originating cause-language overrides any limiting event or occurrence language. The inclusion of the word originating significantly widens the search for a traceable unified origin or factor.

Regarding the "related loss" (see (iv) above) types of clash, the related loss is different from the previous types in that in addition to the originating cause possibilities, it introduces a further option which does not require the definitive presence of a causal link. Instead this requires the reinsured to identify a common relationship between the claimant third parties whose claims they wish to accumulate. The breadth of this is particularly clear where the relationship arises from a loose association such as participation in a class action against multiple Insured's (e.g. filed by representatives of a trade union or affinity group against several different employers alleging discrimination against a given type of claimants e.g. Aircrew). When drafting related loss language/terms, it is critical that the term "related" isn't used (unless with significant qualifications). This is because it is generally not a legally recognized term in this context and in the absence of established legal precedent is likely to be interpreted based on its plain language meaning which is extremely broad. This allows the possibility that it could extend to engulf actions that act as a "revealer" of losses rather than just involving a strictly causal or claimant relationship. An example of this would be the failure of an investment scheme such as Madoff, which reveals that poor advice was given to many different investors at different places and times by independent professional advisors. The original claims against these independent advisors in such a situation would not be based on an allegation that the losses were directly caused by the collapse (as investment failure or frauds are not covered under the original Professional Indemnity insurances). Instead, the allegations against each Financial advisor would be that they negligently recommended unsuitable investments for their clients or failed to conduct adequate due diligence into the product providers. The collapse of the investment scheme would therefore have revealed this but is not the strict cause of the losses. Any "Clash" a cedent incurs from multiple advisors therefore fails the tests of event (see above (i)), common cause (see above (ii)) and originating cause (see above (iii)) but could fall under the common claimant part of related loss (see above (iv)).

One of the key advantages of the present invention is that it provides an automated system 1 which is able to quantify, measure and forecast possible liability losses associated with a risk transfer arising from scenarios where multiple affected units 3, as e.g. insured entities/companies are involved possibly in multiple locations over longer periods of time. In order for an accident to be classified as a catastrophe, there needs to be more than one causing unit/company 4 involved and/or a causing unit 4 in more than one role. The structure of the prior art liability risk driven system allow only to model and forecast the losses for one insured. The present invention allows capturing all the losses and how they are distributed among the various causing units 4. In order to do that, the scenario structure was extended into three classes, namely Limited Liability Catastrophes, Unlimited Liability Catastrophes and External Scenario, as described before, which is a necessary parametrization requirement for the more holistic approach of the present invention. It has to be mentioned, that there is no technical or natural definition of the term "liability catastrophe". It clearly has to be an event, measurable by physical measuring parameters, causing liability loss, but there is no universal threshold that an event has to surpass in order to be labeled or triggered "catastrophe". As threshold value, one could also define other quantities substitutable for the physical measuring parameters, as e.g. a minimum of 100 million USD loss or 5 dead persons, but all of these definitions are rather arbitrary. The present invention allows to technically bring all possible liability risk driver scenarios into the format of a measurable and quantifiable liability risk driver scenario processing structure, which is typically not possible by the prior art systems.

Figure 7:
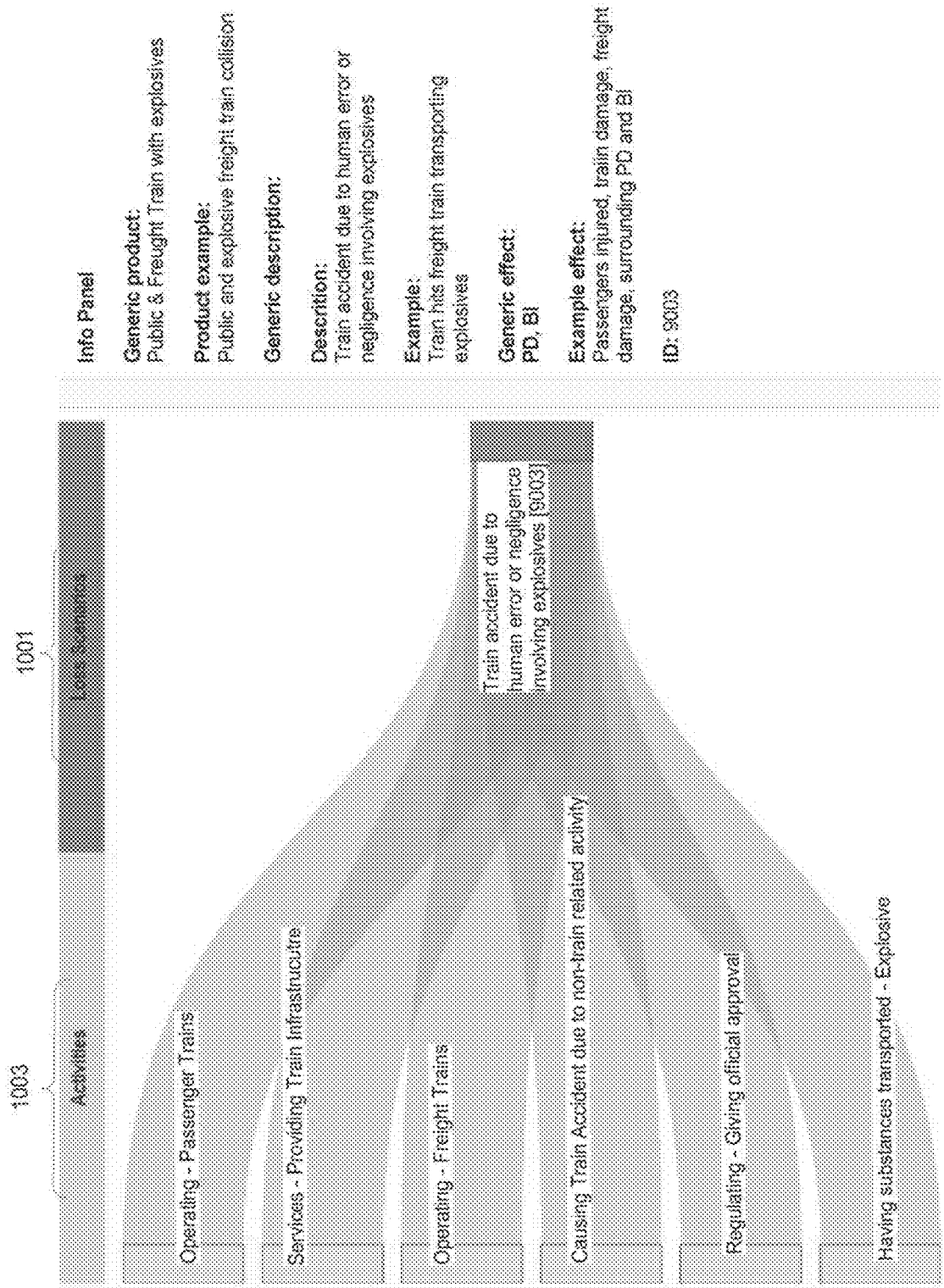
FIG. 7 shows a diagram illustrating schematically an example of a scenario 1001 to activity 1003 process, in particular the train scenario involving a public and a freight train carrying explosives. In general, each scenario 1001 contains one or more activity 1003. An activity 1003 is something that is executed and needs to be part of the scenario 1001 in order that the scenario 1001 actually happens within the technical framework. Examples are 'operating freight trains', or 'having explosive substances transported'.

The structured cause-effect chain 100 is provided by means of the event generator 10 by generating for each of the scenarios 10110/10120/10130 a plurality of data sets holding risk events 1002 evolving from a specific accumulation scenario 1001. For the generation of the occurring risk events 1002, each scenario 1001 comprises one or more executable activity link members 1003 (short: activities), as FIG. 7 illustrates, wherein an occurrence probability of a scenario 1001 is caused by the execution of the one or more activity link members 1003 associated with a scenario 1001. Each activity link member 1003 is assigned to predefined classifications 42 of risk exposed units 4, the assignment comprising a weighted probability parameter giving the probability that a causing activity link member 1003 is being executed from a specific class 42 of risk exposed units 4. Thus, concerning the executable activity link members 1003 (hereafter also just activity 1003), each scenario 1001 contains one or more activities 1003. An activity 1003 is realized as a unit that is executed and needs to be part of a scenario 1001 in order that the scenario 1001 actually happens within the simulation structure. Example activities 1003 are 'operating freight trains', or 'having explosive substances transported'. Please note that an activity 1003 is not the same as an industry 42. For example, 'having explosive substances transported' could be done by different types of a causing unit 4 assigned to different kind of industry 42 like a chemical company or a petrol company.

Figure 8:
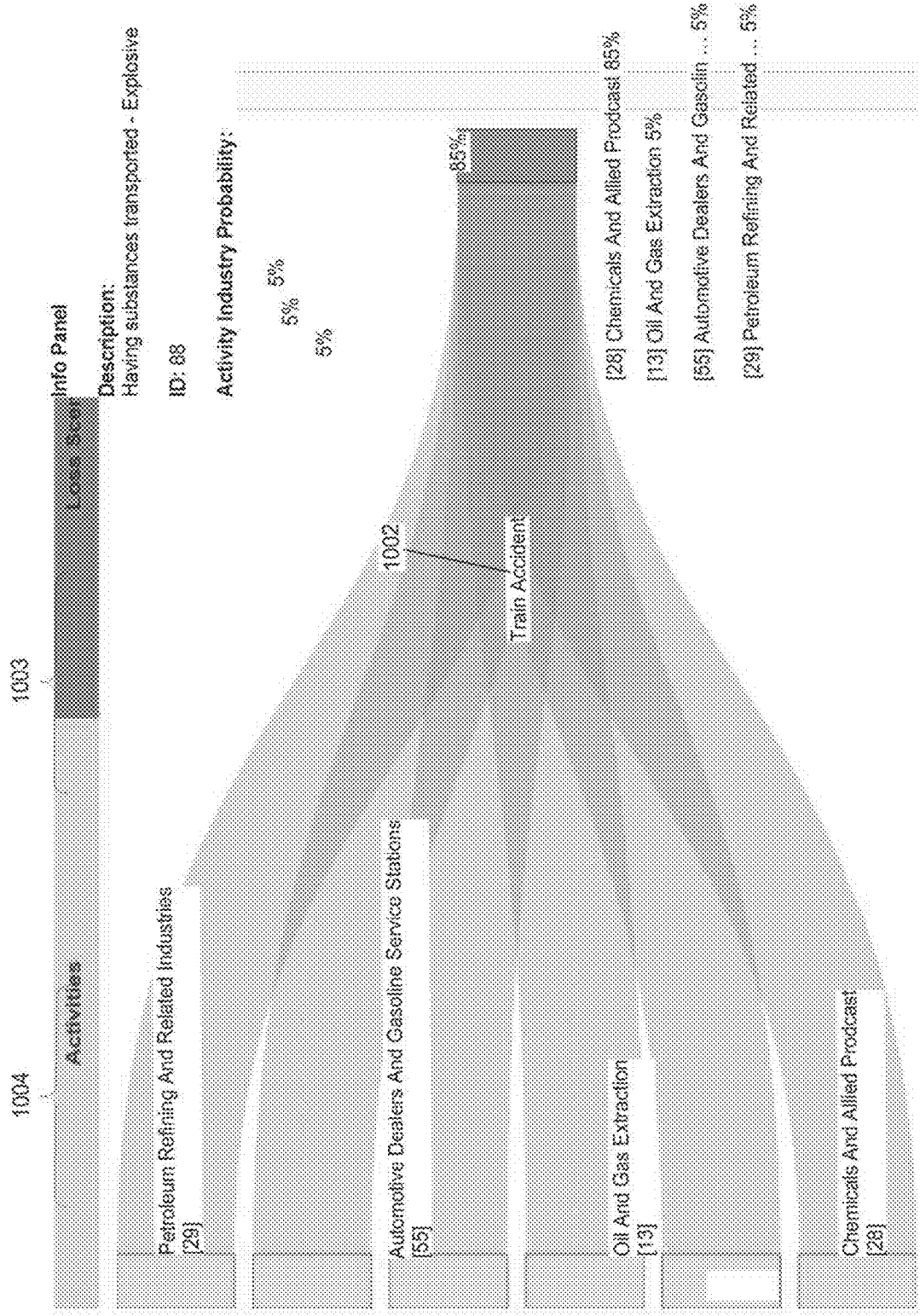
FIG. 8 shows a diagram illustrating schematically an example of an activity 1003 to the type of industry 1004 process. In general, each causing activity 1003 has one or more industry 1004 assigned. This describes what type of industries 1004 execute the given activity 1003. This assignment is given together with a probability that causing activity 1003 was executed from a specific kind of industry 1004.

As FIG. 8 illustrates, each causing activity 1003 has one or more types of industry 42 assigned, i.e. kind of causing units 4. This describes what industries 42 execute a given activity 1003. This assignment is given together with a probability measure that a causing activity 1003 was executed from a specific industry. FIG. 8 shows the activity 'having explosive substances transported' to the involved industries. To the right in FIG. 8 the probability that the activity 1003 was executed from a specific industry is illustrated by a pie chart.

Uncertainties on the amount owed by the different parties involved in a liability catastrophe as compensation for losses incurred are not uncommon. It is therefore important to reflect this resolution process in the modelling and prediction structure of the automated system 1 correctly. At the beginning of the real world process, the loss each party involved in a catastrophe is assumed to be known. For example, in the real word, a judge or jury or other dispute resolution bodies may determines and decides who caused the loss to which extent. This is referred as the "degree of liability" or "liability distribution". In a second step, the dispute resolution bodies determine the amounts of compensation owed to each other on the basis of their degree of liability. Legal doctrines (e.g. comparative negligence vs. contributory negligence) determine who will be held liable for which part of the loss given the degrees of liability. This is referred as "loss distribution". In case some parties cannot be sued or cannot pay, the joint-and-several liability doctrines (someone's got to pay) determine the amounts owed to each other given the amount each party is able to pay. In a nutshell, the degrees of liability determine the loss distribution which in turn together with the ability to pay determine the compensation owed to each other. The last step consists of the risk-transfer coverage: Which risk-transfer policy is assigned to which part of the loss given the line of business, claims trigger, limits and deductibles, aggregation and loss allocation.

The structured cause-effect chain 100 can e.g. be realized as an activity chain 100 interconnecting different executable activity link members 1003 of one or more scenarios 1001 into a flow providing the interconnecting structure for handing over a causing risk exposed unit 4 from affected activity link member 1003 to affected activity link member 1003. Different affected activity link members 1003 can e.g. influence at least partially different affected units 3 and/or affected unit groups 31.

A measurable environmental influence can e.g. be captured as a separate executable activity link member 1003, wherein the one or more executable activity link members 1003 additionally comprise the environmental influence as a possibly affected activity link member 1003 (see also above external scenario groups 10003.

As described above, the event generator 10 generates risk events 2 for the clash-quantifying, multi-risk assessment system 1 with automated measurement and assessment of multi-risk exposures induced by the generated risk events 2, liability catastrophes 21 and casualty accumulations 22. For the generation, a plurality of affected units 3 are subject to the risk exposure of the generated risk events 2 caused by one or a plurality of causing liability risk exposed units 4. The event generator 10 comprises an event characteristics generation engine 105/81/91 comprising the above described multi-dimensional data structure 101 holding the accumulation scenarios 102. The event generator 10 performs a scenario selection by means of a scenario selector 104/812/912, if a LLC scenario groups 10001 is triggered, by selecting relevant LLC scenarios 1001 from the first scenarios 10110 of the data structure 101 based on the activities 1003 assigned to selected risks, and if an ULC scenario group 10002 is triggered, by selecting relevant ULC scenarios 1001 from the second scenarios 10111 of the data structure 101 based on the activities 1003 assigned to selected risks. Based on the selected scenarios 10001 concrete events 1002 are generated by means of the event generator 10 based on the multi-dimensional data structure 101 with the accumulation scenarios 102 and accessibly assigned to a first, second, or third scenario event 10111, 10121, 10131 of the structure 101, respectively, wherein the LLC, ULC and ELC scenario events 10001, 10002, 10003 are generated occurring independently from a causing unit 4 and only corresponding probability values 10114/10124/10134 are generatable by means of a participation probability risk driver 154 providing a measure for the probability that a causing unit 4 is part of the events 1002 as generated. In case of a generated LLC scenario event 10001, a frequency 1511 can e.g. be generated by means of an event frequency risk driver 151 based on its occurring frequency assigned to a specific geographic region or country 1512, wherein the event frequency generation is provided as a consequence of the corresponding scenario group frequency multiplied by a loss scenario frequency share and a country frequency scaling, and wherein the generated frequency 1511 is region-specific assigned to structure 101, 10115. The country frequency scaling can e.g. be provided by a GDP scaling structure starting from a known frequency value of another geographic region or country 1512. In case of an ULC scenario event 10002 generated as a global event, a frequency 1512 can e.g. be generated by means of an event frequency risk driver 153 based on its yearly frequency starting to unfold in the corresponding year 1 providing a year-allocation of a ULC scenario event 10002 of its first year to occur, wherein the event frequency generation is provided as a consequence of the corresponding scenario group frequency multiplied by a loss scenario frequency share and a frequency attenuation, and wherein the generated frequency 1512 is assigned to structure 101, 10125. The frequency attenuation can e.g. provide a measure how a frequency of a ULC scenario event 10002 changes with the time by means of an attenuation factor F scaling down the frequency for ULC scenario events 10002 lasting over a long time by $$F = \begin{cases} (1-\kappa)^{Y_2 - Y_1}, & \text{if } Y_2 \geq Y_1 \\ 1, & \text{else} \end{cases}$$

where $Y_1$ is the exposure start year, $Y_2$ is the current year and $\kappa$ is an exponent coefficient. The scenario selection, selecting a list of relevant loss scenarios 1000 based on a specific rating input by means of the scenario selector 104, can e.g. comprises the steps of collecting all industries 42 that are entered via the rating input, collecting all causing risk activities 43, 1003 performable by said industries 42, and returning all loss scenarios 1001 where at least one of the collected causing risk activities 43, 1003 are involved, providing a forward selection structure of rating to industries 42 to causing risk activities 43, 1003 to loss scenarios 1001.

The system 1 comprises a risk splitter module 11 splitting the risk based on risk exposed unit characteristics 111 and risk exposed population characteristics 112, the risk exposed unit characteristics 111 comprising for each risk exposed unit 4 assigned activity characteristic parameters 1110 and participation characteristic parameters 1111 of said risk exposed unit 4 defining for a specific risk exposed unit 4 a specific set of executable activity link members 1112 and market share driving participation probability 1113, and the risk exposed population characteristics 112 comprising quota parameters defining affected populations with incidence 1121 and defining refined effect types 1122.

The risk splitter 11 can e.g. also be realized as a separately operatable passage-based risk-parsing device providing automated risk splitting for multi-risk forecast systems 1 capturing multiple loss aggregation under complex environmental conditions based on the occurrence of defined loss events 44. The defined loss events 44 are triggered by one or more involved causing units 4 and affected units 3 The loss events 44 evolve from one or multiple risk accumulating sources. The risk events 44 related loss measures are scattered over multiple causing units 4 and/or multiple related clash events 44. The multi-risk forecast system 1 provides loss-generating processes and events 44 by being enabled to generate an event-related loss distributions 112 mirroring cause-effect chains 100 induced by the risk events 44 extending over space and time. In the separate realization, it is the risk-parsing device comprising the multi-dimensional data structure 101 holding predefined accumulation scenarios 102 for capturing measures of at least three risk accumulation sources triggered by the causing units 4 (for the multi-dimensional data structure 101 see description above). In an integrated realization of the risk splitter 11, it is the system 1 or the event generator 10 holding the multi-dimensional data structure 101. In either realization, the system 1 or the risk-parsing device comprises the risk splitter module 11 splitting the risk based on risk exposed, causing unit characteristics 111 and risk exposed affected units' characteristics 112. The causing unit characteristics 111 comprises for each causing unit 4 assigned activity characteristic parameters 1110 and participation characteristic parameters 1111 of said causing unit 4 defining for a specific causing unit 4 a specific set of executable activity link members 1112 and market share driving participation probabilities 1113. The causing unit characteristics 112 comprises quota parameters defining affected populations of affected units 3 with incidence 1121 and defining refined effect types 1122. The risk splitter 11 comprises a dual track structure applying differently to LLC loss scenarios 10001 and ULC loss scenarios 10002. The dual track structure comprises for both scenarios 10001/10002 means for generation and triggering of involved entities characteristics 113/82/92 incorporating activities characteristics capturing and parameterizing causing units 4 in different roles and incorporating market characteristics and models capturing and parameterizing market share driving participation probabilities. For the ULC scenarios 10002, the dual track structure comprises additional means for exposed population trigger and generation 114/93. In the first track of the dual track structure of the risk splitter 11, applying to the LLC loss scenarios 10001, the involved entities characteristics module 113/82 can e.g. comprise generation means and triggers for activity in industry probabilities 1131/821, market share measures 1132/823, and measures of the ability to pay 1133/822. In the second track of the dual track structure of the risk splitter 11 applying to the ULC loss scenarios 10002, the involved entities characteristics module 113/92 can e.g. comprise generation means and triggers for participation probabilities 1134/921, market share measures 1132/923, and degrees of liability 1135/922, and the additional generation means and triggers of exposed population measures 114/93 can e.g. comprise generation means and triggers for population size 114/933, adverse effect probabilities 1143/934, manifestation latencies 114/931, and exposure history 1142/932. In the dual track structure, the means for generation and triggering of involved entities characteristics 113/82 applying to LLC loss scenarios 10001 can e.g. be mainly driven by properties of the causing units 4 that have a positive probability 431 to participate in a LLC event 10001, and the means for generation and triggering of involved entities characteristics 113/92 applying to ULC loss scenarios 10002 can e.g. be mainly driven by properties of the causing units 4 that have a positive probability to participate 431 in a ULC event 10002. The involved entities characteristics 113/82 applying to LLC loss scenarios 10001 can e.g. comprise a measure for the participation probability 431 implemented as conditional probability under the condition that an LLC event 10001 occurs related to a causing unit 4 to participate in the role of a causing activity 43 and as part of an industry 42 in an LLC event 10001. The means for generation and triggers of market share measures 1132/823 can e.g. provide a measure of the revenue of the causing unit 4 divided by the total revenue of the corresponding industry 42 in a given country. The means for generation and triggers of market share measures 1132/823 can e.g. comprise means for generating of an event frequency of the LLC event 10001 multiplied by the participation probability of a causing unit 4 corresponds to the event frequency from the perspective of the causing unit 4 in an activity 43 and industry role 42. The probability to participate 431 in a ULC event 10002 can e.g. be at least triggered by the causing units' industrial activities 43 and/or the geographic extension 433 of activities 43 and/or the size 435 of the causing unit 4, and/or the company's loss prevention and/or human factor 436. The involved entities characteristics 113/92 applying to ULC loss scenarios 10002 can e.g. comprise a measure for the participation probability 431 implemented as conditional probability under the condition that an ULC event 10002 occurs related to a causing unit 4 to participate in the role of a causing activity 43 and as part of an industry class 42 in a global ULC event 10002/10120 with the ULC characteristics 113/92. The involved entities characteristics 113/92 applying to ULC loss scenarios 10002 can e.g. comprise measuring or generating a global event frequency 10125 which is multiplied by the participation probability 431 of a causing unit 4 therefore corresponds to the event frequency 10125 from the perspective of the causing unit 4 in an activity 43 and industry class 42. The involved entities characteristics 113/92 applying to ULC loss scenarios 10002 can e.g. comprise an automated severity scaling and adjustment by providing a measure for the causing unit's 4 market share 1132/923, wherein besides the risk-exposed unit's 4 influence on the measured probability of participating 431 in a global ULC event 10002, the risk splitter 11 and its technical structure also captures the size 435 of the causing unit 4 to adjust the severity measure 432. The ULC event 10002 capturing structure 1012 can e.g. be implemented to relate on the market share 1132/923 of the unit/company 4 in a role of a causing activity 43 in a location 433 and automatically scaling down/up an assigned severity 432 as the overall severity generated for the exposed population 114/93 in the location 433. In case, the risk splitter 11 cannot assess measuring data providing the size 435 of the causing unit 4, the risk splitter 11 can e.g. be set or calibrated by using an average causing unit 4 size 435 by industry 42 and location 433. The weighted market share 1132/923 of a causing unit 4 in a role of a causing risk activity 43 in a location 433 can e.g. be generated by the parameter relation:

$$wms_{ra,loc} = \frac{\Sigma_{ro} aip_{ra,ro} * ms_{ro,ra,loc}}{\Sigma_{ro} aip_{ra,ro}}$$

where the parameter $aip_{ra,ro}$ is the activity 43 in the industry class 42 probability 431/1131 and $ms_{ro,ra,loc}$ is the market share 1132/923 of risk activity 43 in the class of an industry 42 in a location 433, wherein the market share 1132/923 of a risk activity 43 in a role of an industry 42 in a location 433 is generated as follows:

$$ms_{ro,ra,loc} = \frac{assVol_{ro,loc,ap}}{nComps_{ro,loc} * avgRev_{ro,loc} * idaf_{ra,ro}}$$

where the parameter $assVol_{ro,loc,ap}$ is the assigned volume or assigned revenue of the causing unit 4, $nComps_{ro,loc}$ is the number of causing units 4 in the industry 42 and location 433. The risk splitter 11 can e.g. further comprise means to apply the measure of the weighted market share 1132/923 in the natural severity 432 by natSevMeanAfter$_{lc}$=natSevMeanBefore$_{lc}$*$wms_{ra,loc}$ where the parameter SevMeanAfter is the mean of natural severity 433 distribution after loss distribution pattern, nat-SevMeanBefor is the mean of natural severity 433 distribution before loss distribution pattern, lc is the loss component, ra is the risk activity 43, and loc is the location 433. Said natural severity 433 distribution after loss distribution pattern can e.g. be shaped as a log-normal pattern, and/or said natural severity 433 distribution before loss distribution pattern is shaped as a log-normal pattern. The involved entities characteristics module 113/92 of the risk splitter 11 can e.g. comprise a structure for a risk driver capturing loss distribution pattern, wherein the severity 432 of the affected risk activities 32 is distributed by the loss distribution pattern to the causing risk activities 43 by means of the involved entities characteristics module 113/92 by setting a measurable degree of liability providing the relation for each causing-affected pair in the activity chain 100 of a ULC scenario 10002. The exposed population module 114/93 can e.g. comprise means for generating the exposed causing unit 4 within a global ULC event 10002 by grouping the ULC events 10002 by type of affected risk activity 32/43 and location 33 of affected units 3. The exposure history module 1142/932 can e.g. comprise an exposure history grouping to technically capture the temporal dynamics of an exposed population 114/93 during the unfolding of a ULC event 10002, wherein at least the grouping criteria of the exposure period is applied. For the adverse effect 1143/934 probability generation, the ULC event 10002 structure can e.g. be implemented to technically relate on a dependency between an affected unit's 3 duration of exposure and a probability measure to develop adverse effects 1143/934, wherein implementation assumes that this dependency decreases with prolonged exposure duration. The exposed population generation 114/93 can e.g. comprise means for a manifestation latency generation 1144/931, wherein ULC events 10002 unfold over an extended period of time and each affected unit 3 as part of the exposed population 114/93 capable of having its own assigned history of exposure measure to a causing unit 4 or history of manifestation of adverse effects 1143/934, and wherein the manifestation latency generation 1144/931 provides measures for how long it takes for an affected unit 3 to develop adverse effects 1143/934.

Further, the system 1 can e.g. comprise a modulation engine 12. By the modulation engine 12, a given degree of liability 121 is relatable to a certain portion 123 of an occurring loss 20 and risk exposed unit 4 based on a triggered loss distribution 122. The system 1 can e.g. comprise a batch clause modulator and filter 13, also referred as wording filter 13 herein, for triggering and aggregating, by means of selected risk-transfer parameters 51, temporal distributed losses 131 caused by one risk event 2 and associable to the same risk-transfer parameters 51 and risk-transfer time period 52. The system 1 further can e.g. comprise a clash and accumulation aggregator 14 comprising a clash aggregator 141 aggregating first scenario loss events 10111 and an accumulation aggregator 142 aggregating second scenario loss events 10121 for aggregating losses associated with one identified occurring event 2, wherein occurring losses, which are triggered under different risk-transfer parameters 51 but with one identified occurring event 2, are aggregated in linear convolution, while occurring losses 20 which are triggered under different identified occurring events 2 are aggregated independently in frequency.

At least a parameter value of a future characteristic and a measure of the risk transferred to and associated with an insurance unit 5 based on the defined risk-transfer parameters 51 is predicted and/or generated by means of the automated system 1 using a forward-looking model structure. The forward-looking model structure is based on historical measured risk events 2 and risk events 2 generated by the system 1 by means of the event generator 10, the risk splitter module 11, the modulation engine 12, the batch clause modulator and filter 13, and the clash and accumulation aggregator 14, which provide a defined structured cause-effect chain 100. The parameters used by the system 1 for generating the at least one parameter value of the characteristics and measure of the transferred risks are measured or otherwise captured by selected risk drivers 15.

The measured or otherwise captured risk drivers 15 can e.g. be accessible stored in a dynamically accessible data repository 150 comprising a structured hash table 1501 assigning measured risk drivers 15 for providing input measures to the means 10/11/12/13/14 of system 1. The first accumulation scenario data structure 1011 of the multi-dimensional data structure 101 can e.g. be assigned to an event-frequency risk driver 151 of first accumulation scenarios 10110 holding a measure for the frequency 1511 of a first accumulation scenario risk event 10111 to occur in a specific country or region 1512. The first accumulation scenario data structure 1011 of the multi-dimensional data structure 101 can e.g. be assigned to an affected-to-causing risk driver 152 of first accumulation scenarios 10110 allocating affected activities to causing activities providing an estimated severity measure 1521 for the causing of those risk events 2.

The second accumulation scenario data structure 1012 of the multi-dimensional data structure 101 can e.g. be assigned to an event-frequency risk driver 153 of second accumulation scenarios 10120, wherein the frequency 1531 of a second accumulation scenario event 10121 is defined as the yearly frequency of a second accumulation scenario 10120 starting to unfold in the corresponding year, while the frequency 1531 is determined by the chosen temporal granularity 1532 of the scenarios 10120, and wherein the frequency 1531 is weighted by a frequency attenuation 1533 making risk events 2 with a more promptly occurrence more probable than risk events 2 with an occurrence lay further back in time. The second accumulation scenario data structure 1012 of the multi-dimensional data structure 101 can e.g. be assigned to a participation-probability risk driver 154 of second accumulation scenarios 10120, wherein the participation-probability risk driver 154 is providing a conditional probability measure 1541 depending on the occurrence of a second accumulation scenario 10120 of a risk exposed unit 4 to participate in or execute a causing activity link member 1003 as a part of the associated industry class 42.

Generation of the Liability Catastrophes

It is important to note, that one of the key technical objects of the automated clash-quantifying, multi-risk assessment system 1 is to quantifiably measure liability losses involving multiple entities/companies possibly in multiple locations over longer periods of time. In this sense it is a third element in the basic liability risk driver structure (as discussed above): (1) entity/company-level: Single Risk, where the impact of the loss scenarios is only considered for a given company; (2) portfolio-level: Treaty, where the impact of loss scenarios is considered for all individual companies covered by an risk-transfer treaty but affected independently of one another, (3) book-level: extended multi-risk assessment system 1, where the impact of scenarios is considered for an entire book of business, possibly spread over multiple underwriting years and multiple countries but affected by the same scenario.

As an example, a portfolio may be taken, covered by a treaty as a union of the corresponding single risks. The effect of an automated multi-risk assessment system 1—without technically distinguishing between and structuring by the three components (1) limited liability catastrophe scenario groups (LLCs) 10001, unlimited liability catastrophe scenario groups (ULCs) 10002, and (3) external liability catastrophe scenario groups (ELCs) 10003—can then be described as follows. Starting by introducing a formal definition of "something potentially harmful has happened". These are the so-called liability catastrophe scenarios. By the basic liability risk driver (LRD) separation between a generic scenario and the extent to which a specific insured can be affected by it, the occurrence of a liability catastrophe scenario is an absolute, entity/company-independent process. Then the model identifies what insureds can be affected. This identification is based on the commonalities between companies as determined by their production processes and yields of complete list of potentially affected companies. Then, depending on concrete portfolios it becomes possible to identify the extent to which a given insurer can be affected. Ultimately, this yields a bottom-up causal evaluation of the impact of an abstract "potentially harmful event" on a concrete second-tier risk-transfer system, e.g. a reinsurance system (the characteristics of liability catastrophes and loss accumulation).

There are three basic steps: (1) Parameter characterization of the causing liability risk exposed units 4, as e.g. entity or company: (a) Take a given company c (rating input—either known single risk or "assumed average" for a risk transfer), and Obtain the corresponding industry split: the share of c's revenues that it obtains from a particular industry (rating input—either known from a data source or inferred using country/industry averages), and (c) Infer the corresponding probability distribution of activities including the expansion of the first order set of activities derived directly from the industry split by the second order set of activities derived from the pulled activity chains; (2) Identify relevant liability catastrophe scenarios 1000: (a) Given the full set of activities, determine the relevant set of liability catastrophe scenarios 1001; and (3) Match companies with scenarios 1001: (a) From the full set of activities, unfold the full set of relevant industries, and (b) Resolve the companies that can be affected in addition to the original single risk. This is the mechanism through which dependencies and loss accumulation are introduced.

Clash-quantifying, multi-risk assessment system 1 is extending the underlying liability risk driver structure allowing to introduce dependencies into the scenario 1001 and company landscape. As already described, three key components can be distinguished for the multi-risk assessment system 1: (1) Limited Liability Catastrophes (LLCs) 10001 refer to scenarios 1001/events that occur at a well-defined point in time (hence: "limited") and at a well-defined location and typically involve multiple potentially responsible and multiple potentially damaged parties. The Deepwater Horizon accident is a prominent example of an LLC. In other words, the scenario 1001 is a technical means to provide the modelling structure for these types event. Therefore, LLCs 10001 and ULCs 10002 refer to loss-generating processes where multiple potentially responsible and multiple potentially damaged parties are involved in. The stage of the corresponding scenarios ranges from the cause to the effect of catastrophic events; (2) Unlimited Liability Catastrophes (ULCs) 10002 refer to scenarios 1001/events that develop over multiple locations and multiple years (from the introduction of the originator into circulation, through consumption and usage to the establishment of a sufficiently strong link to the symptoms). Whilst also typically involving multiple responsible and damaged parties, the key feature of this scenario is the sequential-causal interaction between the responsible and the damaged parties. "Unlimited" in the context of ULC does not mean apocalyptic loss amounts. Rather, it refers to the spatio-temporal spreading out of these scenarios 1001; and (3) External Liability Catastrophes (ELCs) 10003 refer to scenarios 1001/events in the operating environments of causing (defendants) and affected (plaintiffs) parties and may have an impact on idiosyncratic losses as well as LLCs 10001 and ULCs 10002 via liability risk drivers. In other words, the scenario 1001 is a technical means to provide the modelling structure for these types event. Therefore, ELCs 10003 refer to events in the operating environment of the potentially responsible and multiple potentially damaged parties, for example economics, jurisprudence, science, or technology. The stage of the corresponding scenarios depends on the type of risk driver and may relate to a macro-economy, a jurisdiction, a scientific community, or a society.

For the present application, it has to be clarified that the liability catastrophe, as defined above, causes substantial losses which may—or may not—trigger several risk-transfer policies, and potentially spreads over multiple years and geographies. A liability catastrophe therefore typically leads to risk accumulation. The structural causes of risk accumulation are reflected in three main mechanisms: (1) Several causing liability risk exposed units 4, e.g. liability risk-exposed entities or companies, together may cause or contribute to the loss process and therefore can be the target of litigation and claims. This mechanism affects LLCs and ULCs. Each of the companies acts in a well-defined role in the catastrophe; (2) Several causing liability risk exposed units 4 together may be exposed to claims linked to the same loss process accumulating over time and locations. This mechanism affects ULCs 10002 only; and (3) Changes to risk drivers external to the causing liability risk exposed units 4 to be insured or the plaintiffs affect many claims together: (a) This mechanism has the largest reach and affects non-catastrophic losses, LLCs 10001, and ULCs 10002 alike, as well as both sides of the insurer's balance sheet (e.g., inflation); and (b) Moreover, they affect the ULCs 10002 decisively (e.g., progress in technology and/or in science providing the legal grounds for claims).

The multi-risk assessment system 1 assigns the losses to each causing risk activity. An activity is denoted as a causing activity when the Degree of Loss (DOL) is greater than 0 and occurs in at least one outcome. The loss distribution pattern then defines the Degree of Loss of each causing activity. The way the losses are actually distributed depends on external parameters as e.g. boundary conditions given by the involved legal system. In case of a legal system "several liability" 1212/832 (see FIG. 3), this can lead to an uncovered amount for the parties that is to be reimbursed. In the case of a legal system "joint and several" 1212/832 (see FIG. 3), the other liable parties have to cover potential unpaid parts of other causing parties. The present multi-risk assessment system 1 takes the legal liability system into account (see FIG. 3, reference number 1211/831) but does not consider liability or property risk transfer. The multi-risk assessment system 1 assigns the losses to each causing activity, which is linked to the ability to pay risk driver 1133/822 and the legal liability system risk driver 122/84. Thus, the multi-risk assessment system 1 is based on a mapping structure of:

$$\left( \begin{array}{c} \text{own loss of causing liability risk exposed unit 4} \\ \text{ability to pay } 1133/822 \\ \text{degree of liability } 1211/831 \\ \text{legal liability rule } 122/84 \end{array} \right)$$

$$\rightarrow \text{(loss for causing activity)}$$

Whilst the multi-risk assessment system 1 is based on a large part of the underlying basic liability risk driver functionality, one of its key features—scenario dependencies between individual companies—is completely new and prior art system are not able to provide corresponding structures and measures. Ignoring for the time being possible location differences, a company c is described in basic liability risk driver structure by the shares of its revenue $r_{c,i}$ that it generates in a particular industry i: $\forall c, \Sigma_i r_{c,i}$. To introduce dependencies into this structure, the structure relies on the new concept of "activities" denoted above by $a \in A$. In essence, an activity is simply an identifiable component of a normal process in the entity or business and of everything that any given company can do. All imaginable processes of the business can be adequately parameterized using the elements of the total activity set A, but of course not all companies are involved in all activities. In particular, activities are scenario-independent. Since liability refers to the result of doing or not doing something, activities determine which company can be involved in which type of catastrophe in which role and therefore relate to the first class of drivers of risk accumulation.

In the present invention, activities form activity chains and describe production processes. Activities conducted depend on the causing liability risk exposed units 4, e.g. company, and can change over time—they are not some constant features. For instance, as IBM stopped producing PCs, it is now no longer involved in typical activities, i.e. activity link member 1003, of PC hardware manufacturers. As a simplification, at the moment, it is assumed that activities of a company 4 can be determined by using the industries 42 in which this company 4 is involved:

{$a$:$i$=Manufacturing industry}≠{$a$:$i$=Railroad transportation} so that different companies 4 may well be associated with different sets of activities 1003. However, these differences can be modeled to arise from the different industry splits of two companies $c_1$ and $c_2$ $r_{c(1),i} \neq r_{c(2),i}$ and different industry-specific activities {$a$:$i \in I$} rather than because of some company-specific activities 1003. Please note that the activity-industry assignments are probabilistic: (1) industry doing activity fraction $\pi[i|a]$: what fraction of companies in industry i carry out activity a?; (2) activity in industry probability $\pi[a|i]$: given that a company carries out activity a, what is the probability that it is active in industry i? A given production process is described using the so-called activity chains. Each chain is a—possibly ordered—collection of activities: (i) LLCs are typically described using unordered collections of activities, since the key characteristic of LLC scenarios 10001 is the simultaneous involvement of multiple companies, (ii) ULCs 10002 are typically described using ordered collections, since their key characteristic is the development of a loss process in time and space. Crucially, the drivers of dependencies are the common activities:

{$a$:$i$=Manufacturing industry}∩{$a$:$i$=Railroad transportation}≠0

The full description of the affected and causing sets forms a key requirement for the systems' 1 scenario description and parameterization 1000. Further, the activity link member, i.e. the activities, 1003 also describe responsibilities and flow into loss monetization parametrization. As a result of describing production process, activity chains 100 also present a natural technical mechanism for determining and assigning responsibilities. So, within each activity chain: (i) causing activities $_c a \in _c A$ are those activities 1003 that can be held liable in the real world, (ii) affected activities $_a a \in _a A$, accordingly, are all activities 1003 that harm can be done to in the real world, and (iii) the set of all activities A can always be decomposed fully into the affected and causing components. Please note that an actual activity 1003 technically is a generic building block: depending on particular production processes, the same activity $a_1$ can be affected or causing.

The set $_c A$ forms a key input into the determination of monetary amounts which are ultimately necessary for the determination of the claim size. Four steps separate $_c A$ from determining the claim size: (1) third party loss: since liability insurance does not cover own losses, losses caused to third parties need to be separated out for consideration; (2) degree of liability (DoL): viewed idealistically, to what extent is $a_i \in _c A$ actually liable. It is to be noted that activities 1003 are necessary but not sufficient to establish the parameterized degree of liability. The characteristics of the particular scenario 1001 is also required; (3) The ability to pay (AtP): viewed in the context of a specific causing liability risk exposed units 4, e.g. a company, how much can it actually pay; and (4) liability rules (LR): what governs the plaintiffs in terms of which concrete defendant to claim damages from (typically "joint" vs. "joint and several"). Evaluation of the overall loss amount aggregates over activities 1003 to the actual companies 4. The fact that a single company 4 may be affected by a scenario 1001 has no impact on the DoL. Instead it impacts the overall amount via the determination of the third party loss.

Especially in the context of ULCs 10002 the time development of the exposure is of paramount importance. Its importance is two-fold. On the one hand it is essential for the overall determination of total exposure viewed as of today. On the other hand, it is essential to determine the time-distribution of exposure and hence to evaluate the claims under different trigger conventions (various forms of "claims made" and "occurrence').

Liability catastrophes by their very nature and complex structure are poorly suited for prior art statistical analysis methods and systems: the catastrophes by themselves are not very frequent, and companies 4 are typically reluctant to share details about the impact. Therefore, in prior art, typically, the parameterization of liability catastrophes scenarios 1001 is inevitably based on anecdotal evidence and expert opinion. To accommodate for the resulting uncertainty concerning the quantification of specific parameters, the technical concept of outcomes and outcome probabilities is introduced to the system 1. If some parameters $\pi$ are given. Instead of assuming that it has a certain value $\pi = \pi^*$, a range of possible outcomes for $\pi$, $\{\pi_1, \pi_2, \ldots, \pi_n\}$ is defined with associated probabilities $\{\mathbb{P}[\pi_1], \mathbb{P}[\pi_2], \ldots, \mathbb{P}[\pi_n]\}, \Sigma_i \mathbb{P}[\pi_i] = 1$:

$$\pi = \begin{bmatrix} \pi_1 & \mathbb{P}[\pi_1] \\ \vdots & \vdots \\ \pi_n & \mathbb{P}[\pi_n] \end{bmatrix}$$

The parameter $\pi$ does not have to be a scalar. For example, the concept of degree of liability, described above, essentially describes the distribution of full liability among the elements of $_c A$. In this case each $\pi_i$ is a vector of degrees of liability, and $\mathbb{P}[\pi_i]$ is the measurable probability that in a specific event of this scenario the degree of liability of each causing activity is in fact given by $\pi_i$.

$$\pi = \begin{bmatrix} \pi_1 = \begin{pmatrix} 0.7 \\ 0.1 \\ 0.2 \end{pmatrix} & \mathbb{P}[\pi_1] = 0.5 \\ \pi_2 = \begin{pmatrix} 0.5 \\ 0.2 \\ 0.3 \end{pmatrix} & \mathbb{P}[\pi_2] = 0.4 \\ \pi_3 = \begin{pmatrix} 0.1 \\ 0.1 \\ 0.8 \end{pmatrix} & \mathbb{P}[\pi_3] = 0.1 \end{bmatrix}$$

Please note that the system 1 is not simulation-based. This means that instead of sampling many times from a discrete distribution with probabilities $\{\mathbb{P}[\pi_1], \mathbb{P}[\pi_2], \ldots, \mathbb{P}[\pi_2]\}$ the full set of possible outcomes $\{\pi_1, \pi_2, \ldots, \pi_n\}$ is used to generate n groups of events with weights as given by the outcome probabilities $\mathbb{P}[\pi_i]$.

The Technical Architecture of the Prediction Structure

The structure of the system 1 allows to technically connect exposure measuring parameters with predicted measures for prospective loss quantifying parameters. The structure comprises the core components of (i) capturing and measuring of the exposure parameters 41 in the real world of a causing unit 4, The exposure parameters can, inter alia, comprise a measure for the size of the risk, the type of involved product or activity, the geographic extension, measures for the risk quality, limits and/or deductibles assigned to the risk-transfer as boundary conditions, and claims triggers; (ii) The event generator 10 with the type of product and/or activity as input; (iii) the risk splitter 11 related to geographic extension and/or size of risk; (iv) the risk discriminator 19 providing the impact of different loss preventions, human factors and possible new products or activities; (v) the price tag engine 18 incorporating dependencies based on different costs of living; (vi) means for the accumulation of a potential loss 231 measure based on measures for the likelihood/frequency, severity properties and temporal properties; (vii) the modulation engine 12 incorporating generation dependencies based on the type of liability, liability laws, and mass tort measures; (viii) the wording filter 13 incorporating limits and deductibles as well as claims trigger into the structure; (ix) aggregator 14 comprising for LLC events 10001 the clash aggregator 141 and for ULC events 10002 the accumulation aggregator 142.

The Event Generator 10

The event generator 10 (herein also denoted as event characteristics module 10/81/91) is a central part of the prediction system 1 (see FIG. 2). It is the starting component, capturing the real-world exposure 41, followed by the risk splitter 11, risk discriminator 19, price tag engine 18, modulation engine 12, wording filter 13, and the aggregator 14, predicting the expected losses 232. The event generator 10 heavily depends on the characteristics given by the structured cause-effect chain 100, especially three leg structure with the first scenario group (LLC scenario group) 10001, the second scenario group (ULC scenario group) 10002, and the third scenario group (ELC external scenario group) 10003. The inventive event generator 10 allows, inter alia, to generate events involving more than one potential defendant, as well as events which last over a long time (ULC only), which is not possible to capture by prior art systems. The event generator 10 generates and simulates events. The generation of events is based on a 3 step approach: (1) Scenario selection, i.e. based on the industrial activities in the portfolio of risks (i.e. the rating input), the event generator 10 selects the relevant LLC/ULC/ELC loss scenario 10001/10002/10003; (2) The event generation, i.e. based on the selected scenarios, the event generator 10 generates concrete instances (i.e. events). The structure of events is a crucial component of the event generator 10; and (3) after the generation of the events, the event generator 10 introduces the event frequency (see FIGS. 3/4).

Figure 3:
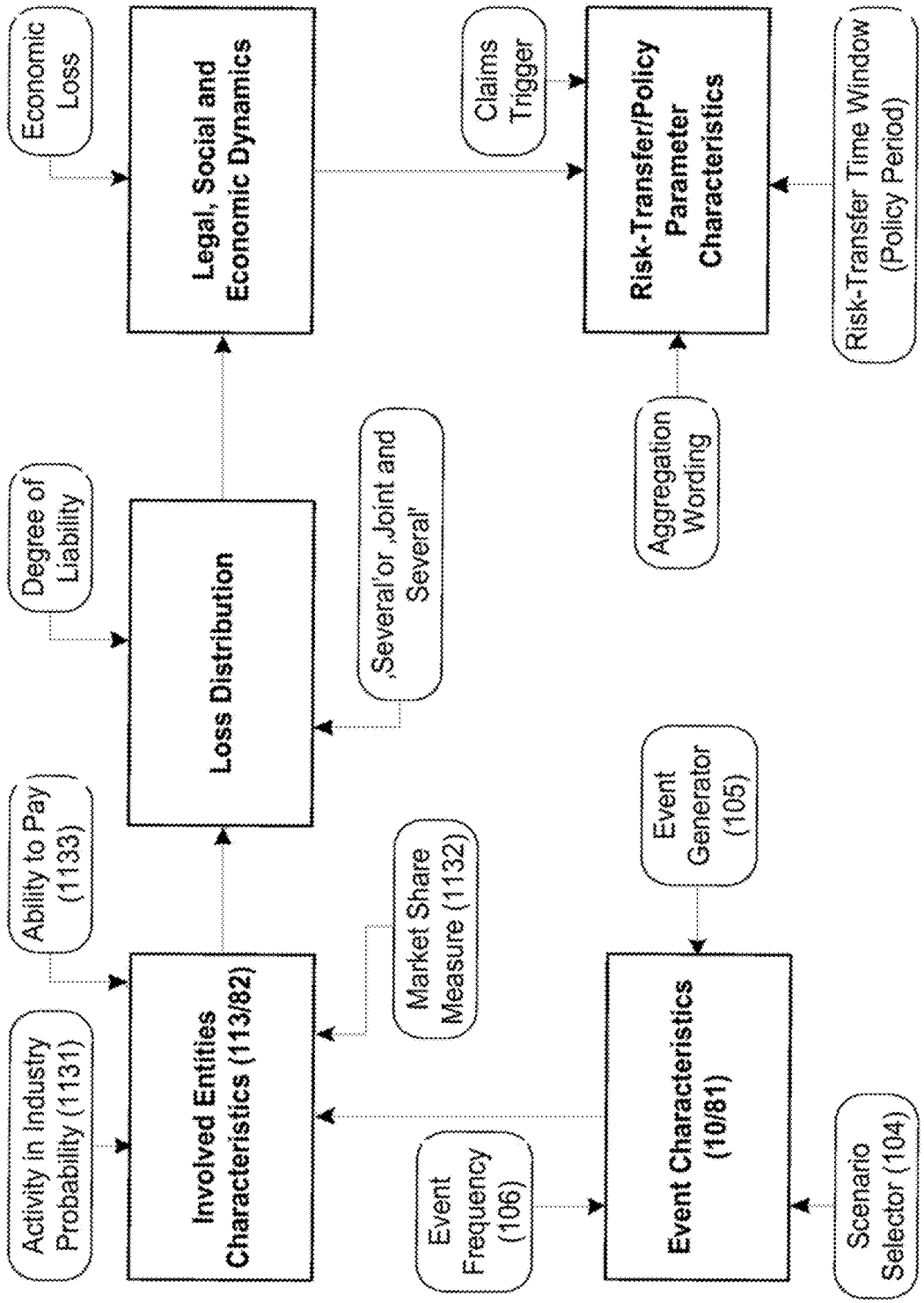
FIG. 3 shows a block diagram illustrating schematically an exemplary realization of a limited liability catastrophes prediction structure. The operation of the systems comprises (i) an initial event and/or scenario generator, depicted in FIG. 3 by the reference "event characteristics", providing the generation of events involving more than one potential defendant; (ii) a risk splitter, depicted in FIG. 3 by the reference "involved entities (or companies) characteristics", providing activities simulation technique for modelling, forecasting and propagating the effects of entities/companies in different roles as well as a market simulation (market share driving participation probability), (iii) a modulation engine, depicted in FIG. 3 by the reference "loss distribution", providing a legal liability simulation technique (including modelling, forecasting and propagating the effects of the ability to pay and degree of liability as well as the legal, social, and economic dynamic); (iv) a wording filter module, depicted in FIG. 3 by the reference "risk-transfer/policy parameter characteristics", providing the mechanisms for aggregation wording with extended batch clause as well as a risk-transfer/policy time period and extended claims trigger, and (v) an aggregator, depicted in FIG. 3 by the reference "aggregator", providing the clash aggregation based on the inventive and implemented clash aggregator techniques.
Figure 4:
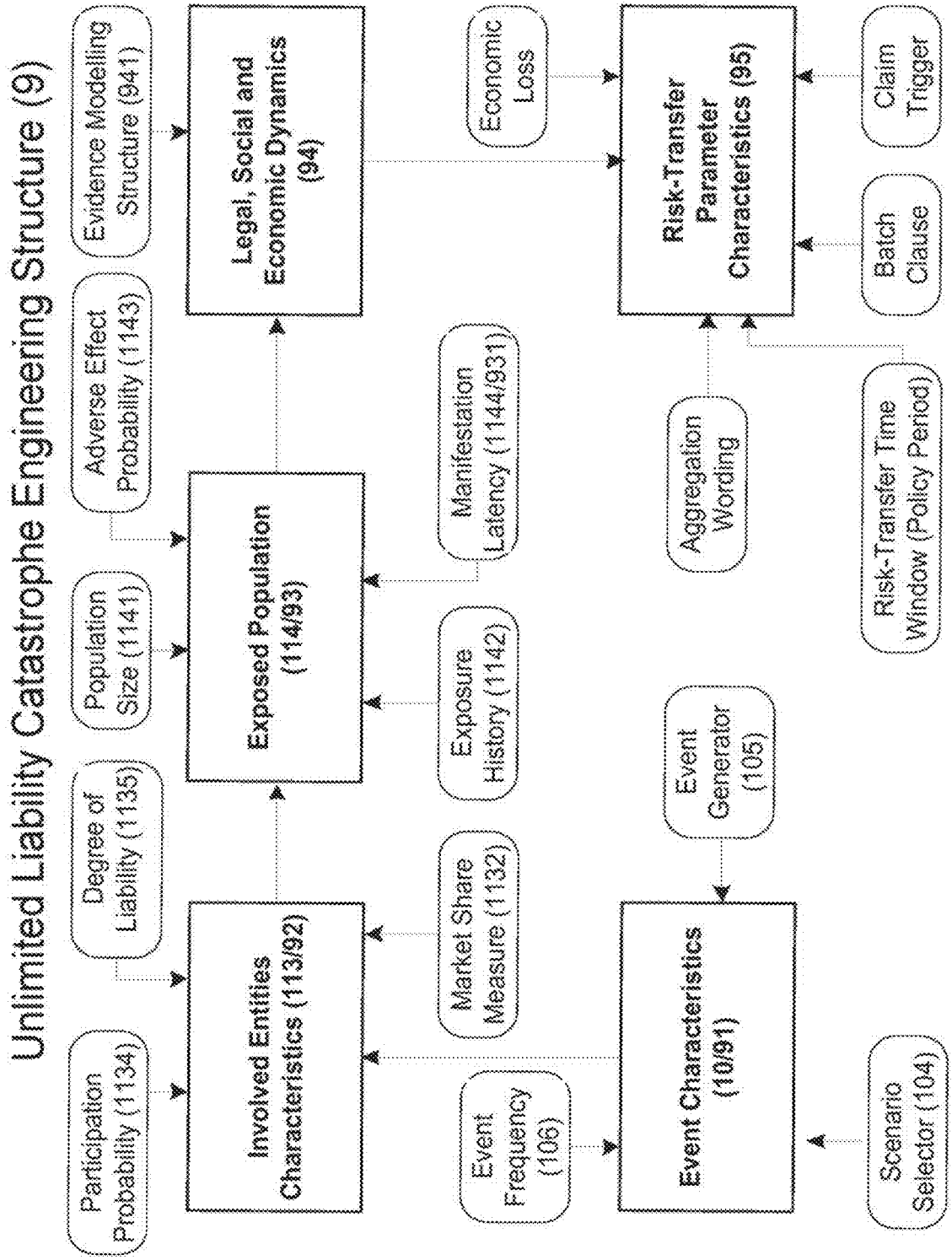
FIG. 4 shows a block diagram illustrating schematically an exemplary realization of an unlimited liability catastrophes prediction structure. The operation of the systems comprises (i) an initial event and/or scenario generator, depicted in FIG. 4 by the reference "event characteristics", providing the technical structure for the generation of events involving more than one potential defendant and/or having impacts lasting over a long time; (ii) a risk splitter, depicted in FIG. 4 by the references "involved entities characteristics" and "exposed population", the first module providing activities simulation technique for modelling, forecasting and propagating the effects of entities/companies in different roles as well as a market simulation (market share driving participation probability), and the later module providing population simulation technique for modelling, forecasting and propagating the effects of affected populations with incidence, and refined effect types; (iii) a modulation engine, depicted in FIG. 4 by the reference "legal dynamics", providing a legal liability simulation technique including modelling, forecasting and propagating the effects of the ability to pay and degree of liability as well as the legal, social, and economic dynamic generating the appropriate loss distribution, as well as an evidence modelling structure modelling, forecasting and propagating the measurable effects of legal dynamics; (iv) a wording filter module, depicted in FIG. 4 by the reference "risk-transfer/policy parameter characteristics", providing the mechanisms for aggregation wording with extended batch clause as well as a risk-transfer/policy time period and extended claims trigger, and (v) an aggregator, depicted in FIG. 2 by the reference "aggregator", providing the clash aggregation based on the inventive and implemented clash aggregator techniques and/or an accumulation aggregator providing the aggregation of possible accumulations of the risk event with a long time impact.

As seen from FIGS. 3 and 4, the event generator 10 relies on a different structure for first scenario groups (LLCs) events 10001 and second scenario groups (ULCs) events 10002:

As part of the event generator 10 towards the generation of accumulating events, the LLC (Limited Liability Catastrophes) 10001 capture loss events with the following properties (see FIG. 3 depicts how the individual system 1 modules interconnect): (i) A limited geographical scope, (ii) One loss event of short duration, (iii) Several parties affected of potentially multiple industries, and (iv) The loss burden may split over several parties and policyholders. The way, the event generator 10 generates and identifies LLC events 10001 differs from another. An LLC event 10001 is a happening or occurrence of a loss event 1000 and is limited in time and geography. An LLC 10001 occurs independently of a specific company, only the probability that a specific causing liability risk exposed unit 4, as e.g. a company, is part of the event is generated and used by the event generator 10. This is a crucial difference to the structure of all known prior art systems. For example, regarding the technical structure of the inventive event generator 10 and prior art systems, an exemplary train accident in Germany is captured in different way providing the perspective of the train company 'Deutsche Bahn (DB)': in the event generator 10, a train accident happens independently, wherein the question is, what is the probability that DB is part of it, while for classic prior art system generations, DB has a train accident. For the event generation 10, an LLC event 10001 is identified by (i) an LLC loss scenario (e.g. Premises Disaster, Train accident), (ii) the country or region where the disaster occurs, and (iii) the year of the event. It is to be note that an LLC global event 10001 is locatable to a country or region, while a ULC 10002 is usually unfolding worldwide. Additionally, the 'first year of evidence' does not have an influence, as the timely development of an LLC 10001 is assumed to happen instantly. In reality, there is a timespan from causation to occurrence, but since this time-span is so short it can be neglected.

An important part of the event generator 10 is the risk driver event frequency generation and prediction for the LLC events 10001. For the event generation 10, the frequency of an LLC event 10001 is defined as the frequency of the LLC loss scenario 10001 in a given country or region. For example, the frequency for train accidents in Germany is about 1 per year. Unlike ULC events 10002, the LLC event frequency has no time dependence. While ULCs 10002 typically develop over several years and the start year of the unfolding of an event has an influence on the following years, for LLC 10001 no such development as frequency attenuation is considered by the event generator 10. For the country frequency scaling, the scenario group 10001 contains the frequency for a given country or region. To get the frequency for another country or region, a GDP scaling is performed by the event generator 10. The country frequency scaling assumes that the frequency of a scenario group depends linearly on the GDP. For example, if the frequency in country A is fA=1/year and the GDP is 100"$, and the GDP in country B is 50"$, then fB=0.5/year. The event frequency generation can be described by the following structure, which, however, is modulatable and/or dynamic adaptable by the event generator 10:

EventFrequency=ScenarioGroupFrequency*
LossScenarioFrequencyShare*CountryFrequencyScaling The event generator 10 further comprise for LLC 10001 an Affected to Causing Risk Driver 107 (herein A2C modulator), which allocates possible losses from the affected activities 32 to the causing activities 43. The A2C modulator 107 structures, how severity moments (which include severities, natural severities, severity ratios, natural severity ratios and claims count) are generated for the causing side for LLC events 10001. In the LLC case, this is done for all causing activities 43, not only the ones that the causing unit 4 might be active in. This is different for ULCs 10002. In the LLC case, the application of the loss distribution pattern needs the loss assigned to each Causing Activity 43. Additionally, for LLC 10001 only, the liability distribution is already applied in the A2C modulator 107. For each causing activity the loss assigned gets a measure for the degree of liability applied. Finally, the event generator 10 and/or the event characteristics module 10/81 further comprise for LLC 10001 a Natural Severities Risk Driver 108 (Price Tag Components Risk Driver PTC), which sets natural severities for LLC events 10001. These natural severities are represented by a base severity and can be split into the following structural loss components' measures: (i) reversible injury (RI), (ii) irreversible injury (II), (iii) death (DE). (iv) material damage (MD), (v) pure financial loss (PFL), (vi) sub financial loss (SFL), (vii) movable material damage (MMD), and (viii) legal expenses (Cost.) For example, there may be an event with 50 affected persons, of which 30 persons have a reversible injury (RI), 15 irreversible injury (II) and 5 died (DE). This is represented by a base severity of 50 and a split of RI=60%, II=30% and DE=10%. A price tag module of the Natural Severities Risk Driver 108 transforms these natural severities into equivalent monetary units. The transformation into monetary units depends on location (which defines the Cost of Living). In the example from above and applied to Germany, where the values can e.g. be 1 RI=50'000 Euro, II=7'000'000 Euro and DE=1'000'000 Euro, this will lead to: EventLossRI=50*(60%*50'000)=1'500'000 Euro, EventLossII=50*(30%*7'000'000)=105'000'000 Euro, and EventLossRI=50*(10%*1'000'000)=5'000'000 Euro. If the same event happened in a different country, for example China, the Cost of Living values for RI, II and DE would be lower and therefore the event loss as well.

As discussed, and seen from FIG. 4, the event generator 10 uses a different structure for generating ULC events 10002. As outlined above, the unlimited liability catastrophes (ULC) 10002 is one of the three types of structured liability catastrophes 1000. As part of the event generator 10 towards modeling accumulating events the ULC (unlimited liability catastrophes) 10002 describe loss events with the following properties: (i) global scope of event, connected via an originator (e.g. substance, technology, etc.), (ii) extended time of unfolding (effect latency, evidence latency, etc.), (iii) extended number of causing companies involved (originator is used across a variety of activities). However, the inventive structure is extendable, if necessary. FIG. 4 depicts how the individual system 1 modules connect. The event generator 10 generates and simulates the ULC events 10002 based on the three-step approach, discussed above.

The event generator 10 performs the scenario selection selecting the list of relevant loss scenarios for a specific rating input (1) by collecting all industries that are entered via the rating input, (2) collecting all causing risk activities that can be performed by the above industries, and (3) returning all loss scenarios where at least one of the collected causing risk activities is involved (in the activity chain): Rating→Industries→CausingRiskActivities→LossScenarios.

The event generator 10 generates, identifies and captures ULC global events 10002 by the implemented characteristics of the global events. A global event 10002 is something that happens or takes place from a global perspective, not from the perspective of a company or person. Global events are therefore as such independent of an individual company. In the non-technical terms of reinsurance aggregation wordings, the scope of a global event is similar to the definition of a related loss. This is a crucial difference to the mechanics used by prior art systems. For example, "asbestos" or "cigarettes are both events from a global perspective. From the perspective of the causing entity 4 Marlboro, however, only cigarettes are considered as an event. The event generator 10 identifies ULC global events 10002 by its characteristics, which are implemented as: (i) exactly one ULC loss scenario (e.g. Endocrine Disruptor 100022 causes Endocrine Disruption), (ii) exactly one first year of unfolding, i.e. start of relevant exposure to originator (e.g. first commercial usage in 1957), (iii) Current technical workaround: Exactly one Causing Activity, e.g. Producing Endocrine Disrupting Chemicals, and (iv) Current technical workaround: Exactly one Affected Activity, e.g. Drinking from plastic bottles. It is to be noted that a ULC global event 10002 is not localizable, i.e. the geographic spread of a ULC global event is always considered Worldwide. Specific risk drivers may limit the effect of ULC global event 10002 to some territorial boundary requirements or characteristics, as e.g. jurisdictions, however. Further, the event generator 10 identifies ULC accumulation events 10002 by its characteristics, which are implemented as: (i) exactly one ULC loss scenario 10002 (e.g. Endocrine Disruptor 100022 causes Endocrine Disruption), (ii) exactly one first year of unfolding, i.e. start of relevant exposure to originator (e.g. first commercial usage in 1957), (iii) exactly one outcome constellation (currently there are outcomes for share of exposed people developing adverse effects 1143/934, defendant's degree of liability distribution, and occurrence claims trigger interpretation), and (iv) exactly one time of available evidence (to link cause to effect) exceeding required threshold (defined by boundary condition parameters, as e.g. legal standards)—This can e.g. be implemented in a deterministic way in the system 1. However, other modelling and prediction technics are also imaginable. The ULC accumulation event 10002 is at the end of the processing passed on for aggregation from a portfolio perspective. In addition to the global ULC events 10002 (e.g. Asbestos causing mesothelioma), the implementation of definitions of other types of ULC "event" 10002 can be needed for (i) capturing the correlation between claims related to the same ULC scenario 1001 beyond the few scenario-related factors (e.g., the global supply chain ecosystem, particularly of Supplier/Beneficial Cargo Owner (BCO). A supplier/beneficial cargo owner is an importer of goods who takes ownership of those goods when they are received. BCOs use their own logistics functions to take receipt, manage and transport goods instead of relying on an LSP or freight forwarder. BCOs are typically larger organizations with enough capital and resources to have internal logistics functions. BCOs include large retailers (e.g., Amazon, Target, Walmart), consumer packaged goods companies (e.g., Nestle, P&G, Unilever), hi-tech companies (e.g., Microsoft, Apple, HP), automotive companies (e.g., Toyota, Tesla) and other companies, and will receive goods from upstream suppliers, manufacturers and logistics companies.

After receiving goods, they will process them or sell them to end customers), (ii) capturing the correlation between ULC global events 10002 related to different levels of ULC scenario (e.g., "BPA causing autism when exposed during pregnancy" vs. "endocrine disruptor causing endocrine disruption"), (iii) linking the event a causing entity 4, as e.g. a company, is involved in from its perspective to the corresponding global event 10002 (e.g., "Asbestos" from "Ortiz vs. Fibreboard"), and (iv) capturing the aggregation of claims onto insurance-relevant occurrences (in the best case defined in the wording but not always the case, e.g., one vs. three vs. eleven occurrences for TÜV Rheinland (Technical Inspection Association (Technischer ÜberwachungsVerein)) in the PIP (Poly Implant Prothèse) implants case).

Also, for the ULC event generation, an important part of the event generator 10 is the risk driver event frequency generation and prediction for the ULC global events 10002. The event generator 10 comprises an event frequency for ULC global events generation implemented as the yearly frequency of a ULC loss scenario 1001 starting to unfold in the corresponding year. 1 The year-allocation of a global ULC event 10002 is thus given by its first year of e.g. commercial usage (e.g. BPA has been commercially used since 1957). In addition, the event generator 10 comprises a frequency attenuation, wherein the technical concept of the frequency attenuation is used to consider the prediction assumption that, from today's perspective, a potential global ULC event 10002 that would have unfolded a long time ago is less likely than a potential ULC event 10002 that would have unfolded a short time ago (e.g. it is less likely for a 30-year old man to become a soccer star than for a newborn). Potential ULC events 10002 are generated for each year (the starting point of the event unfolding is defined by the time the exposure started, e.g. BPA has been applied in industry since 1957). It is assumed that the likelihood that such a potential ULC event 10002 actually really happens diminishes over time. The attenuation factor is therefore used to scale down the frequency of events in a way, such that the scaling down factor is the higher the longer the potential event's originator has been introduced. Therefore, since the ULC events 10002 could be spread over time, it is important to introduce an estimate how frequency of events changes with the time. For this, the Attenuation Factor F is implemented which scales the frequency down. The implemented event frequency generation can e.g. be described by the following structure, which, however, may be modulated, if required:

$Event_{Frequency}=ScenarioGroup_{Frequency}*$
$LossScenario_{FrequencyShare}*FrequencyAttenuation.$ It is to be noted, that the identification of ULC events 10002 is performed by the event generator 10 from a global perspective. However, predicting structure can also comprise identifications of the ULC event 10002 from other perspectives (e.g. in light of a portfolio's aggregation wording, and from a portfolio's perspective, one individual asbestos claim could be identified as an event, but also the series of losses associated to asbestos could be interpreted as an event). This can also comprise better risk accumulation from events with a limited causing entity 4 footprint, but geographic and potentially temporal extension (e.g. PIP case, GM ignition scandal, Ortiz vs Fibreboard) can otherwise be insufficiently covered in the ULC event generation.

In general, for LLC 10001 and ULC 10002 events are generated as discussed above. For other event types, as e.g. ELC events 10003 the frequency can e.g. be implemented trivially (=1). For the frequency generation, a GPD Assessor can be implemented. During the LLC event frequency generation, the ratio between the event location's Gross Domestic Product (GDP) and some reference location's GDP is generated. If one of the locations has no GDP available, an assessor should infer the GDP of a location from other location's GDP. The assessor functionality is implemented in a structure: getGdp(location)=GDP. As mentioned above, for the ULC events 10002, since the ULC events could be spread over time, the event generator 10 needs to estimate how frequency of events changes with the time. For this, the attenuation factor F is introduced to the event generator 10 which scales the frequency down. The attenuation factor is generated by the following structure as:

$$F = getAttenuationFactor(Y_1, Y_2) = \begin{cases} (1-\kappa)^{Y_2-Y_1}, \text{ if } Y_2 \geq Y_1 \\ 1, \text{ else} \end{cases}$$

where $Y_1$ is the exposure start year, $Y_2$ is the current year and $\kappa$ is an exponent coefficient. It is to be noted, that the concept of an attenuation factor can also be used in casualty accumulation systems. However, the factors cannot be translated to liability catastrophes.

In casualty accumulation processing and measurements, the attenuation can e.g. describe the decreased likelihood of a claim with increasing time passed since the term, i.e. the time period of the risk transfer, incepted (in contrary to liability catastrophes where it reflects the start year of the ULC). For claims made under casualty accumulation exist theoretically no exposure after the exposure year. But it is reflected that in reality there is hardly a pure claim made trigger. This attenuation factor must decrease the weight of the past exposure quick rapidly to represent the essence of the claims made characteristic. By contrast, the attenuation pattern for an occurrence trigger will give a bigger weight to the past than in the claims made case. In this case, the factors chosen can e.g. be 0.9 for occurrence, and 0.45 for claims made, and assuming 30% of the contracts are claims-made and 70% are occurrence basis, and then it is $A_t=attenuationfactor^{t-1}, t=1,\ldots,20$ where t is the exposure year of the risk transfer.

For both ULC 10002 and LLC 10001 events, a structure can be defined that maps $$\begin{pmatrix} ScenarioGroup \\ EventLocation \\ LossScenario \end{pmatrix} \rightarrow (EventFrequency)$$

Thus, a scenario group combines a set of related loss scenarios. A frequency can be assigned for each scenario group as follows:

$f=ScenarioGroup \times Location \rightarrow \mathbb{R}_+$ $(scenarioGroup, Location) \longmapsto frequency$ The frequency f is a function of the scenario group and location. The location acts as a scaling factor. For the event frequency share, the scenario group frequencies can be broken onto the loss scenarios as follows:

$h=lossScenario \rightarrow \mathbb{R}_+$ $(lossScenario) \longmapsto frequencyShare$ Finally, for the event frequency generation, LLC events 10001 and ULC events 10002 are differentiated:

(A) For ULC events 10002, combining the structure f and h with the attenuation factor F yields the main relation $g_{ULC}$:

$$g_{ULC}: \text{ScenarioGroup} \times \text{ReferenceLocation} \times \text{LossScenario} \to \mathbb{R}_+$$

$$(sg,rl,ls,F) \mapsto f(sg,rl)*h(ls)*F = \text{eventFrequency}$$

It is to be noted that the ULC loss scenarios 10002 have a frequency independent of the location. This is different from the LLC concept where the event generator 10 scales the frequency based on location.

(B) For LLC events 10001, to obtain an appropriate $g_{LLC}$, the structures f and h are combined. If an event contains only causing activities with affected party "Product" (i.e. events that might have several event locations):

$$g_{LLC}: \text{ScenarioGroup} \times \text{EventLocation} \times \text{ReferenceLocation} \times \text{LossScenario} \to \mathbb{R}_+$$

$$(sg,el,rl,ls) \mapsto f(sg,el)*h(ls)*\text{getGDP}(el)/\text{getGDP}(rl) = \text{eventFrequency}$$

where reference location is derived from the scenario group 1000. For this case, the reference location can, for example, be freely chosen.

The Risk Splitter 11

Concerning the risk splitter 11, as shown in FIG. 2, the risk splitter works differently for LLC loss scenarios 10001 and ULC loss scenarios 10002. For both scenarios 10001/10002, the risk splitter 11 comprises the generation of the involved entities characteristics 113/82/92 (see FIG. 3/4). In addition, for the ULC scenarios 10002, the risk splitter 11 comprises means for the exposed population generation 114/93. The risk splitter allows to system 1 to differentiate geographic extensions and size of the risks. For LLC loss scenarios 10001, the involved entities characteristics generation 113/82 involves the activity in industry probability generator 1131 (LLC), the market share measure generator 1132, and the generator for the measure of the ability to pay 1133 (LLC) (see FIG. 3). For ULC loss scenarios 10001, the involved entities characteristics generation 113/92 involves the participation probability generator 1134 (ULC), the market share measure generator 1132, and the generator for the degree of liability 1135 (ULC) (see FIG. 4). The involved entities characteristics generation 113/82/92 allows to incorporate activities characteristics and models capturing and parameterizing entities 4 in different roles, and to incorporate market characteristics and models capturing and parameterizing market share driving participation probabilities.

For LLCs 10001, in the generation of the involved entities characteristics 113/82, the following processing steps are mainly influenced by the properties of the causing units/companies 4 that could participate in an LLC event 10001. This can be related to e.g. (i) the possible causing industrial activities 43, which are assigned to the risk-transfer, (ii) the geographic extension of activities 43, (iii) size of causing unit/company 4, (iv) the measure for its ability to pay, and (v) the company's loss prevention, human factor, etc. It is to be noted that properties of the unit 4 can both influence the participation probability and the allocated severity. The participation probability 1134 for LLC events 10001 are implemented as conditional probability (given an LLC event 10001 occurs) of a causing unit 4 to participate in the role of a causing activity 43 and as part of an industry 42 in an LLC event 10001. The participation probability can e.g. be generated by means of the participation probability risk driver 1134 for the causing unit 4, only. The Participation Probability pp for LLC 10001 is generated based on:

$$PP_{\text{Scenario,InsuredCompany}} = \text{Activity-InIndustry}_{\text{Industry,CausingActvity}} \times \text{MarketShare}_{\text{Industry,country}}$$

The market share is generated e.g. as a measure of the revenue of the causing unit 4 divided by the total revenue of the corresponding industry 42 in a given country. The event frequency multiplied by the participation probability of a causing unit 4 corresponds to the event frequency from the perspective of the causing unit 4 (in an activity 43 and industry role 42).

As mentioned, for the ULC scenarios 10002, the risk splitter 11 is more complex structured and additionally comprises means for the exposed population generation 114/93 to the involved entities characteristics generation 113/92. The exposed population generation 114/93 involves the population size generator 1141, the adverse effect 1143/934 probability generator 1143, the exposure history module 1142, and the manifestation latency 1144/931, while for the involved entities characteristics generation 113/92, the risk splitter 11 involves the participation probability generator 1134 (ULC), the market share measure generator 1132, and the generator for the degree of liability 1135 (ULC) (see above and FIG. 4). In the involved entities characteristics generation 113/92, the following processing steps are mainly influenced by the properties of the causing units/companies 4 that could participate in an ULC event 10002. This can be related to e.g. (i) the causing units' industrial activities 43, (ii) the geographic extension of activities 43, (iii) size of the causing unit 4, and (iv) the company's loss prevention, human factor, etc. It is to be noted that the causing unit's 4 properties can both influence a) the participation probability 10124 and b) the allocated severity 10126 at the location 10126.

The participation probability 10124 of the involved entities characteristics module 113/92 of the risk splitter 11, mentioned above under a), is the conditional probability (under the condition that a global event actually occurs) of a risk-exposed unit/company 4 to participate in the role of a causing activity 43 and as part of an industry class 42 in a global ULC event 10002/10120 with the ULC characteristics 113/92. The global event frequency 10125 multiplied by the participation probability of a risk-exposed unit/company 4 therefore corresponds to the event frequency 10125 from the perspective of the unit 4 (in an activity 43 and industry role/class 42). For example, the measured probability of a unit 4 in an exemplary activity as BPA (bisphenol A) bottle manufacturer to participate in the industry role bottle manufacturer in the BPA event can e.g. be 50%. It is to be noted that for industry 42 doing activity fraction, the fraction is the fraction of the units/companies 4 in an industry segment/class 42 performing a certain risk activity 43. In the above example, the fraction concerning the activity as BPA (bisphenol A) bottle manufacturer is 22% since out of all chemical companies in this world, 22% produce BPA. The participation probability 10124 generation/measurement can be captured by the following relation:

$$\text{ParticipationProbability}_{ra,ro} = \text{IndustryDoingActivityFraction}$$

where ra=Causing Risk Activity 43 and ro=Risk Object Class (i.e. industry 42). Thus, the participation probability 10124 is captured and structured independent of the unit's 4 size for ULC events 10002/10120. Further, the system 1 comprises an automated severity scaling and adjustment, inter alia providing a measure for the unit's 4 market share.

Therefore, besides the risk-exposed unit's 4 influence on the measured probability of participating in a global ULC event 10002, the system 1 and its technical structure also captures the size of the insured to influence the severity. For this, the ULC event capturing structure 1012 considers the market share 1132/923 of the unit/company 4 (in the role of a causing activity 43 in a location 433) and automatically scales down/up the assigned severity 432 (i.e. the overall severity generated for the exposed population in the location 433) accordingly. In case, the system 1 cannot assess data providing the size of the unit/company 4 included in the risk-transfer, the system 1 can e.g. use an average unit 4 size by industry 42/location 433 (e.g. a food producing unit 4 may be assumed having an average turnover of 300*m* Euro in Germany). The (weighted) market share of a unit 4 (in the role of a causing risk activity 43 in a location 433) is generated as follows:

$$wms_{ra,loc} = \frac{\sum_{ro} aip_{ra,ro} * ms_{ro,ra,loc}}{\sum_{ro} aip_{ra,ro}}$$

where the parameter $aip_{ra,ro}$=activity 43 in industry 42 probability 431/1131 and $ms_{ro,ra,loc}$=market share 1132 of risk activity 43 in the role/class of an industry 42 in a location 433. The market share 1132 of a risk activity 43 in the role of an industry 42 in a location 433 is generated as follows:

$$ms_{ro,ra,loc} = \frac{assVol_{ro,loc,ap}}{nComps_{ro,loc} * avgRev_{ro,loc} * idaf_{ra,ro}}$$

where the parameter $assVol_{ro,loc,ap}$=assigned volume (i.e. assigned revenue of the unit 4), $nComps_{ro,loc}$=number of units 4 in industry 42 and location 433. The measure of the weighted market share 1132/923 is then applied by system 1 in the natural severity 432 mean natSevMeanAfter$_{lc}$=natSevMeanBefore$_{lc}$*$wms_{ra,loc}$ where the parameter SevMeanAfter=mean of natural severity 433 distribution after loss distribution pattern (e.g. a log-normal pattern), natSevMeanBefor=mean of natural severity 433 distribution before loss distribution pattern (e.g. a log-normal pattern), lc=loss component, ra=risk activity 43, and loc=location 433. As an example of the market share 1132 severity 432 scaling, Marlboro has e.g. a 20% market share 1132 in the sale of cigarettes in the Germany. It is therefore associated with 20% of all German smokers. In the automated scaling a constant revenue unit brings a wring weighting. Thus, e.g. price differences of the sold products (e.g. a Ferrari costs more than a Hyundai) should be included in the scaling, otherwise, in the above example, the market share of Ferrari will be overestimating the exposure per unit sold. The same is true, if a constant market share over time is included. Thus, the scaling has to include that the market share 1132 of a unit 4 changes over time, otherwise it is assumed that the unit 4 has, had and will have a static, i.e. same, market share 1132 as today measured.

The ULC structure of the involved entities characteristics module 92 of the risk splitter 11 can e.g. comprise a structure for a risk driver capturing the loss distribution pattern. Thus, the ULC-structure can e.g. distribute the severity 432 of the affected risk activities 32 to the causing risk activities 43 by means of the involved entities characteristics module 92 by assuming a measurable degree of liability, i.e. relation, for each causing-affected pair in the activity chain 100 of a ULC scenario 10002. Further, the option to introduce a degree of liability outcomes can e.g. be realized. The degree of liability within an activity chain can e.g. be limited. For example, ULC structure of the risk splitter 11 can be based on the assumption that the units 4 are only responsible for the damage that occurs downstream of itself in the activity chain 100.

Figure 13:
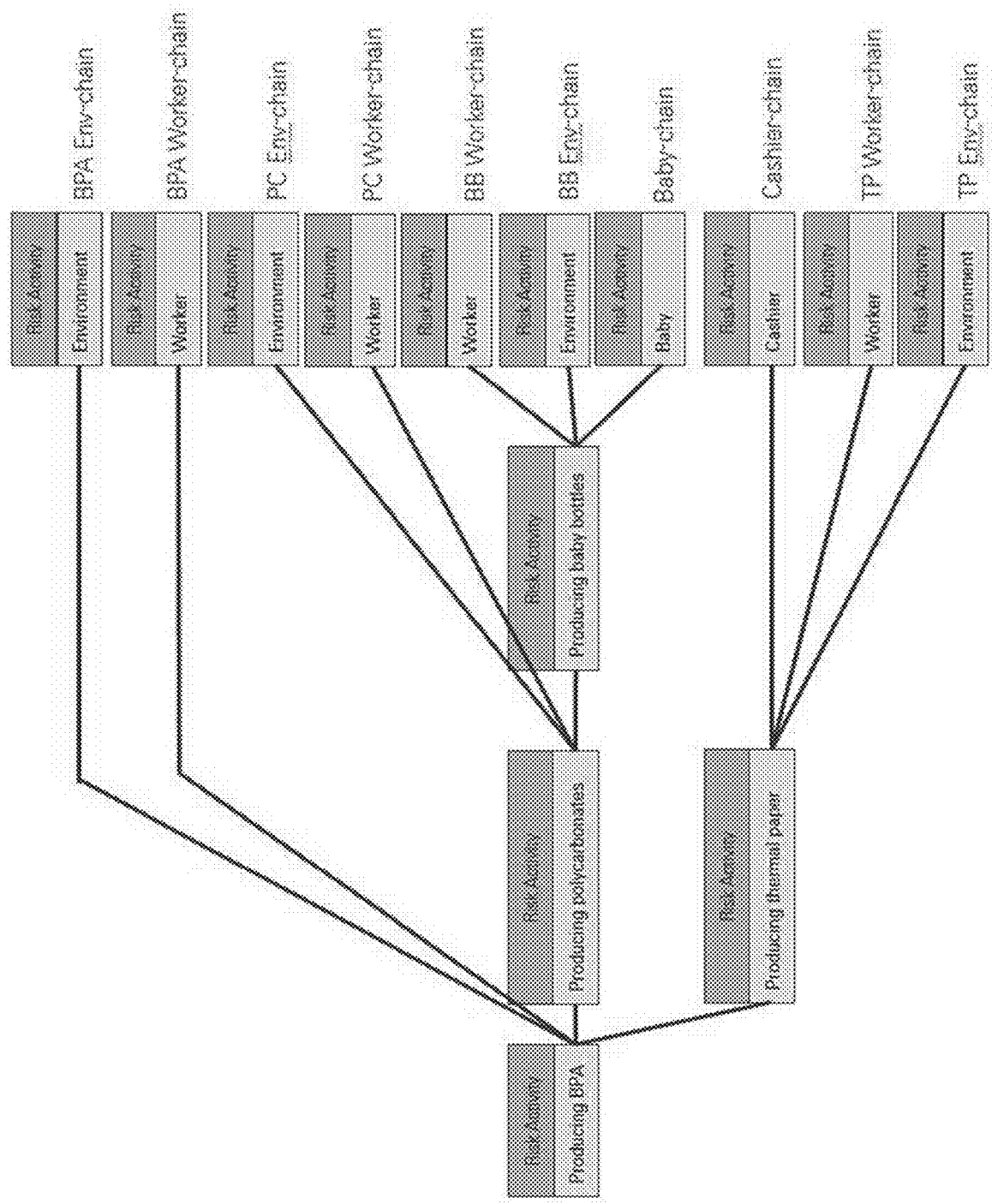

An example of a downstream degree of liability within an activity chain 100, which may be given by a causing activity producing baby bottles, where the activity 1003 only provides liability for the affected activities worker, environment and baby downstream of its supply chain. In this structure, a baby bottle producer is therefore not e.g. be held liable for the workers of a thermal paper producer or the cashiers exposed to the thermal paper (see example illustration by FIG. 13). This embodiment variant results in a functional relation of the relevant technical parameters of:

sevMeanAfter$_{lc}$=sevMeanBefor$_{lc}$*
dol$_{ls,cra,ara,dolOutcome}$ where sevMeanAfter is the mean of severity distribution after loss distribution pattern (e.g. log-normal), sevMeanBefore is the mean of severity distribution before loss distribution pattern (e.g. log-normal), lc is the loss component 4, ls is the loss scenario 1001, cra is the causing risk activity 43, ara is the affected risk activity 32, and dolOutcome is the degree or measure of liability outcome, i.e. the scenario 1001 outcome. For operational efficiency, the ULC structure can e.g. further be realized in a way to assume that the ability to pay is infinite for all causing units/companies 4.

It is advantageously to further apply to the cause effect chain 100 related to the causing units 4 of the ULC structure partially or overall the risk driver structures used in the basic liability risk driver systems, i.e. in this case, using the risk driver structure of the present invention provides an extension to the basic liability risk driver structure. In this embodiment variant, the processing of ULC events 10002 within the structure of the present system 1 can e.g. comprise a risk driver providing a measure for possibly applied loss preventions, or a risk driver providing a measure for the influence of human factors, or a risk driver for capturing the impact of possible new products and activities 43.

As already described, the risk splitter 11, additionally to the involved entities characteristics generation 113/92, comprises means for the exposed population generation 114/93, where the exposed population generation 114/93 involves the population size generator 1141, the adverse effect 1143/934 probability generator 1143, the exposure history module 1142, and the manifestation latency 1144/931. For the exposed population generation 114/93, it is important to note that ULC events 10002 unfold over an extended period of time. This implies that each individual (as part of the exposed population) e.g. can have its own history of exposure to an originator or history of manifestation of adverse effects 1143/934. Therefore, ULC events 10002 (second scenario group) underlie a fundamentally different loss process than e.g. immediate and local event types (such as explosions (see LLC events 10001 (first scenario group))). In order to generate the exposed individuals within a global ULC event 10002, the events 10002 can e.g. be grouped by type of affected risk activity (e.g. smoker, asbestos worker) and location of individuals (e.g. Germany, USA). The following example series (i-iii) illustrate other examples how the affected population 114/93 can be further grouped.

Example (i): Affected risk activity 43 by location, e.g. smokers in Germany. It may be further grouped by the exposure history. Thus, example (ii) Affected risk activity 43 by location and exposure history, e.g. smokers in Germany smoking between 2001 and 2014. Finally, in a last step, it may be further divided by manifestation history 1144/931, giving example (iii) Affected risk activity 32/43 by location 33 and exposure and manifestation history 1144/931, e.g. smokers in Germany smoking between 2001-2014 and developing adverse effects 1143/934 in 2018.

The exposure history module 1142 can e.g. comprise an appropriate exposure history grouping. I.e. to technically capture the temporal dynamics of an (during the unfolding of a ULC event 10002) exposed population 114/93, the following grouping criteria may be used: exposure period, i.e. from when to when someone is exposed to an originator (exposure history). In other words, individuals that are affected by an originator (as part of a ULC event 10002), are grouped into the above criteria. As an example, an individual can e.g. a smoker from Germany who has been smoking from 2001-2014. The goal of this module 1142 is to count all individuals within an (affected) risk activity 43, location, and exposure period. Note that each exposed individual 3 is allocated to a unique exposure period, based on when the exposure started and ended for the individual/affected units 3. For example, there can be 5123 smokers in Germany who have been smoking from 2001-2014.

In an embodiment variant, the system 1 can be realized so that the exposure history is uninterrupted, e.g. a smoker cannot start and stop and start again smoking. This assumption allows to reduce the groups required to generate the exposed population 114/93. Independent of such boundary conditions or assumptions, technically, there has to be a measure or count of the individuals/affected units 3 in the affected risk activity 32 and a location 33 within a year 34 (e.g. there have been 5'321'331 German smokers smoking in 2015). This measure or count populatioCount$_{ra,loc,year}$. The implementation of such a count may e.g. be as follows:

populationEnterCount$_{ra,loc,enterYear}$=
$(1+e-1)^{(enterYear-countYear-1)}$*populationCount$_{ra,loc,countYear}$*$e$ where e is the "population 114/93 enter turnover" and l is the "population 114/93 leave turnover" and with the overall timely development of:

$y_{enterYear+1}$ = populationEnterCount$_{ra,loc,enterYear}$ * $l$ $y_{enterYear+2}$ = (populationEnterCount$_{ra,loc,enterYear}$ − $y_{enterYear+1}$) * $l$

...

$Y_{leaveYear}$ =

(populationEnterCount$_{ra,loc,enterYear}$ − $\sum_{i=1}^{leaveYear-enterYear} y_{enterYear+i}$) * $i$ It is to be noted, that the above embodiment variant for implementation takes only new joiners into the population 114/93 into account. However, the existing population 114/93 can also develop adverse effects 1143/934. E.g. if the existing population 114/93 is 1 million, the exposure starts with the start of the originator (i.e. the event exposure start year). Other embodiment variants may be implemented to take also e.g. adverse effects 1143/934. In addition, it can be technical reasonable to e.g. implement a cut-off point. For example, people may not be exposed longer than a predefined number of years. For people that are exposed>predefined number of years the structure can e.g. be implemented to assume that they will never develop adverse effects 1143/934. Such restriction should be introduced with care, even if technically reasonable, since they can e.g. result in a huge under-estimation of the affected population 114/93.

The exposed population generation 114/93 further comprises means for an adverse effect 1143/934 probability generation. The ULC 10002 structure of the system 1 technically assumes that there is a dependency between an individual/unit's 3 duration of exposure and its probability to develop adverse effects 1143/934. Furthermore, the structure assumes that this dependency decreases with prolonged exposure duration (e.g. the incremental probability increase of a smoker to develop adverse effects 1143/934 for one year more of smoking is smaller after 20 years than after 10 years of already having been smoking). As an embodiment variant, the system can e.g. be implemented to assume a linear dependency up to a specified saturating duration, where the dependency is becoming constant. In the example of FIG. 14, the saturating duration (satDuration) is equal 8 and the saturating fraction (satFraction) is equal 0.3. To give an example, out of the 5123 smokers in Germany who have been smoking from 2001-2014, 1923 develop adverse effects 1143/934 due to smoking. Thus, in this case, the implementation in system 1 can e.g. be based on $$adverseEffectProbability = \begin{cases} satFraction * \frac{exposureDuration}{satDuration}, & \text{if } exposureDuration < satDuration \\ satFraction, & \text{else} \end{cases}$$

In addition, the exposed population generation 114/93 comprises means for a manifestation latency generation 1144/931. According to the invention, ULC events 10002 unfold over an extended period of time. This implies that each unit/individual 3 (as part of the exposed population 114/93) e.g. can have its own history of exposure to an originator 7 causing unit 4 or history of manifestation of adverse effects 1143/934. The manifestation latency generation 1144/931 provides measures for how long it takes for an exposed individual/unit 3 to develop adverse effects 1143/934 (e.g. how long does it take for a smoker to develop cancer?). As an embodiment variant, the ULC 10002 structure can e.g. be implemented to assume a Weibull distribution, which is described by the following cumulative distribution relation:

$$F(x; k, \lambda) = 1 - e^{-(\frac{x}{\lambda})^k}$$

where k>0 is the shape parameter and λ>0 is the scale parameter of the distribution. The fraction of a unit/individual 3 to develop adverse effects 1143/934 within times $t_1$ and $t_2$ is therefore implemented by generating Fraction$_{t_1,t_2}$=$F(t_2;k,\lambda)-F(t_1;k,\lambda)$ where $t_1$ is the event exposure start date and $t_2$ is the year in which the adverse effects 1143/934 manifest (see FIG. 15).

The Modulation Engine 12

Concerning the modulation engine 12, as shown in FIG. 2, the modulation engine 12 works differently for LLC loss scenarios 10001 and ULC loss scenarios 10002. For both scenarios 10001/10002, the modulation engine 12 comprises the generation of the legal and/or social and/or economic dynamics 122/84/94 (see FIG. 3/4). However, for the generation of the LLC events 10002, the modulation engine 12 additionally comprises the loss distribution generation 121/83 with the degree of liability generation 1211/831 and the "several" or "joint and several" splitting 1212/832. Further, for LLC loss scenarios 10001, the modulation engine 12 comprises the economic loss generation 1221/841 of the legal, social and economic dynamics generation 122/84 (see FIG. 3). In contrast, for the ULC loss scenarios 10002 generation, the legal, social and economic dynamics generation 122/94 comprises the evidence modelling structure generation 1222/941 (see FIG. 4).

The loss distribution generation 121/83 allows technically to incorporate measures for how the losses are distributed among the causing activities 43 taking into account the ability to pay 1133/822. For this, in the technical context of system 1, it is important to technically define causing 43 and affected 32 activity and the measures used for the degree of liability 1135/1211. A causing activity 43 is an activity that has a degree of liability 1135/1211 larger than zero in at least one of its degree of liability 1135/1211 event outcomes. An affected activity 32 is an activity that has an own loss. For example, if a factory explodes, the activity 32 'running a factory having an explosion' has also damage to his own factory. This is referred to as 'own loss'. Therefore, this activity 32 is an affected activity 32. It is to be noted that an activity can be affected 32 and causing 43 at the same time. Using the example from above, if a factory explodes, it does not only have 'own loss', but can also be found liable. The degree of liability (DoL) 1135/1211 is a measure of the share of the total third-party liability the corresponding causing activity 43 has to pay. The term degree of liability 1135 is used herein as a technical measure and not as a legal term. In court, liability is distributed according to a DoL set by the judge. However, int the technical context of the system 1 the DoL measure is assumed to be universal and has not country dependence. The degree of liability is structured to be distributed among the causing activities 43 and sums up to 1. There can be one or several outcomes of this distribution, which is denoted herein as DoL event outcome. DoL event outcome has an assigned probability which is denoted herein as degree of liability event outcome probability. Finally, in the implementation of the system 1, the total loss of an event is the sum of all own losses. If $L_i$ is the own loss of activity I, then the total loss is $L=\Sigma_i L_i$. The total loss includes all losses, including measures for property losses and bodily injury or other. The total loss is not the same as the total liability loss. For example, if a factory explodes and there is a measurable loss to the factory itself of 10 million USD and a building nearby is damaged with a loss of 5 million USD, the total loss is 15 million USD. The corresponding liability loss in this case is only 5 million USD, as only this is a third-party loss. For example, it also can be referred to an event that actually happened in Germany in 2008. Sheep got into a rail tunnel. A high-speed train (ICE) came and ran into the sheep. The train derailed, damaging the train itself, the tunnel and 25 people were severely injured. The table below shows the involved activities 32 and their own loss.

| ID | Activity | Bodily Injury (monetary measure) | Property Damage (monetary measure) |
|---|---|---|---|
| 1 | Running Railroads (RR) | 3,000,000 | 15,000,000 |
| 2 | Providing RR Infrastructure | | 1,200,000 |
| 3 | Holding Livestock | | 500,000 |
| 4 | Being Passenger | 22,000,000 | 50,000 |

The liability losses are distributed among the causing activities 43 according to their degree of liability 1135/1211, which is referred to as loss distribution 121/83. If $DoL_i$ is the degree of liability 1135/1211 of activity i, the sum $\Sigma_i DoL_i=1$. The liability amount $C_i$ that activity i is assigned to, i.e. has to pay, is the total loss minus its own loss times the DoL 1135/1211: $C_i=(L-L_i)\times DoL_i$. If the DoL 1135/1211 of activity i is less than 100% and has an own loss >0, it will receive (incoming) money $I_i$ from the other causing activities 43: $I_i=L_i\times(1-DoL_i)$. Therefore, the resulting outgoing cash flow CF is: $CF_i=C_i-I_i=L\times DoL_i-L_i$. The loss distribution pattern and the recognition of the distribution pattern is essential in the inventive structure. It should not be assumed that there is only one possibility how the DoL 1135/1211 is distributed among the causing activities 43. The inventive structure of system 1 should also include the possibility that the DoL 1135/1211 distribution is implemented differently. For example, if the train company in the above example will always have 95% DoL 1135/1211, it may be too restrictive. Therefore, several possible outcomes j for the DoLs are introduced. The outcome possibilities have a probability assigned: $\Sigma_i DoL_{i,j}=1 \forall j$ and the probability $p_j$ of outcome j must sum up to $1: \Sigma_j p_j=1$. It is to be noted that it is possible that a causing activity 43 can have a $DoL_i=0$ in one or several of the outcomes j. It can e.g. be still considered a causing activity 43 if in at least one of the outcomes $DoL_i>0$. Taking up the discussed example the following table shows three different possibilities of how the DoL 1135/1211 could be distributed. In possibility 1, the activity 43 providing RR infrastructure has a DoL 1135/1211 of zero and the Running Railroads (RR) activity 43 gets almost all of the DoL 1135/1211. In the other possibilities, different outcomes together with their probability can e.g. be measured/observed. The activity 43 Being Passenger is of course not a causing activity 43 and therefore never has a DoL 1135/1211 assigned.

| ID | Activity | Possibility 1: 70% | Possibility 2: 20% | Possibility 3: 10% |
|---|---|---|---|---|
| 1 | Running Railroads (RR) | 98% | 80% | 60% |
| 2 | Providing RR Infrastructure | 0% | 10% | 20% |
| 3 | Holding Livestock | 2% | 10% | 20% |
| 4 | Being Passenger | n/a | n/a | n/a |

The ability to pay (ATP) 1133/822 defines a measure for the monetary amount that a legally liable unit/company 4 can actually pay to indemnify the damaged party before the unit 4 goes bankrupt. The ATP 1133/822 structure contains the following parameters: ATP=revenues×BATP×sf×tf, where the size factor sf is a function of the revenue and rnf: sf→sf(revenue×rnf). Further, revenue is the revenues of the unit/company 4, BATP is a measure for the base ability to pay, e.g. set at 9% of the revenue (typically parameter BATP can be set universal and industry independent), sf is the size factor and depends on the normalized revenue rn (a large corporate 4 has more substance (tangible and intangible), cost saving potential and financing capability and flexibility, than a small company. Therefore, this has an influence on the generated ATP 1133/822 and represented by the size factor sf. The sf depends on the revenue of the company only and is independent of industry 42 and/or region 433. An example of actual values can be found in the first table below), rnf is the revenue normalization factor, typically industry 42 dependent (the revenue normalization factor reflects the fact, that the turnover is not a direct proportional measure for the ATP 1133/822. For example, trading units/companies 4 have a very high revenue, but do not hold much cash. Therefore, the rnf is industry 4 dependent. An example of actual values by industry 42 can be found in the second table below, and tf is the tenor factor, with tf=1 for short term and tf=2 for long term.

| Normalized Revenues (revenue × rnf) in million USD | Size Category | Size Factor sf |
|---|---|---|
| ≥500 | super large | 125% |
| 200-500 | large | 100% |
| <200 | small | 75% |

| Industry Group 42 | Revenue Normalization Factor rnf |
|---|---|
| Transportation, Communications, Electric, Gas, And Sanitary Services | 50% |
| Manufacturing | 100% |
| Construction | 100% |
| Mining | 150% |
| Services | 250% |
| Retail Trade | 250% |
| Wholesale Trade | 300% |
| Agriculture, Forestry, And Fishing | 650% |
| Finance, Insurance, And Real Estate | 50% |
| Public Administration | 650% |

The actual monetary measure amount that will have to be paid depends on whether liability can be classified as "joint and several", "several" (see FIG. 3, reference number 1212/832) by the loss distribution generation 121/83, or some modified rule, as well as on the ability 1133/822 of the unit/company 4 to cover/pay, where (i) under the Joint and Several Liability rule, the affected unit 3 can seek damage coverage/payments from any of the units/companies 4 involved in the causing activities 43 irrespective of the DoL 1135/1211 allocated to this unit/company 4; in turn, the unit 4 selected in this manner can then seek coverage/payments from other units/parties 4 in the causing activities 43. It is to be noted that the amounts in excess of a defendant's ability to cover cannot normally be recovered from the co-defendants, and (ii) under the Several Liability rule the units/parties 4 declared liable (i.e., with DoL>0) are individually responsible, and the affected unit/party 3 has to seek its compensation from each of the liable units 4 separately. The application of the liability rules depends on the legal environment (providing the technical boundary condition for the generation) and as mentioned above has to be implemented together with the ability to cover/pay 1133/822 of the individual units/companies 3.

As described above, there are principally two legal systems in place how losses are distributed among the causing units/parties 43. These two regimes provide the corresponding boundary condition parameter. In fact, the Joint and Several Liability rules are typically basic to the two regimes, with a few exceptions. The way how losses are technically distributed, as described above, reflects the several liability case. If all causing units 4 are able to cover/pay their liability, there is no difference to the Joint and Several Liability. But if any of the causing units 4 is not able to cover its liability, this unit/party 4 goes bankrupt and part of the loss cannot be covered by that unit 4. In that case, the remaining causing units 4 will have to cover the uncovered loss proportionally to their DoL 1135/1211 of the remaining causing units 4. If no unit 4 is left, it can happen that part of the loss is simply not covered. The system 4 should be enabled to technically cope with these boundary conditions to the prediction. The liability amount $C_i$ that activity i 43 has to cover is the total loss minus its own loss times the DoL 1135/1211, with $C_i=(L-L_i) \times DoL_i$. To technically capture bankruptcy, the bankruptcy flag $bf_i$ for unit/company i. Together with the ability to pay, the bankruptcy flag is set by the system 1, if the measured outgoing cash flow is larger than the ability to cover/pay (ATP), with $CF_i=C_i-I_i=L \times DoL_i-L_i>ATP \rightarrow bf_i=1$. Further, the uncovered amount U is implemented, with $U_i=\max(CF_i-ATP_i, 0)$ and the total uncovered sum with $U=\Sigma_i U_i$. If there is an uncovered amount U>0, the uncovered amount has to be distributed by the system 1 among the non-bankrupt units 4. For this, a new $DoL_{i,j}$ has to be introduced. If the first iteration is j=0, for any following iteration j>0 the $DoL_{i,j}$ is generated as:

$$DoL_{i,j} = \frac{DoL_{i,j-1}}{\Sigma_i DoL_{i,j-1}} \times (1 - bf_i)$$

The new liability measure for unit/party i (if $bf_i=0$) can be generated by $C_{i,j}=C_{i,j-1}+DoL_{i,j} \times DoL_{i,j}$. Subsequently, the system 1 has to check if the unit/party 4 did go bankrupt due to the additional payout with $CF_{i,j}=C_{i,j}-I_i>ATP \rightarrow bf_i=1$. Thus, the new uncovered amount can be implemented as $U_i=\max(CF_{i,j}-ATP_i,0)$ and $U_j=\Sigma_i U_i \forall ibf_i=0$, where the system 1 is iterating over this loop until the uncovered amount is=0 or all units/parties 4 are bankrupt. Examples for the behavior of Joint and Several Liability, as used in the present implementation, can e.g. be given by assuming the following case as shown in the table below, where there are 4 involved units/parties, 2 and 4 as affected units 3, and 1 to 3 as causing units 4. It is interesting to see that unit/party 2 has an incoming, respectively negative outgoing cashflow. In the example, party 3 is bankrupt.

| Activity/Party | Own Loss | DoL | Liability | Incoming | Outgoing CF | ATP | Bankrupt | Uncovered |
|---|---|---|---|---|---|---|---|---|
| 1 | | 50% | 12.5 | 0 | 12.5 | 14 | 0 | 0 |
| 2 | 10 | 20% | 3 | 8 | −5 | 20 | 0 | 0 |

| Activity/ Party | Own Loss | DoL | Liability | Incoming | Outgoing CF | ATP | Bankrupt | Uncovered |
|---|---|---|---|---|---|---|---|---|
| 3 | | 30% | 7.5 | 0 | 7.5 | 5 | 1 | 2.5 |
| 4 | 15 | 0% | n/a | 15 | | | | |
| Sum | 25 | | 23.0 | | | | | 2.5 |

The first iteration j=1 is shown in the table below. Since there is an uncovered amount, the remaining, non-bankrupt units/parties 4 receive a new DoL 1135/1211. In the present example, the additional payout for the uncovered amount gets party 1 into bankruptcy. This again leads to an uncovered amount of iteration 1 and another round is necessary (which in this case is trivial as only one unit/party 4 is left).

| Activity/ Party | Own Loss | DoL 1 | Liability 1 | Liability 0 | Liability 0 + 1 | ATP | Bankrupt | Uncovered |
|---|---|---|---|---|---|---|---|---|
| 1 | | 71% | 1.8 | 12.5 | 14.3 | 14 | 1 | 0.3 |
| 2 | | 29% | 0.7 | 3 | 3.7 | 20 | 0 | 0 |
| 3 | | | | | | | 1 | |
| 4 | | | | | | | | |
| Uncovered | 0 | 2.5 | | | | | | |

As mentioned, in contrast to the LLC loss scenarios 10001, for the ULC loss scenarios 10002 generation, the legal, social and economic dynamics generation 122/94 comprises the evidence modelling structure generation 1222/941 (see FIG. 4). In the evidence modelling structure generation 1222/941, the technical approach to implement the temporal unfolding of evidence measure can e.g. be taken as follows:

First, a measure for the latency until ban is implemented. The latency until ban provides a measure for the temporal latency between the beginning of a ULC global event (e.g. first commercial (i.e. widespread) usage of BPA was in 1957) and the time when the causing unit 4 respectively the BPA as originator is banned (i.e. the exposure stops). The ULC model assumes that the ban of the causing unit/originator 4 takes place at one point in time globally and can e.g. be implemented as a fixed parameter. This does not reflect necessarily the reality (consider for example Asbestos). The latency measure until required evidence threshold is exceeded, provides the measure for the temporal latency between the beginning of the ULC global event (e.g. first commercial usage of BPA was in 1957) and the time when there is sufficient evidence (who manifested adverse effects) to sue for compensation. As an embodiment variant, it can technically be favorable to implement the assumption, that for the evidence threshold trespassing coincides with causing unit/originator 4 ban, the ULC modelling structure assumes that the latency until the evidence threshold being exceeded coincides with the ban of the causing unit/originator 4. This does not necessarily reflect reality (consider for example Asbestos, which hasn't been banned in all countries yet and is still continuously used).

To realize the system 1, the system 1 can e.g. comprise a separate affected to causing unit or driver, which allows to automatically allocate generated or measured losses to a causing unit/company 4 in a role 42. Affected units or individuals 3 can be associable with a specific causing unit/company 4 by e.g. consuming the products of this company, being employed there, living in the neighborhood of the premises, etc. The goal of the "Affected to Causing" module is to assign the exposed population groups 35/93, i.e. affected risk activities 43 in a certain location 433, to corresponding causing units 4. Affected population 35/93 groups are in a first step associated with a specific causing unit/company 4 via a location 433. (e.g. all German smokers are associated with the German sales market of Marlboro).

Please note that of course not all smokers in Germany smoke Marlboro. The scaling down of the population to a specific company takes place however in the severity scaling step.

The Wording Filter 13

Concerning the wording filter 13, as shown in FIG. 2, the wording filter 13 works mostly similar for LLC loss scenarios 10001 and ULC loss scenarios 10002. For both scenarios 10001/10002, the wording filter 13 comprises the generation of the risk-transfer/policy parameter characteristics generation and filtering 131/85/95 (see FIG. 3/4) with the modules for distributed loss triggering by one event 1311/851/952, also called claim trigger, the risk-transfer time window splitter or module 1312/852/954, i.e. policy period filter, and the aggregation wording module 1313/853/955. However, for the ULC loss scenarios and event 10002 generation, the risk-transfer/policy parameter characteristics generation and filtering 131/85/95 further comprises means for the economic loss generation 1314/951 and/or the batch clause module 1315/953.

The wording filter 13 provides the temporal allocation of a series of ULC 10002 losses onto one risk-transfer framework, e.g. provided by the parameters of an insurance policy. Risk-transfer parameter framing, as e.g. provided by insurance policy wordings, aims to ensure that a series of losses can be allocated (more are less unambiguously) to a specific risk-transfer, i.e. insurance policy. For example, assuming Marlboro smokers claim against Marlboro. How much of these series of losses would be allocated to Marlboro's product liability risk-transfer (policy) of 2013? As an embodiment variant, e.g. 3 properties of the risk-transfer parameters policy can be implemented to consider this question by the system's 1 structure: (i) the claims trigger module 1311/851/952, providing means for considering, how one individual loss is allocated temporarily (e.g. the point in time when a claim is made against the causing unit 4, i.e. the insured; (ii) the batch clause module 1315/953 providing means to consider whether a series of losses is batched and allocated temporarily (e.g. all claims (within a series of losses) are temporarily allocated to the first claim made); (iii) the policy period splitter or module 1313/853/955 providing the allocation of the loss period the risk-transfer parameters, i.e. insurance policy, covers (e.g. the policy covers all losses that are temporarily allocated to year 2017). As a good illustration how these three risk drivers work together in system 1 for the temporal allocation, FIG. 16 illustrates the above mechanism in a simple example. In the example of FIG. 16, 14 affected units 3 (in the example people) are exposed to a causing unit/originator 4 and develop adverse effects 934/1143. All this happens over the course of some years. The risk-transfer parameters, i.e. the policy, is based on claims made, has a batch clause and the risk-transfer (policy) period 34 is 2013.

The ULC modelling structure 10002 can e.g. comprise 3 types of claims triggers 1311/851/952, with (1) the claims made trigger, which temporarily allocates an individual loss by the date the claim against the causing unit 4 (insured) has been made; (2) occurrence trigger, which temporarily allocates an individual loss by the time the loss has occurred; and (3) occurrence notified trigger, which temporarily allocates an individual loss by the date the insured notifies the insurer of a (potential) loss. As an embodiment variant, the ULC modelling structure 10002 equally comprises the claims made and occurrence notified claims trigger 1311/851/952, i.e. this variant implements the underlying assumption that the causing unit 4 (e.g.: an insured company) reports the loss to the insurer at the same time the claim is made. Important is also the assumption that it cannot be assume affected units or people 3 file a claim as soon as the adverse effects manifest. Additionally, the structure can e.g. incorporate the assumption that it is only possible to go claiming when the substance is actually banned (which is equal to the point in time when enough evidence is there to submit a claim), before no claims will happen. In this case, technically, both conditions must be met to file a claim which sets the appropriate boundary condition parameters for the operation of the system 1. Note, that whereas it is more or less straightforward to determine the corresponding point in time for the "claims made" trigger and "occurrence notified" trigger, it can be challenging for the "occurrence" trigger to trigger a certain point in time. For example, if the occurrence trigger has to trigger when the loss for the damage of an asbestos worker occurs. To deal with these problems around the operation of the occurrence claims trigger, parameter limitations can e.g. be introduced based on the known different legal theories to identify when a damage occurs, which is (i) the injury-in-fact theory, (ii) the manifestation theory, (iii) the exposure theory, and (iv) the continuous theory. All of these theories allow to frame the operation if the occurrence trigger by implementing appropriate parameter limitations in the trigger.

For the batch clause module 1315/953 of the wording filter 13, the pattern with a ULC event 10002 associated series of losses can spread over time (e.g. the moment a victim gets sick). To be able to aggregate these series of losses to a single point in time, some risk-transfer parameters settings, as e.g. introduced by insurance contracts, have applied a batch clause mechanism.

Depending on the risk-transfer parameters (as e.g. given by the insurance policy), in particular the claims trigger 1311/952 parameters, the batch clause definition parameters and the inception date parameters, the temporal allocation of a loss to an insurance policy within a series of ULC losses can be different. Each time span (e.g. year) of the claims trigger time series therefore contains the sum of all allocated individual losses associated with the ULC loss event 10002. As a last step after applying the claims trigger 1311/952 and the batch clause 1315/953, the inception date, i.e. the policy period/temporal risk-transfer window 132/954 of the defined risk-transfer is considered by the system 1 to pick out the relevant claims trigger 1311/952 time span (e.g. year) out of the claims trigger 1311/952 time series. The claims trigger risk driver 1311/952 and batch clause modulator 1315/953 assign to the claims trigger 1311/952 time span contributions corresponding natural severities by summing up certain contributions of the population model specified in the ban outcome time series. The summation rule can e.g. be defined by the claims trigger 1311/952 and batch clause 1315/953 which parameters can e.g. be selectable by the causing unit 4. As a result, a total number of claims during a (claims trigger 1311/952) time span can be obtained by system 1. As an embodiment variant, the inception date can determine which year is picked out of the time series of losses. In other words, in this embodiment variant the duration of the risk-transfer (policy) 132/954 is not considered. The above structure allows providing a predictive value of how many natural units would be associated with a particular risk-transfer (insurance policy), For example, there may be 15 natural units/causing units 4 associated to Marlboro's product liability policy of 2013. The natural units/causing units 4 are described in terms of effect type, and how the economic damage is determined based upon them. In this example, for the ULC structure 10002, as for the LLC structure 10001, the same components can e.g. be used for implementation for the risk driver capturing the effect type splitting and loss components: 1. Reversible injury, 2. Irreversible injury, 3. Death, 4. Pure financial loss, 5. Subsequent financial loss, 6. Material damage. For example, the fraction of people to die of smoking (out of all developing adverse effects from smoking), is 40% (cf. first table below: modelling structure input, second table below: modelling structure output).

| Natural Severities | Loss Component | Share |
|---|---|---|
| 10 | Reversible Injury | 0.3 |
| | Irreversible Injury | 0.3 |
| | Death | 0.4 |
| | Pure Financial Loss | 0 |
| | Subsequent Financial Loss | 0 |
| | Material Damage | 0 |

| Loss Component | Natural Severities - Split |
|---|---|
| Reversible Injury | 3 |
| Irreversible Injury | 3 |
| Death | 4 |
| Pure Financial Loss | 0 |
| Subsequent Financial Loss | 0 |
| Material Damage | 0 |

The economic loss transformation is provided by means of a price tag module, which structures how the corresponding risk driver predicts/estimates natural severities for ULC events 10002, i.e. the number of affected people 3 by a loss component 4. Thus, the price tag module provides the means to transform these natural severities into monetary units. For this, it is necessary to multiply the loss components 4 of natural severities by the corresponding monetary value of each cost components. This transformation into monetary units depends on the location (which inter alia also defines the parameters for the cost of living). In the above example, the parameter vector of the natural severities comprises 7 elements which correspond to the above discussed loss components "Reversible Injury", "Irreversible Injury", "'Death", "Material Damage", "Pure Financial Loss", "Sub Financial Loss", and "Movable Material Damage". Similarly, to the natural severities vector data structure, the system 1 comprises a data structure for the monetary severities vector. The ULC Price Tag modulator provides the means for generating the monetary severities vector. While the monetary severities vector contains the mean values of the probability distribution of the loss components, the coefficients of variation are given by a further data structure for the severity ratios vector. Thus, the ULC Price Tag modulator functionally maps NaturalServerities,CostComponents→MonetarySeverities defining a mapping between Natural Severities and Cost Components, and the vector of severities, and NaturalServerityRatios,CostComponentRatios→SeverityRatios defining mapping between natural severity ratios and cost component ratios, and the vector of severity ratios. In the example above, the tables then look like:

| Loss Component | Natural Severities - Split | Economic Loss per unit |
|---|---|---|
| Reversible Injury | 3 | 30,000 |
| Irreversible Injury | 3 | 500,000 |
| Death | 4 | 300,000 |
| Pure Financial Loss | 0 | 100,000 |
| Subsequent Financial Loss | 0 | 100,000 |
| Material Damage | 0 | 100,000 |

| Loss Component | Economic Loss - Split |
|---|---|
| Reversible Injury | 90,000 |
| Irreversible Injury | 1,500,000 |
| Death | 1,200,000 |
| Pure Financial Loss | 0 |
| Subsequent Financial Loss | 0 |
| Material Damage | 0 |

Finally, the aggregation wording module 133/955 of the wording filter 13 provides the aggregation under the event loss modelling parameters, i.e. the means to aggregate the event losses by applying the risk-transfer parameter (insurance policy parameters) limits and deductibles, sublimits, aggregate limits, etc.

The Aggregator 14

Concerning the aggregator 14, as shown in FIG. 2, the aggregator 14 works different for LLC loss scenarios 10001 and ULC loss scenarios 10002. The aggregator 14 comprises for LLC events 10001 the clash aggregator 141 and for ULC events 10002 the accumulation aggregator 142. As a first point, the aggregator 142 aggregates the losses of different risk-transfers, i.e. policies. Generally, the aggregator 142 aggregates losses that need to be assigned to the causing unit 4 (i.e. the insured), but still need to differentiate different loss events. For example, two different loss scenarios 1000 do not belong to the same event. One important thing is the degree of loss outcome, which needs to be treated like different events. The event structure 1000 gives the foundation what to aggregate. Generally, the aggregator 142 identify what is aggregated as one event and what is a different event. Under one event, the distributions are aggregated as convolutions. Independent events need to be aggregated independently. For each event, the aggregator 142 applies the layers to get the layer loss, respectively the expected layer loss using the frequency. The aggregator 142 comprises means for the following steps: (i) Group the input by event, (ii) Remove zero results. These are events with frequency=0 or loss=0, (iii) Aggregate all entries that belong to one event, (iv) Apply risk-transfer (policy) layer, (v) Aggregate risk-transfer (policy) events, and (vi) apply clash layer. Once the risk-transfer aggregation has taken place, the aggregator 142 aggregates among the different risk-transfers (policies). This is done by aggregating risk-transfer events over the according causing activities. Further, a risk-transfer has one or several layers. The layer loss and expected loss has to be provided by the aggregator 14 for each layer. Different layers will be entered into the same rating. It is to be noted, that the aggregator 14 comprises capturing possible correlations of activities. However, for certain application of system 1, it may be possible to omit technical consideration related to correlations of activities. For example, there is a possibility that the causing unit 4 (insured party) is active in several causing activities 43. In the next step, the aggregator 14 identifies how and with what probability causing units/companies 4 are involved in the same event. Additionally, each causing unit 4 insured in a different risk-transfer (policy) has e.g. the following layers to be applied and aggregated: (i) Scenario, (i) Country, (iii) Degree of Loss Outcomes—must be treated like they are different scenarios.

Since the aggregator 14 aims to have the losses aggregated over several causing units 4, the group differentiated by its rating identification, which is a placeholder for a causing unit's 4 identification, is removed. Additionally, the identification of the causing activity 43 is removed, as the aggregator 14 aggregates over these. As an additional step, the aggregator 14 aggregates the layer losses of the risk-transfer. Finally, regarding the causing activities 43, the aggregator 14 aggregates each combination of each risk-transfer (policy) and generates the results. When generating risk-transfers in a bordereau, the aggregator 14 consolidates the aggregation in the way that several causing units 4 (in policies) can e.g. have the same causing activities 43. In some cases, depending on the loss scenario, this has to be summed up. In other cases, it should not. For example, for premises explosions, the activity 'owning the factory site which has an explosion' should only be used once, otherwise it is a different event. The other example is construction: Activity 43 of "executing construction work" can be executed by many causing units 4, and therefore this needs to be summed up. The outcome of the aggregator provides the parameter giving a measure for the predicted/expected losses 232 and their magnitudes.

LIST OF REFERENCE SIGNS

1 Clash-Quantifying, Multi-Risk Assessment System
10 Event Generator
100 Structured Cause-Effect Chain
1000 Scenario Groups
10001 First Scenario Groups (LLC Scenario Groups)
100011 Train Accident
100012 Premises Disaster
100013 Construction Disaster
100014 Utility Catastrophe 100015 Food Industry Catastrophe
100016 Event Disaster
10002 Second Scenario Groups (ULC Scenario Groups)
100021 Nanomaterials
100022 Endocrine Disruptors
100023 Building Materials
100024 Food Overconsumption
1000241 Food Additives
1000242 Unhealthy Food
1000243 Functional Food
100025 Pharmaceuticals
100026 Professional Lines
10003 Third Scenario Groups (ELC External Scenario Groups)
100031 Economic scenarios
100032 Biometric scenarios
100033 Legal scenarios
1001 Scenario Associated with a Structured Cause-Effect Chain
1002 Risk Event Evolving from a Scenario
1003 Activity Link Member/Activity
1004 Classification/Industry of the Risk Exposed Units
101 Multi-dimensional scenario data structure
1011 First Accumulation Scenario Data Structure
10110 First Scenarios
10111 First Scenario Risk/Loss Events
10112 Frame Parameters of First Scenario Events
101121 Geographic Range
101122 Temporal Duration
10113 First Scenario Activity Link Members
10114 Participation Probabilities of the causing units 4
10115 Event Frequency
1012 Second accumulation scenario data structure
10120 Second Scenarios
10121 Second Scenario Loss/Risk Events
10122 Frame Parameters of Second Scenario Events
101221 Temporal Duration
101222 Number of Causing Risk Exposed Units
10123 Second Scenario Activity Link Members
10124 Participation Probabilities of the causing units 4
10125 Event Frequency
10126 Event Severity
10126 Location of measured severity
1013 Third accumulation scenario data structure
10130 Third Scenarios
10131 Third Scenario Loss Events
10132 Frame Parameters of Third Scenario Events
101321 Frequency
101322 Severity Measure
10133 Third Scenario Activity Link Members
10134 Participation Probabilities of the causing units 4
10135 Event Frequency
102 Accumulation scenarios (real world)
1021 Limited liability catastrophes (LLC)
1022 Unlimited liability catastrophes (ULC)
1023 External scenarios (External)
103 Repository unit for aggregation of event data with event characteristic parameters
104 Scenario Selector
105 Event Characteristics Generation Engine
106 Event Frequency Generator
107 Affected to Causing Risk driver (A2C modulator)
108 Natural Severities Risk Driver (Fisk Driver PTC)
11 Risk Splitter
110 Risk Portion per Affected Risk Exposed Unit 4
111 Characteristics of Affected Risk Exposed Unit 4
1110 Activity Characteristic Parameters
1111 Participation Characteristic Parameters
1112 Set of Executable Activity Link Members
1113 Market Share Driving Participation Probability
112 Characteristics of Affected Population
1121 Quota Parameters (Affected Population for an Incidence)
1122 Quota Parameters (Refined Effect Types)
113 Involved Companies Characteristics Generation
1131 Activity in Industry Probability (LLC)
1132 Market Share Measure
1133 Ability to Pay
1134 Participation Probability (ULC)
1135 Degree of Liability
114 Exposed Population Generation
1141 Population Size Generator
1142 Exposure History
1143 Adverse Effect Generator
1144 Manifestation Latency Generator
12 Modulation Engine
121 Loss Distribution
1211 Degree of Liability
1212 'Several' or 'Joint and Several'
122 Legal, Social and Economic Dynamics
1221 Economic Loss (LLC)
1222 Evidence Modelling Structure (ULC)
13 Wording Filter
131 Risk-Transfer/Policy Parameter Characteristics Generation and Filtering
1311 Distributed loss triggering by one event/claim trigger
1312 Risk-Transfer Time Window (Policy Period)
1313 Aggregation Wording
1314 Economic Loss (ULC)
1315 Batch Clause (ULC)
14 Aggregator
141 Clash Aggregator (LLC)
142 Accumulation Aggregator (ULC)
15 Risk drivers (Risk Driven and Triggering Measuring Factors)
150 Data Repository
1501 Structured Hash Table
151 Event-Frequency Risk Driver of First Scenarios 10001
1511 Frequency
1512 Country/Region (for ULC Global)
152 Affected-to-Causing Risk Driver of Scenarios 10001/10002/10003
1521 Severity
153 Event-Frequency Risk Driver of Second Scenarios 10002
1531 Frequency
1532 Temporal Granularity of the Scenarios
1533 Frequency Attenuation
154 Participation-Probability Risk Driver of First/Second/Third Scenarios
1541 Conditional Probability Measure
16 Control Unit Controller
161 Risk-Event Driven Core Aggregator
162 Triggers for triggering, capturing, and monitoring measuring data in the data flow pathway of the sensors/measuring devices
163 Risk-Event Driven Core Aggregator of the Measuring Data
1631 Data Triggers Triggering the Measuring Data 531
17 Signaling module
171 Signal generation and transmission
18 Price Tag Engine
19 Risk Discriminator
2 Occurring Risk Event (real world/simulated)

20 Losses Associable with an Occurring Risk Event
21 Liability Catastrophes
22 Casualty Accumulation
23 Loss/Impact Caused by the Occurrence of the Risk Event 2
231 Potential Losses
232 Predicted/Expected Losses
24 Loss Burden
25 Loss/claim trigger
251 Occurrence triggers
252 Manifestation triggers
253 Claims made trigger
3 Affected Units (loss impact by occurring risk events)
31 Differentiable Groups of Affected Units 3
32 Affected Activities
33 Location of Affected Unit during Affected Activity
34 Time or Time Period of Affected Unit during Affected Activity
35 Affected population
4 Causing Liability Risk Exposed Units
41 Risk Exposure of Causing Risk Exposed Units
42 Class/Industry of a Risk Exposed Unit 4
43 Causing activities performable by the class(es) 42 of the causing unit 4
431 Participation probability
432 Severity
433 Location
434 Frequency
435 Size
436 Extended parameters, e.g. loss preventions, human factors
44 Causing risk events
5 Automated First-Tier Risk Transfer System (e.g. Automated Insurance Units)
51 First Risk Transfer Parameters
52 Risk Transfer Time Window
53 Measuring Stations and/or Measuring Sensors
531 Measuring/Sensory Data
6 Automated Second-Tier Risk Transfer System (e.g. Automated Reinsurance Units)
7 Data Transmission Network
8 Limited Liability Catastrophe Engineering Structure
81 Event Characteristics
811 Event Generator
812 Scenario Selector
813 Event Frequency
82 Involved Entities Characteristics
821 Activity in Industry Probability
822 Measure providing the Ability to Pay
823 Market Share Measure
83 Loss Distribution
831 Degree of Liability
832 'Several' or 'Joint and Several'
84 Legal, Social and Economic Dynamics
841 Economic Loss
85 Risk-Transfer/Policy Parameter Characteristics
851 Claims Trigger
852 Risk-Transfer Time Window (Policy Period)
853 Aggregation Wording
9 Unlimited Liability Catastrophe Engineering Structure
91 Event Characteristics
911 Event Generator
912 Scenario Selector
913 Event Frequency
92 Involved Entities Characteristics
921 Participation Probability
922 Degree of Liability
923 Market Share Measure
93 Exposed Population
931 Manifestation Latency Structure
932 Exposure History
933 Population Size
934 Adverse Effect Probability
94 Legal, Social and Economic Dynamics
941 Evidence Modelling Structure
95 Risk-Transfer Parameter Characteristics
951 Economic Loss Measure
952 Claim Trigger
953 Batch Clause Generator
954 Risk-Transfer Time Window (Policy Period)
955 Aggregation Wording

The invention claimed is:

1. An automated forecasting system for measuring future occurrence probabilities of risk events using a structured forward-looking model structure quantifying clashing, long-tail risk events, comprising:
a passage-based risk-parsing device for providing automated risk splitting for a multi-risk forecast system capturing multiple loss aggregation under complex environmental conditions based on occurrence of defined loss events which are triggered by one or more involved causing units and affected units,
wherein a plurality of affected units are subject to a risk exposure of occurring risk events caused by one or a plurality of causing units,
wherein the loss events evolve from one or multiple risk accumulating sources,
wherein risk events related loss measures are scattered over multiple causing units or multiple related clash events, and
wherein the multi-risk forecast system provides forecasting and exposure-based signaling, steering and/or operating of associated, catastrophic risk-event driven or triggered systems,
wherein the automated forecasting system comprises measuring stations or sensors in loco and/or by satellite-based for measuring occurring risk-events,
wherein measured sensory data of the measuring stations or sensors
are transmitted via a data transmission network to the automated forecasting system, comprising a central control unit controller for processing of the captured electronic data, and
are assigned to a historic set comprising event parameters for each risk-event, wherein for capturing and measuring the measured sensory data, the central control unit controller comprises a risk-event driven core aggregator with measuring data-driven triggers for triggering, capturing, and monitoring in a data flow pathway of the measuring sensors and/or measuring devices of risk-exposed and affected units, and wherein the forward-looking model structure is based on measured risk events and risk events generated by the automated forecasting system providing a defined structured cause-effect chain,
wherein the passage-based risk-parsing device being based on a structured forward-looking cause-effect chain with parsed parameter data space, comprises:
circuitry including a multi-dimensional data structure holding predefined accumulation scenarios for capturing measures of at least three risk accumulation sources triggered by the causing units, wherein the multi-dimensional data structure comprises:

a first accumulation scenario data structure for capturing first frame parameters of first scenario loss events, the first frame parameters defining risk events with a limited geographic impact range, with a duration time window, with a plurality of affected units affected by an impact of occurring risk events, and with a plurality of causing risk exposed units affected by a loss burden associated with an impact of the occurring risk events, a second accumulation scenario data structure for capturing second frame parameters of second scenario loss events, the second frame parameters defining risk events with a global geographic impact range, with a longer duration time than the duration time of unfolding of the events, and with an extended number of causing risk exposed units, a third accumulation scenario data structure for capturing third frame parameters defining third scenario risk events impacting first and second scenario risk events with external influences, the third frame parameters capturing external influence measures impacting at least frequency or severity of the impact of the occurring risk events, wherein a structured cause-effect chain is provided by a generated plurality of data sets holding risk events evolving from a specific accumulation scenario for each of the predefined accumulation scenarios, wherein an activity is realized as a unit that is executed and is part of a scenario in order that the scenario actually happens within the structured cause-effect chain, and wherein each causing activity has one or more types of industry assigned executing a given activity together with a probability measure that a causing activity is executed from a specific industry, and the circuitry is configured to split the risk based on risk exposed, causing unit characteristics and risk exposed affected units characteristics, the causing unit characteristics comprising for each causing unit assigned activity characteristic parameters and participation characteristic parameters of said causing unit defining for a specific causing unit a specific set of executable activity link members and market share driving participation probabilities, and the causing unit characteristics comprising quota parameters defining affected populations of affected units with incidence and defining refined effect types.

2. The automated forecasting system according to claim 1, wherein the circuitry is further configured to:

include a dual track structure applying differently to Limited Liability Catastrophe (LLC) loss scenarios and Unlimited Liability Catastrophe (ULC) loss scenarios, and generate and trigger involved entities characteristics incorporating activities characteristics capturing and parameterizing causing units in different roles and incorporating market characteristics and model capturing and parameterizing the market share driving participation probabilities, wherein, for the ULC loss scenarios, the dual track structure comprises additional fields for exposed population trigger and generation, wherein in a first track of the dual track structure applying to the LLC loss scenarios, the circuitry generates and triggers for activity in industry probabilities, market share measures, and measures of the ability to pay, and wherein in a second track of the dual track structure applying to the ULC loss scenarios, the circuitry generates and triggers for participation probabilities, the market share measures, and degrees of liability, and generates and triggers for population size, adverse effect probabilities, manifestation latencies, and exposure history.

3. The automated forecasting system according to claim 2, wherein the generation and triggering of involved entities characteristics applying to the LLC loss scenarios are driven by properties of the causing units that have a positive probability to participate in a LLC event, and generation and triggering of involved entities characteristics applying to the ULC loss scenarios are driven by properties of the causing units that have a positive probability to participate in a ULC event.

4. The automated forecasting system according to claim 2, wherein the involved entities characteristics applying to the LLC loss scenarios comprises a measure for a participation probability implemented as conditional probability under a condition that an LLC event occurs related to a causing unit to participate in a role of a causing activity and as part of an industry in an LLC event.

5. The automated forecasting system according to claim 2, wherein the generation and triggering of the market share measures provide a measure of a revenue of the causing unit divided by a total revenue of a corresponding industry in a given country.

6. The automated forecasting system according to claim 2, wherein the generation and triggering of the market share measures comprises generating of an event frequency of an LLC event multiplied by the participation probability of a causing unit corresponds to the event frequency from a perspective of the causing unit in an activity and industry role.

7. The automated forecasting system according to claim 3, wherein the probability to participate in a ULC event is at least triggered by industrial activities of the causing units, geographic extension of activities, a size of the causing unit, and a loss prevention of a company or human factors.

8. The automated forecasting system according to claim 2, wherein the involved entities characteristics applying to the ULC loss scenarios comprises a measure for a participation probability implemented as conditional probability under the condition that an ULC event occurs related to a causing unit to participate in a role of a causing activity and as part of an industry class in a global ULC event with ULC characteristics.

9. The automated forecasting system according to according to claim 2, wherein the involved entities characteristics applying to the ULC loss scenarios comprises measuring or generating a global event frequency which is multiplied by a participation probability of a causing unit therefore corresponds to the global event frequency from a perspective of the causing unit in an activity and industry class.

10. The automated forecasting system according to claim 2, wherein the involved entities characteristics applying to the ULC loss scenarios comprises an automated severity scaling and adjustment by providing a measure for a market share of the causing unit, and wherein besides a risk-exposed unit's influence on a measured probability of participating in a global ULC event, the circuitry also captures a size of the causing unit to adjust a severity measure.

11. The automated forecasting system according to claim 2, wherein an ULC event capturing structure is implemented to relate on a market share of a unit/company in a role of a causing activity in a location and automatically scaling down/up an assigned severity as an overall severity generated for an exposed population in the location.

12. The automated forecasting system according to claim 11, wherein when the circuitry cannot assess measuring data providing a size of a causing unit, the circuitry is set or calibrated by using an average causing unit size by industry and location.

13. The automated forecasting system according to claim 11, wherein a weighted market share of a causing unit in a role of a causing risk activity in a location is generated by a parameter relation:

$$wms_{ra,loc} = \frac{\Sigma_{ro} aip_{ra,ro} * ms_{ro,ra,loc}}{\Sigma_{ro} aip_{ra,ro}}$$

where a parameter $aip_{ra,ro}$ is an activity in an industry class probability and $ms_{ro,ra,loc}$ is a market share of risk activity in a class of an industry in a location, wherein the market share of risk activity in a role of the industry in the location is generated as follows:

$$ms_{ro,ra,loc} = \frac{assVol_{ro,loc,ap}}{nComps_{ro,loc} * avgRev_{ro,loc} * idaf_{ra,ro}}$$

where a parameter $assVol_{ro,loc,ap}$ is an assigned volume or an assigned revenue of the causing unit, and $nComps_{ro,loc}$ is a number of causing units in the industry and location.

14. The automated forecasting system according to claim 13, wherein the circuitry is further configured to apply a measure of a weighted market share in a natural severity by $$natSevMeanAfter_{lc} = natSevMeanBefore_{lc} * wms_{ra,loc}$$

where a parameter SevMeanAfter is a mean of natural severity distribution after loss distribution pattern, nat-SevMeanBefor is a mean of natural severity distribution before loss distribution pattern, lc is a loss component, ra is the risk activity, and loc is the location.

15. The automated forecasting system according to claim 14, wherein the natural severity distribution after a loss distribution pattern is shaped as a log-normal pattern, or the natural severity distribution before the loss distribution pattern is shaped as a log-normal pattern.

16. The automated forecasting system according to claim 2,
wherein the circuitry further comprises a structure for a risk driver capturing loss distribution pattern,
wherein a severity of affected risk activities is distributed by the risk driver capturing loss distribution pattern to causing risk activities by setting a measurable degree of liability providing a relation for each causing-affected pair in the activity chain of a ULC scenario.

17. The automated forecasting system according to claim 2, wherein the circuitry is further configured to generate an exposed causing unit within a global ULC event by grouping the global ULC events by type of affected risk activity and location of affected units.

18. The automated forecasting system according to claim 2, wherein the circuitry is further configured to technically capture temporal dynamics of an exposed population during the unfolding of a ULC event, wherein at least grouping criteria of an exposure period is applied.

19. The automated forecasting system according to claim 2,
wherein, for generating an adverse effect probability, an ULC event structure is implemented to technically relate on a dependency between a duration of exposure of an affected unit and a probability measure to develop adverse effects, and
wherein the implementation of the ULC event structure assumes that this dependency decreases with prolonged exposure duration.

20. The automated forecasting system according to claim 2,
wherein the circuitry is further configured to generate a manifestation latency wherein ULC events unfold over an extended period of time and each affected unit as part of an exposed population capable of having its own assigned history of exposure measure to a causing unit or history of manifestation of adverse effects, and
wherein the manifestation latency generation provides measures for how long it takes for an affected unit to develop adverse effects.

21. A method for an automated forecasting system for measuring future occurrence probabilities of risk events using automated risk splitting for a multi-risk forecast system capturing multiple loss aggregation under complex environmental conditions based on occurrence of defined loss events which are triggered by one or more involved causing units and affected units,
wherein a plurality of affected units are subject to a risk exposure of occurring risk events caused by one or a plurality of causing units,
wherein the loss events evolve from one or multiple risk accumulating sources,
wherein risk events related loss measures are scattered over multiple causing units or multiple related clash events, and
wherein the multi-risk forecast system provides forecasting and exposure-based signaling, steering and/or operating of associated, catastrophic risk-event driven or triggered systems, the method comprising:
measuring occurring risk-events by measuring stations or sensors in loco and/or by satellite-based;
transmitting measured sensory data of the measuring stations or sensors via a data transmission network to the automated forecasting system, comprising a central control unit controller for processing of the captured electronic data;
assigning the measured sensory data of the measuring stations or sensors to a historic set comprising event parameters for each risk-event, wherein for capturing and measuring the measured sensory data, the central control unit controller comprises a risk-event driven core aggregator with measuring data-driven triggers for triggering, capturing, and monitoring in a data flow pathway of the measuring sensors and/or measuring devices of risk-exposed and affected units, and wherein the forward-looking model structure is based on measured risk events and risk events generated by the automated forecasting system providing a defined structured cause-effect chain;
holding, in a multi-dimensional data structure, predefined accumulation scenarios for capturing measures of at least three risk accumulation sources triggered by the causing units;
capturing first frame parameters of first scenario loss events, in a first accumulation scenario data structure of the multi-dimensional data structure, the first frame parameters defining risk events with a limited geographic impact range, with a duration time window, with a plurality of affected units affected by an impact of the occurring risk events, and with a plurality of causing risk exposed units affected by a loss burden associated with an impact of occurring risk events;

capturing second frame parameters of second scenario loss events, in a second accumulation scenario data structure of the multi-dimensional data structure, the second frame parameters defining risk events with a global geographic impact range, with a longer duration time than the duration time of unfolding of the events, and with an extended number of causing risk exposed units;

capturing, in a third accumulation scenario data structure of the multi-dimensional data structure, third frame parameters defining third scenario risk events impacting first and second scenario risk events with external influences, the third frame parameters capturing external influence measures impacting at least frequency or severity of the impact of the occurring risk events, wherein a structured cause-effect chain is provided by a generated plurality of data sets holding risk events evolving from a specific accumulation scenario for each of the scenarios, wherein an activity is realized as a unit that is executed and is part of a scenario in order that the scenario actually happens within the structured cause-effect chain, wherein each causing activity has one or more types of industry assigned executing a given activity together with a probability measure that a causing activity is executed from a specific industry; and splitting the risk based on the risk exposed and causing unit characteristics and risk exposed affected units characteristics, the causing unit characteristics comprising for each causing unit assigned activity characteristic parameters and participation characteristic parameters of said causing unit defining for a specific causing unit a specific set of executable activity link members and market share driving participation probabilities, and the causing unit characteristics comprising quota parameters defining affected populations of affected units with incidence and defining refined effect types.

* * * * *